United States Patent
Kim et al.

(10) Patent No.: US 12,438,749 B2
(45) Date of Patent: Oct. 7, 2025

(54) METHOD AND DEVICE FOR ESTIMATING SELF- INTERFERENCE CHANNEL IN WIRELESS COMMUNICATION SYSTEM

(71) Applicant: Samsung Electronics Co., Ltd., Suwon-si (KR)

(72) Inventors: Sundo Kim, Suwon-si (KR); Kwonjong Lee, Suwon-si (KR); Juho Lee, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 17/854,810

(22) Filed: Jun. 30, 2022

(65) Prior Publication Data

US 2023/0208683 A1     Jun. 29, 2023

(30) Foreign Application Priority Data

Dec. 23, 2021   (KR) .................. 10-2021-0186576

(51) Int. Cl.
*H04L 25/02* (2006.01)
*H04W 24/02* (2009.01)

(52) U.S. Cl.
CPC ......... *H04L 25/0202* (2013.01); *H04W 24/02* (2013.01)

(58) Field of Classification Search
CPC ............ H04L 25/0202; H04L 25/0224; H04L 25/0226; H04L 5/1461; H04L 5/0032; H04W 24/02; H04B 1/525; H04B 17/345; H04J 11/0023

See application file for complete search history.

(56) References Cited

U.S. PATENT DOCUMENTS

| | | | |
|---|---|---|---|
| 2004/0166886 A1* | 8/2004 | Laroia ................... | H04W 52/24 455/69 |
| 2006/0067422 A1* | 3/2006 | Chung .................. | H04L 5/0073 375/295 |
| 2011/0237273 A1 | 9/2011 | Wigren et al. | |
| 2013/0044621 A1* | 2/2013 | Jung ..................... | H04J 11/005 370/336 |

(Continued)

FOREIGN PATENT DOCUMENTS

| CN | 108718205 A | 10/2018 |
|---|---|---|
| KR | 10-2016-0023666 A | 3/2016 |

(Continued)

OTHER PUBLICATIONS

International Search Report dated Sep. 28, 2022, issued in International Application No. PCT/KR2022/009411.

(Continued)

*Primary Examiner* — Liem H. Nguyen
(74) *Attorney, Agent, or Firm* — Jefferson IP Law, LLP

(57) ABSTRACT

The disclosure relates to a method and device for efficiently estimating a self-interference channel in a wireless communication system. A method for estimating a self-interference channel by a base station operating a plurality of sectors is provided. The method includes transmitting, in a self-interference channel estimation interval, a downlink signal in a sector among the plurality of sectors, and estimating an intra-sector self-interference channel caused by the downlink signal in the sector.

18 Claims, 35 Drawing Sheets

(56) References Cited

U.S. PATENT DOCUMENTS

| | | | |
|---|---|---|---|
| 2016/0143013 A1 | 5/2016 | Kim et al. | |
| 2018/0083679 A1* | 3/2018 | Lim | H04B 17/336 |
| 2018/0254926 A1 | 9/2018 | Kim et al. | |
| 2019/0021084 A1* | 1/2019 | Stirling-Gallacher | H04W 72/51 |
| 2019/0341984 A1* | 11/2019 | Zhu | H04B 7/0639 |
| 2020/0213072 A1 | 7/2020 | Baek et al. | |
| 2020/0403670 A1 | 12/2020 | Gan et al. | |
| 2021/0044385 A1* | 2/2021 | Hosseini | H04L 1/08 |
| 2021/0058219 A1* | 2/2021 | Kimura | H04L 5/14 |
| 2021/0376894 A1* | 12/2021 | Cha | H04B 7/0695 |
| 2023/0144233 A1* | 5/2023 | Manolakos | H04B 7/0481 375/262 |
| 2023/0164606 A1* | 5/2023 | Zhou | H04L 5/0073 370/329 |
| 2023/0189157 A1* | 6/2023 | Fan | H04B 7/0691 370/311 |
| 2023/0247465 A1* | 8/2023 | Ibrahim | H04W 24/10 370/252 |
| 2023/0283420 A1* | 9/2023 | Shahar | H04L 5/0039 370/329 |
| 2024/0298198 A1* | 9/2024 | Ibrahim | H04W 24/10 |

FOREIGN PATENT DOCUMENTS

| | | |
|---|---|---|
| KR | 10-2018-0045022 A | 5/2018 |
| KR | 10-2020-0083046 A | 7/2020 |

OTHER PUBLICATIONS

Sridhar Rajagopal et al., Self-interference mitigation for in-band mmWave wireless backhaul, 2014 IEEE 11th Consumer Communications Networking Conference (CCNC), Jan. 10, 2014, pp. 551-556, XP032626125.

Ji-Hoon Yun, Intra and Inter-Cell Resource Management in Full-Duplex Heterogeneous Cellular Networks, IEEE Transactions on Mobile Computing, vol. 15, No. 2, Feb. 1, 2016, pp. 392-405, XP11592210.

Extended European Search report dated Feb. 13, 2025, issued in European Patent Application No. 22911483.0.

\* cited by examiner

METHOD AND DEVICE FOR ESTIMATING SELF-INTERFERENCE CHANNEL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0186576, filed on Dec. 23, 2021, in the Korean Intellectual Property Office, the disclosure of which is incorporated by reference herein in its entirety.

BACKGROUND

1. Field

The disclosure relates to a method and a device for estimating a self-interference channel in a wireless communication system. More particularly, the disclosure relates to a method for reducing overhead when estimating a self-interference channel per sector in a wireless communication system supporting full-duplex communication.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for efficiently estimating a self-interference channel in a wireless communication system.

Another aspect of the disclosure is to provide a method and device for efficiently estimating a self-interference channel in a wireless communication system supporting full-duplex communication.

Another aspect of the disclosure is to provide a method and device for reducing overhead when estimating a self-interference channel per sector in a wireless communication system supporting full-duplex communication.

Additional aspects will be set forth in part in the description which follows and, in part, will be apparent from the description, or may be learned by practice of the presented embodiments.

In accordance with an aspect of the disclosure, a method for estimating a self-interference channel by a base station operating a plurality of sectors is provided. The method includes transmitting, in a self-interference channel estimation interval, a downlink signal in a sector among the plurality of sectors, and estimating an intra-sector self-interference channel caused by the downlink signal in the sector.

In accordance with another aspect of the disclosure, a base station operating a plurality of sectors is provided. The base station operating a plurality of sectors includes a transceiver including a plurality of antenna panels and at least one processor configured to transmit, in a self-interference channel estimation interval, a downlink signal in a sector among the plurality of sectors, and estimate an intra-sector self-interference channel caused by the downlink signal in the sector.

In accordance with another aspect of the disclosure, a method performed by a UE communicating with a base station operating a plurality of sectors is provided. The method includes receiving, from the base station, configuration information including information about a self-interference channel estimation interval in a sector where the UE belongs and performing data transmission/reception with the base station in a remaining uplink resource or downlink resource except for the self-interference channel estimation interval without performing uplink transmission in the self-interference channel estimation interval based on the configuration information.

In accordance with another aspect of the disclosure, a UE communicating with a base station operating a plurality of sectors is provided. The UE includes a transceiver and at least one processor configured to receive, from the base station through the transceiver, configuration information including information about a self-interference channel estimation interval in a sector where the UE belongs and perform data transmission/reception with the base station, through the transceiver, in a remaining uplink resource or downlink resource except for the self-interference channel estimation interval without performing uplink transmission in the self-interference channel estimation interval based on the configuration information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in connection with the accompanying drawings, in which.

Throughout the drawings, it should be noted that like reference numbers are used to depict the same or similar elements, features, and structures.

DETAILED DESCRIPTION

Figure 1:
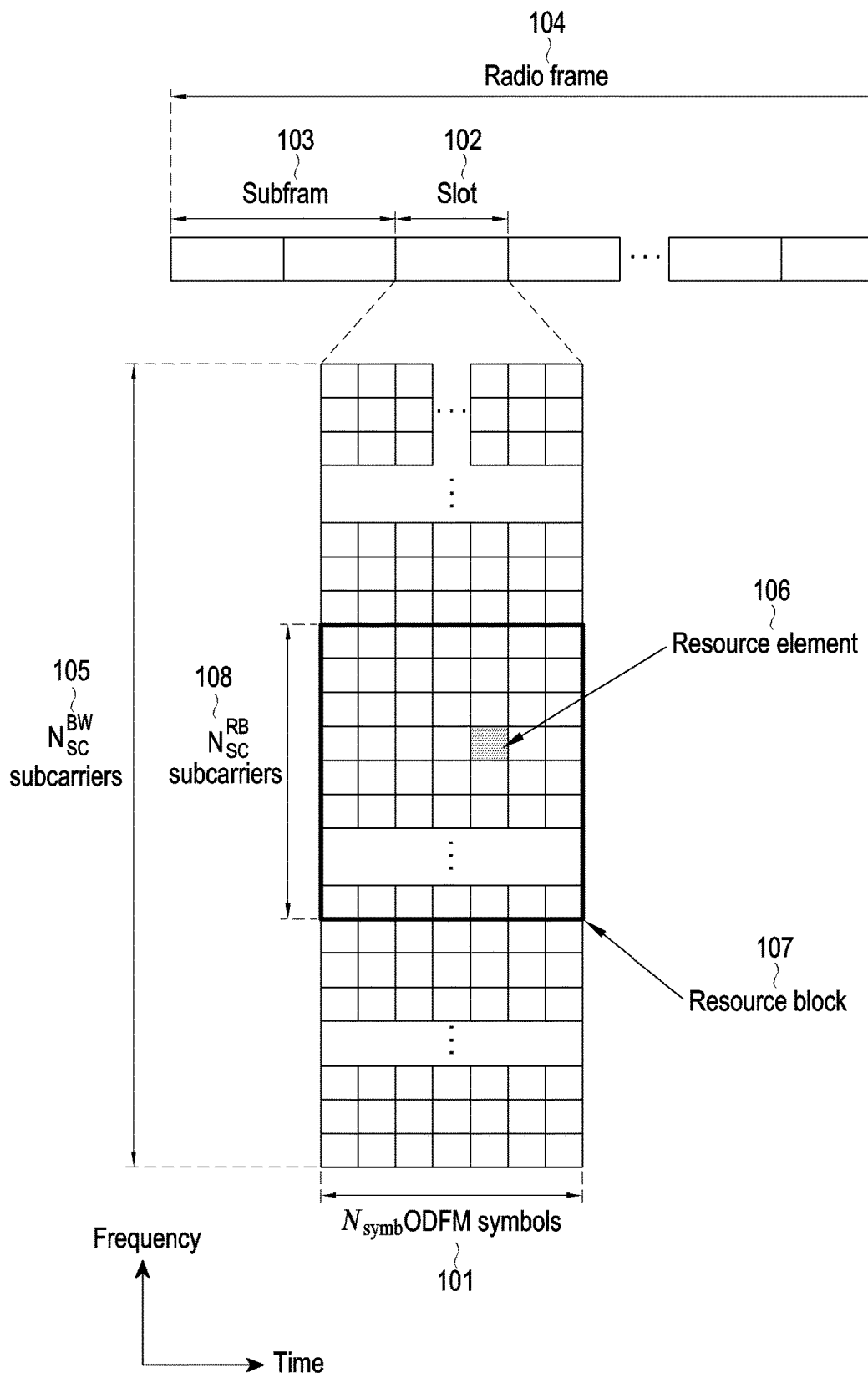
FIG. 1 is a view illustrating a basic structure of a time-frequency domain in a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

In describing embodiments of the disclosure, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments of the disclosure, a " . . . unit" may include one or more processors.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure. Hereinafter, the base station may be an entity allocating resource to a terminal and may be at least one of a gNode B (gNB), an eNode B, a Node B, a base station (BS), a wireless access unit, a base station controller, or a node over network. The base station may be a network entity including at least one of an integrated access and backhaul-donor (IAB-donor), which is a gNB providing network access to UE(s) through a network of backhaul and access links in the 5G system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

The UE may include a terminal, a mobile station (MS), a cellular phone, a smartphone, a computer, or a multimedia system capable of performing communication functions. Of course, it is not limited to the above examples. Described below is a technology for receiving broadcast information from a base station by a UE in a wireless communication system. The disclosure relates to communication techniques for merging $5^{th}$ generation (5G) communication systems with Internet-of-things (IoT) technology to support a high data transmission rate in post-$4^{th}$ generation (4G) system and systems therefor. The disclosure can be applied for intelligent services based on 5G communication technology and IoT related technology (for example, smart homes, smart buildings, smart cities, smart cars or connected cars, healthcare, digital education, retail businesses, security and safety related services, and the like).

Hereinafter, terms denoting broadcast information, terms denoting control information, communication coverage-related terms, terms (e.g., an event) denoting state variations, terms denoting network entities, terms denoting messages, or terms denoting device components are provided solely for illustration purposes. The disclosure is not limited to the terms, and other terms equivalent in technical concept may also be used.

For ease of description, hereinafter, some of the terms and names defined in the 3rd generation partnership project long term evolution (3GPP LTE) or 3GPP new radio (NR) standards may be used. However, the disclosure is not limited by such terms and names and may be likewise applicable to systems conforming to other standards.

Wireless communication systems evolve beyond voice-centered services to broadband wireless communication systems to provide high data rate and high-quality packet data services, such as $3^{rd}$ generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of such broadband wireless communication system, LTE system adopts orthogonal frequency division multiplexing (OFDM) for downlink (DL) and single carrier frequency division multiple access (SC-FDMA) for uplink (UL). Uplink means a wireless link where the UE (or mobile station (MS) transmits data or control signals to the base station (BS, or eNode B), and download means a wireless link where the base station transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., NR systems, i.e., 5G systems, are required to freely reflect various needs of users and service providers and thus to support services that meet various requirements. Services considered for 5G systems include, e.g., increased mobile broadband (eMBB), massive machine type communication (MMTC), and ultra-reliability low latency communication (URLLC).

According to an embodiment of the disclosure, eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. The 5G communication system is also required to provide the increased user perceived data rate of the UE. To meet such requirements, transmit (TX)/receive (RX) techniques, as well as multiple input multiple output (MIMO), need to further be enhanced. The data transmission rate required for 5G communication systems may be met by using a broader frequency bandwidth than 20 Mhz in a frequency band ranging 3 Ghz to 6 Ghz or a frequency band of 6 Ghz or more instead of the 2 Ghz band currently adopted in LTE.

mMTC is also considered to support application services, such as Internet of things (IoT) in the 5G system. To efficiently provide IoT, mMTC may be required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km2). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life time.

The URLLC, as a cellular-based wireless communication service used for a specific purpose (mission-critical), may be a service used for remote control for robots or machinery, industrial automation, unmanned aerial vehicles, remote health care, and emergency alerts and may be required to provide communication that provides ultra-low latency and ultra-high reliability. For example, URLLC-supportive services need to meet an air interface latency of less than 0.5 milliseconds simultaneously with a packet error rate of 10-5 or less. Thus, for URLLC-supportive services, the 5G communication system may be required to be designed to provide a shorter transmit time interval (TTI) than those for other services and allocate a broad resource in the frequency band. However, the aforementioned mMTC, URLLC, and eMBB are merely examples of different service types, and the service types to which the disclosure is applied are not limited to the above-described examples.

Services considered in the 5G system described above should be merged together based on one framework. In other words, for efficient resource management and control, it is preferable that the services are integrated into a single system and controlled and transmitted, rather than being independently operated.

Although LTE, LTE-A, LTE Pro, or NR systems are described as examples in connection with embodiments of the disclosure, embodiments may also apply to other communication systems with a similar technical background or channel form. Further, embodiments may be modified in such a range as not to significantly depart from the scope of the disclosure under the determination by one of ordinary skill in the art and such modifications may be applicable to other communication systems.

In the disclosure, information shared between the base station and the UE may be transferred by at least one of higher layer signaling and L1 signaling.

Higher layer signaling may be signaling corresponding to at least one or a combination of one or more of the following signaling.

Master information block (MIB)
System information block (SIB) or SIB X (X=1, 2, . . . )
Radio resource control (RRC)
Medium access control (MAC) control element (CE)

Further, L1 signaling may be signaling corresponding to at least one or a combination of one or more of the following physical layer channel signaling methods using signaling.

Physical downlink control channel (PDCCH)
Downlink control information (DCI)
UE-specific DCI
Group common DCI
Common DCI
Scheduling DCI (e.g., DCI used for scheduling downlink or uplink data)
Non-scheduling DCI (e.g., DCI not for the purpose of scheduling downlink or uplink data)
Physical uplink control channel (PUCCH)
Uplink control information (UCI)

The frame architecture for the LTE and LTE-A system (hereinafter, 'LTE system') is described below with reference to the drawings.

FIG. 1 is a view illustrating a basic structure of a time-frequency domain, which is a radio resource region in which data or control channel signals are transmitted in an LTE system according to an embodiment of the disclosure.

Referring to FIG. 1, the horizontal axis denotes the time domain, and the vertical axis denotes the frequency domain. In the time domain, the minimum transmission unit is an OFDM symbol 101, and Nsymb OFDM symbols 101 come together to configure one slot 102, and two slots come together to configure one subframe 103. The length of the slot 102 is 0.5 ms, and the length of the subframe 103 is 1.0 ms. The radio frame 104 is a time domain unit consisting of ten subframes 103. In the frequency domain, the minimum transmission unit is subcarrier 105, and the bandwidth of the overall system transmission band consists of a total of $N_{SC}^{BW}$ subcarriers 105.

The basic resource unit in the time-frequency domain is resource element (RE) 106 which may be represented with an OFDM symbol index and a subcarrier index. Resource block (RB or physical resource block (PRB)) 107 is defined with Nsymb contiguous OFDM symbols 101 in the time domain and $N_{SC}^{RB}$ contiguous subcarriers 108 in the frequency domain. Accordingly, one RB 107 includes Nsymb× $N_{SC}^{RB}$ REs 106. Generally, the minimum transmission unit of data is the RB. Generally, in the LTE system, Nsymb=7 and $N_{SC}^{RB}$=12, and, $N_{SC}^{BW}$ and $N_{SC}^{RB}$ are proportional to the bandwidth of system transmission band.

Now described is the download control information (DCI) in the LTE and LTE-A system.

In the LTE system, the scheduling information on downlink data or uplink data is transferred through downlink control information (DCI) from the base station to the terminal. DCI may include information about whether the scheduling information is for uplink data or download data, whether the DCI is compact DCI of which the size of control information is small, whether spatial multiplexing using multiple antennas applies, or whether the DCI is for power control. Further, a DCI format defined according to the above-described information may be applied and operated. For example, DCI format 1, which is the scheduling control information about download data, is configured to include the following pieces of control information.

Resource allocation type 0/1 flag: notifies whether resource allocation type is type 0 or type 1. Type 0 allocates resources in RBG (resource block group) units by applying bitmap scheme. In the LTE system, the basic unit of scheduling is RB (resource block) represented in time and frequency domain resources, and RBG consists of a plurality of RBs and becomes the basic unit of scheduling in the type 0 scheme. Type 1 allows for allocation of a particular RB in the RBG.

Resource block assignment: indicates RB allocated for data transmission. Resource represented according to system bandwidth and resource allocation scheme is determined.

Modulation and coding scheme (MCS): indicates the size of transport block that is data to be transmitted and modulation scheme used for data transmission.

HARQ process number: indicates process number of HARQ.

New data indicator: indicates whether HARQ initial transmission or re-transmission.

Redundancy version: indicates redundancy version of HARQ.

Transmit power control (TPC) command for physical uplink control channel (PUCCH): indicates transmit power control command for uplink control channel PUCCH.

The DCI undergoes channel coding and modulation and is transmitted through the downlink physical control channel, physical downlink control channel (PDCCH).

The cyclic redundancy check (CRC) is added to the DCI message payload, and the CRC is scrambled with the radio network temporary identifier (RNTI) that is the identity of the UE. Different RNTIs are used for the purposes of the DCI message, e.g., UE-specific data transmission, power control command, or random access response. The RNTI is not explicitly transmitted, but the RNTI is included in the CRC calculation process and transmitted. Upon receiving the DCI message transmitted on the PDCCH, the UE identifies the CRC using the allocated RNTI, and when the CRC is identified to be correct, the UE may be aware that the message has been transmitted thereto.

Figure 2:
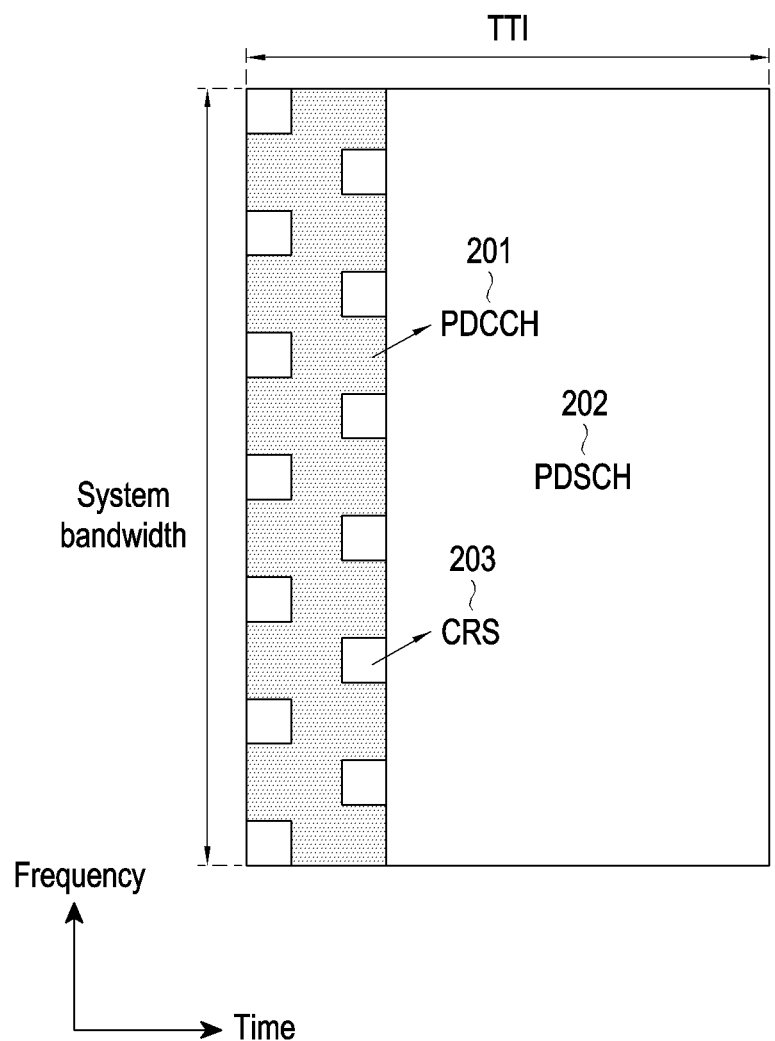
FIG. 2 is a view illustrating a downlink control channel in an LTE system according to an embodiment of the disclosure.

FIG. 2 is a view illustrating a PDCCH that is a downlink physical channel through which DCI is transmitted in an LTE system according to an embodiment of the disclosure.

Referring to FIG. 2, the PDCCH 201 is time-multiplexed with the physical downlink shared channel (PDSCH) 202, which is a data transmission channel, and is transmitted over the overall system bandwidth. The region for the PDCCH 201 is represented with the number of OFDM symbols, and this is indicated to the UE via the control format indicator (CFI) that is transmitted via the physical control format indicator channel (PCFICH).

The PDCCH 201 may be allocated to the OFDM symbols which are positioned in the head of the subframe, allowing the UE to decode the download scheduling allocation as quick as possible. This provides the advantage of being able to reduce the decoding latency for the PDSCH 202, i.e., the overall download transmission latency.

Since one PDCCH carries one DCI message, and multiple UEs may simultaneously be scheduled for the download and uplink, multiple PDCCHs are simultaneously transmitted in each cell. As a reference signal for decoding the PDCCH 201, the cell-specific reference signal (CRS) 203 is used. The CRS 203 is transmitted in each subframe over the entire band, and the scrambling and resource mapping are varied depending on the cell identity (ID). Since the CRS 203 is a reference signal commonly used for all the UEs, UE-specific beamforming cannot be used. Accordingly, the multi-antenna TX scheme for LTE PDCCH is limited to open-loop transmit diversity. The number of CRS ports is implicitly known to the UE from the decoding of the physical broadcast channel (PBCH).

The resource allocation of the PDCCH 201 is based on the control-channel element, and one CCE is constituted of nine resource element groups (REGs), i.e., a total of 36 REs. The number of CCEs necessary for a particular PDCCH 201 may be 1, 2, 4, or 8, and this differs depending on the channel coding rate of the DCI message payload. As such, different numbers of CCEs are used to implement the link adaptation of the PDCCH 201.

The UE needs to detect a signal while it is unaware of the information about the PDCCH 201. LTE defines the search space that denotes a set of CCEs for blind decoding. The search space consists of a plurality of sets in the aggregation level (AL) of each CCE, and this is not explicitly signaled but is implicitly defined via the function and subframe number by the identity of the UE. In each subframe, the UE decodes the PDCCH 201 for all possible resource candidates that may be created from the CCEs in the set search space and processes the information declared by the cyclic redundancy check (CRC) to be valid for the UE.

The search space is divided into a UE-specific search space and a common search space. A predetermined group of UEs or all the UEs may investigate the common search space of the PDCCH 201 to receive cell-common control information, e.g., paging message, or dynamic scheduling for system information. For example, scheduling allocation information about the PDSCH 202 for transmitting system information block (SIB)-1 containing, e.g., cell service provider information may be received by investigating the common search space of the PDCCH 201.

In the LTE system, the overall PDCCH region is constituted of a CCE set in the logical region, and there is a search space constituted of a set of CCEs. The search space may be divided into a common search space and a UE-specific search space, and the search space for the LTE PDCCH is defined as shown in Table 1 according to the 3GPP standard.

TABLE 1

The set of PDCCH candidates to monitor are defined in terms of search spaces, where a search space $S_k^{(L)}$ at aggregation level L∈ {1,2,4,8} is defined by a set of PDCCH candidates. For each serving cell on which PDCCH is monitored, the CCEs corresponding to PDCCH candidate m of the search space $S_k^{(L)}$ are given by
$L \{(Y_k + m') \mod \lfloor N_{CCE,k} / L \rfloor\} + i$
where $Y_k$ is defined below, i = 0,L ,L − 1 . For the common search space m' = m . For the PDCCH UE specific search space, for the serving cell on which PDCCH is monitored, if the monitoring UE is configured with carrier indicator field then m' = m + $M^{(L)}$ ·$n_{CI}$ where $n_{CI}$ is the carrier indicator field value, else if the monitoring UE is not configured with carrier indicator field then m' = m , where m = 0,L ,$M^{(L)}$ − 1 . $M^{(L)}$ is the number of PDCCH candidates to monitor in the given search space.
Note that the carrier indicator field value is the same as ServCellIndex
For the common search spaces, $Y_k$ is set to 0 for the two aggregation levels L = 4 and L = 8 .
For the UE-specific search space $S_k^{(L)}$ at aggregation level L , the variable $Y_k$ is defined by
$Y_k = (A \cdot Y_{k-1}) \mod D$
where $Y_{-1} = n_{RNTI} \neq 0$ , A = 39827 , D = 65537 and k = $\lfloor n_s/2 \rfloor$, $n_s$ is the slot number within a radio frame. The RNTI value used for $n_{RNTI}$ is defined in subclause 7.1 in downlink and subclause 8 in uplink.

According to the definition of the search space for the PDCCH set forth in Table 1 above, the UE-specific search space is not explicitly signaled but is implicitly defined via the subframe number and function by the UE identity (RNTI). In other words, the UE-specific search space may be varied depending on the subframe number, meaning that it may be varied depending on times. This addresses the problem that a particular UE among UEs cannot use the search space due to the other UEs (blocking issue).

According to an embodiment of the disclosure, if a certain UE cannot be scheduled in a subframe because all the CCEs that it investigates are already in use by other UEs scheduled in the same subframe, such issue may not occur in the next subframe because the search space is varied over time. For example, although the UE-specific search spaces of UE #1 and UE #2 partially overlap each other in a particular subframe, the overlap may be predicted to differ in the next subframe because the UE-specific search space is varied per subframe.

According to the definition of the search space for the PDCCH described above, the common search space is defined as a set of CCEs previously agreed on because a predetermined group or UEs or all the UEs need to receive the PDCCH. In other words, the common search space does not vary depending on, e.g., the identity (RNTI) of the UE or subframe number. Although the common search space exists for transmission of various system messages, it may also be used to transmit the control information for individual UEs. Thus, the common search space may be used to address the UE's failure to be scheduled due to insufficient available resources in the UE-specific search space.

The search space is a set of candidate control channels constituted of CCEs that the UE needs to attempt to decode on the aggregation level, and since there are several aggregation levels to bundle up one, two, four, or eight CCEs, the UE has a plurality of search spaces. The number of PDCCH candidates that the UE needs to monitor in the search space defined as per the aggregation level in the PDCCH of the LTE system is defined as shown in Table 2 below.

TABLE 2

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, the UE-specific search space supports aggregation level {1, 2, 4, 8}, where it has {6, 6, 2, 2} PDCCH candidates, respectively. The common-specific search space supports aggregation level {4, 8}, where it has {4, 2} PDCCH candidates, respectively. The common search space only supports {4, 8} aggregation levels for making better the coverage property because the system message is generally required to reach the cell border.

The DCI transmitted in the common search space is defined only for particular DCI formats, e.g., 0/1A/3/3A/1C defined in the 3GPP standard, which are ones for the power control purpose for the UE group or system message. In the common search space, the DCI formats having spatial multiplexing are not supported. The download DCI format that should be decoded in the UE-specific search space is varied depending on the transmission mode set for the UE. Since the transmission mode is set via radio resource control (RRC) signaling, the exact subframe number as to whether the setting is effective for the UE is not designated. Accordingly, the UE may be operated not to lose communication by always performing decoding on DCI format 1A regardless of the transmission mode.

Described above are methods of the related art for transmitting/receiving downlink control channel and downlink control information in LTE and LTE-A and the search space.

Described below is a downlink control channel in a 5G system which is currently under discussion, with reference to the drawings.

Figure 3:
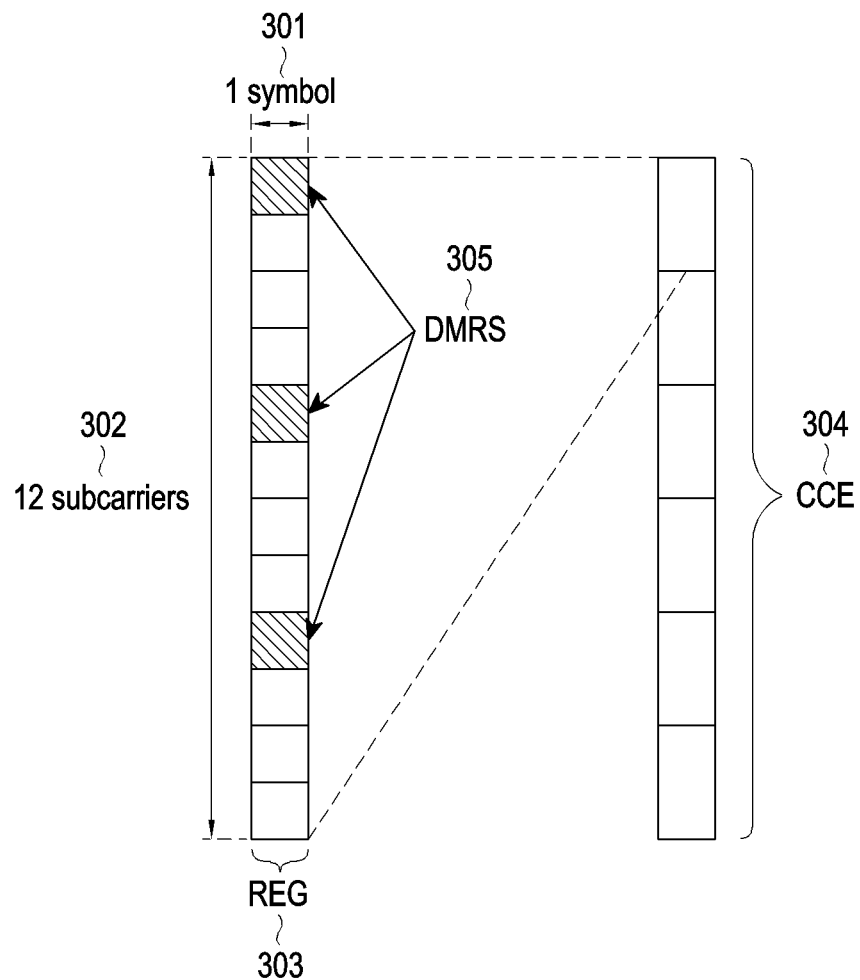
FIG. 3 is a view illustrating a basic unit of time and frequency resource constituting a downlink control channel in a $5^{th}$ generation (5G) system according to an embodiment of the disclosure.

FIG. 3 is a view illustrating a basic unit of time and frequency resource constituting a downlink control channel in a 5G system according to an embodiment of the disclosure.

Referring to FIG. 3, the basic unit (i.e., the resource element group (REG)) of the time and frequency resource constituting the control channel (i.e., PDCCH) includes one OFDM symbol 301 along the time axis and 12 subcarriers 302 along the frequency axis—i.e., one resource block (RB). By assuming one OFDM symbol 301 the basic unit in the time domain in constituting the basic unit of the control channel, the data channel (i.e., PDSCH) and the control channel may be time-multiplexed in one subframe. By leaving the control channel ahead of the data channel, the user's processing time may be reduced, making it easier to meet the latency time requirements. By setting the basic unit in the frequency domain for the control channel to one RB 302, frequency multiplexing between the control channel and the data channel may be carried out more efficiently.

Referring to FIG. 3, it is possible to set a control channel area (control resource set (CORESET)) in various sizes by concatenating the REGs 303. As an example, if the basic unit for allocation of a downlink control channel in the 5G system is a control channel element (CCE) 304, one CCE 304 may include multiple REGs 303. For example, when the REG 303 of FIG. 3 may consist of 12 REs, and one CCE 304 consists of six REGs 303, the CCE 304 may consist of 72 REs. When the download control region is set, the region may be constituted of multiple CCEs 304, and a particular downlink control channel may be mapped to one or more CCEs 304 according to the aggregation level (AL) in the control region and be transmitted. The CCEs 304 in the control region may be distinguished with numbers in which case the numbers may be assigned according to a logical mapping scheme.

The basic unit, i.e., REG 303, of the downlink control channel shown in FIG. 3 may include all of the REs where the DCI is mapped and the REs where the demodulation reference signal (DMRS) 305, which is a reference signal for decoding the same, is mapped.

Referring to FIG. 3, the DMRS 305 may be transmitted in three REs in one REG 303. For reference, since the DMRS 305 is transmitted using the same precoding as the control signal mapped in the REG 303, the UE may decode the control information even without information about what precoding has been applied by the base station.

Figure 4:
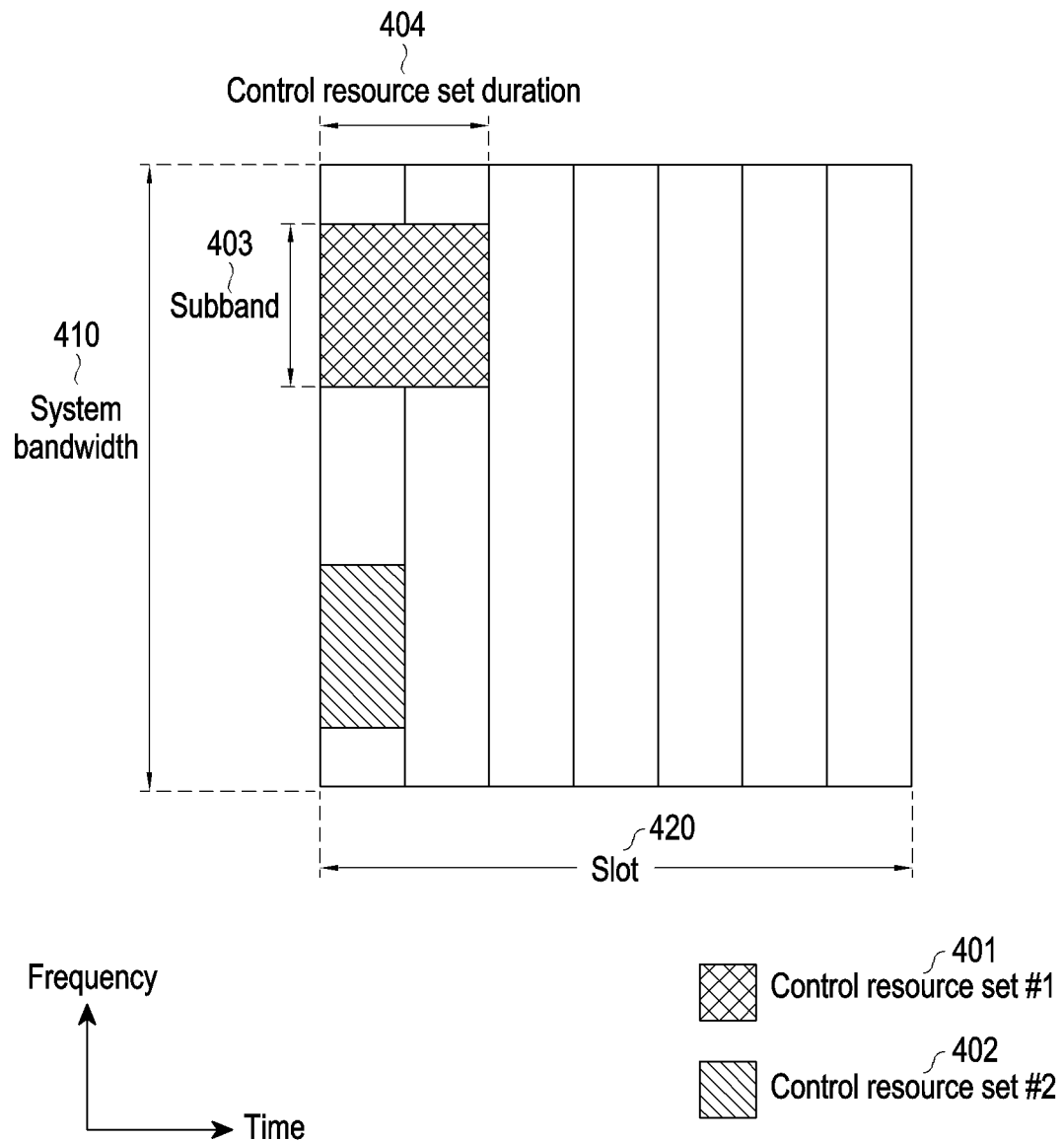
FIG. 4 is a view illustrating a configuration for a control region (control resource set (CORESET)) in which a downlink control channel is transmitted in a 5G system according to an embodiment of the disclosure.

FIG. 4 is a view illustrating a configuration for a control region (control resource set (CORESET)) in which a downlink control channel is transmitted in a 5G system according to an embodiment of the disclosure.

Referring to FIG. 4, it assumes one slot is constituted of 7 OFDM symbols. FIG. 4 illustrates an example in which two control regions (control region #1 401 and control region #2 402) are configured in one slot 420 in the time domain and the system bandwidth 410 in the frequency domain. The frequency of the control regions 401 and 402 may be set as specific subband 403 in the entire system bandwidth 410. The time length of the control regions 401 and 402 may be set to one or more OFDM symbols, and the time length of the control regions 401 and 402 may also be defined as control resource set duration 404.

Referring to FIG. 4, control region #1 401 is configured with a control region length of two symbols, and control region #4 402 is configured with a control region length of one symbol.

The control region in the 5G communication system described above may be configured in the UE by the base station through higher layer signaling (e.g., system information, master information block (MIB), or radio resource control (RRC) signaling). Configuring a control region in a UE means providing the UE with information, such as the location of the control region, subband, resource allocation of the control region, and control resource set duration. Configuration information for the control region may include, e.g., information shown in Table 3 below.

TABLE 3 configuration information 1. Frequency domain RB allocation information
configuration information 2. Control region start symbol
configuration information 3. Control region symbol length
configuration information 4. REG bundling size (2, 3, or 6)
configuration information 5. Transmission mode (interleaved transmission
scheme or non-interleaved transmission scheme)
    configuration information 6. DMRS configuration
       information (precoder
granularity)
    configuration information 7. Search space type
    (common search space, group-
common search space, UE-specific search space)
    configuration information 8. DCI format to be
       monitored in corresponding
control region
- others The configuration information set forth in Table 3 is an example of the disclosure, and other various pieces of information, necessary for transmitting the downlink control channel, than the configuration information in Table 3 may be configured in the UE.

Downlink control information (DCI) in the 5G system is described below.

In the 5G system, scheduling information about a physical uplink shared channel (PUSCH) or physical downlink shared channel (PDSCH) is transferred from the base station to the UE through DCI.

The UE may monitor the DCI format for fallback and the DCI format for non-fallback for PUSCH or PDSCH. The fallback DCI format may include fixed fields between the base station and the UE, and the non-fallback DCI format may include configurable fields.

According to an embodiment of the disclosure, the fallback DCI for PUSCH scheduling may include the information set forth in Table 4.

TABLE 4

Identifier for DCI formats - [1] bit
Frequency domain resource assignment -
$\lceil \log_2(N_{RB}^{UL,BWP}(N_{RB}^{UL,BWP}+1)/2) \rceil$ bits
Time domain resource assignment - X bits
Frequency hopping flag - 1 bit.
Modulation and coding scheme - [5] bits
New data indicator - 1 bit
Redundancy version - [2] bits TABLE 4-continued HARQ process number - [4] bits
TPC command for scheduled PUSCH - [2] bits
UL/SUL indicator - 0 or 1 bit According to an embodiment of the disclosure, the non-fallback DCI for PUSCH scheduling may include the information set forth in Table 5.

TABLE 5

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP}+1/2) \rceil$
    $\lceil \log_2(N_{RB}^{UL,BWP}(N_{RB}^{UL,BWP}+1/2) \rceil$ bits
Time domain resource assignment - 1, 2, 3, or 4 bits
VRB- to-PRB mapping - 0 or 1 bit, only for resource
allocation type 1.
    0 bit if only resource allocation type 0 is
    configured;
    1 bit otherwise.
Frequency hopping flag - 0 or 1 bit, only for
resource allocation type 1.
    0 bit if only resource allocation type 0 is
    configured;
    1 bit otherwise.
Modulation and coding scheme - 5 bits
New data indicator - 1 bit
Redundancy version - 2 bits as defined in section
x.x of [6, TS38.214]
HARQ process number - 4 bits
1st downlink assignment index - 1 or 2 bits
    1 bit for semi-static HARQ-ACK codebook;
    2 bits for dynamic HARQ-ACK codebook with
    single HARQ-ACK codebook.
2nd downlink assignment index - 0 or 2 bits
    2 bits for dynamic HARQ-ACK codebook with two
    HARQ-ACK sub-codebooks;
    0 bit otherwise.
TPC command for scheduled PUSCH - 2 bits
SRS resource indicator– $\left\lceil \log_2\left(\sum_{k=1}^{L_{max}} \binom{N_{SRS}}{k}\right) \right\rceil$ or
$\lceil \log_2(N_{SRS}) \rceil$ bits
$\left\lceil \log_2\left(\sum_{k=1}^{L_{max}} \binom{N_{SRS}}{k}\right) \right\rceil$ bits for non-codebook based
PUSCH transmission;
$\lceil \log_2(N_{SRS}) \rceil$ bits for codebook based PUSCH
transmission.
Precoding information and number of layers - up to
6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit According to an embodiment of the disclosure, the fallback DCI for PDSCH scheduling may include the information set forth in Table 6 below.

TABLE 6

Identifier for DCI formats - [1] bit
Frequency domain resource assignment -
$\lceil \log_2(N_{RB}^{DL,BWP}(N_{RB}^{DL,BWP}+1)/2) \rceil_{bits}$
Time domain resource assignment - X bits
VRB-to-PRB mapping - 1 bit.
Modulation and coding scheme - [5] bits
New data indicator - 1 bit

TABLE 6-continued

Redundancy version - [2] bits
HARQ process number - [4] bits
Downlink assignment index - 2 bits
TPC command for scheduled PUCCH - [2] bits
PUCCH resource indicator - [2] bits
PDSCH-to-HARQ feedback timing indicator - [3] bits According to an embodiment of the disclosure, the non-fallback DCI for PDSCH scheduling may include the information set forth in Table 7 below.

TABLE 7

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP} / P \rceil$ bits
    For resource allocation type 1,
    $\lceil \log_2(N_{RB}^{DL,BWP} (N_{RB}^{DL,BWP} +1)/2)\rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 1 bit
Rate matching indicator - 0, 1, 2 bits
ZP CSI-RS trigger - X bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 4 bits
TPC command for scheduled PUCCH - 2 bits
PUCCH resource indicator
PDSCH-to-HARQ_feedback timing indicator - 3 bits
Antenna ports - up to 5 bits
Transmission configuration indication - 3 bits
SRS request - 2 bits
CBG transmission information - 0, 2, 4, 6, or 8 bits
CBG flushing out information - 0 or 1 bit
DMRS sequence initialization - 0 or 1 bit The DCI undergoes channel coding and modulation and may be transmitted through the downlink physical control channel, physical downlink control channel (PDCCH). A cyclic redundancy check (CRC) is added to the DCI message payload, and the CRC is scrambled with the radio network temporary identifier (RNTI) that is the identity of the UE.

Different RNTIs are used for the purposes of the DCI message, e.g., UE-specific data transmission, power control command, or random access response. The RNTI is not explicitly transmitted, but the RNTI is included in the CRC calculation process and transmitted. If the UE receives the DCI message transmitted on the PDCCH, the UE may identify the CRC using the allocated RNTI. If the result of identifying the CRC is correct, the UE may know that the message is transmitted to the UE.

For example, the DCI scheduling the PDSCH for system information (SI) may be scrambled to SI-RNTI. The DCI scheduling a PDSCH for a random access response (RAR) message may be scrambled to RA-RNTI. The DCI scheduling a PDSCH for a paging message may be scrambled with P-RNTI. The DCI providing a slot format indicator (SFI) may be scrambled to SFI-RNTI. The DCI providing transmit power control (TPC) may be scrambled to TPC-RNTI. The DCI for scheduling a UE-specific PDSCH or PUSCH may be scrambled with cell RNTI (C-RNTI).

If a specific UE receives a data channel, i.e., PUSCH or PDSCH, scheduled through the PDCCH, data is transmitted/received along with DMRS in the scheduled resource area.

Figure 5:
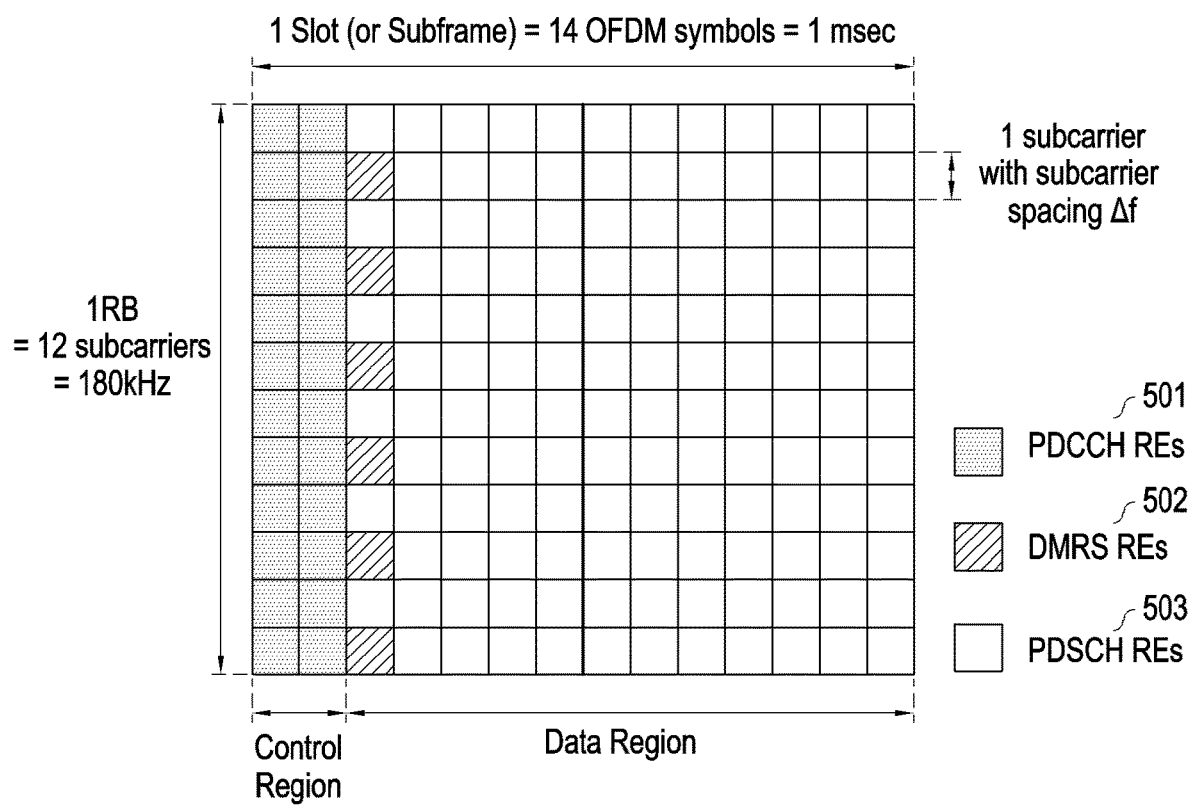
FIG. 5 is a view illustrating a configuration for a downlink resource block (RB) structure in a 5G system according to an embodiment of the disclosure.

FIG. 5 is a view illustrating a configuration for a downlink RB structure in a 5G system according to an embodiment of the disclosure.

Referring to FIG. 5, a specific UE uses 14 OFDM symbols as one slot (or subframe) in downlink, the PDCCH is transmitted in the first two OFDM symbols, and the DMRS is transmitted in the third symbol. In the case of FIG. 5, in a specific RB where the PDSCH 503 is scheduled through the PDCCH 501, the PDSCH is transmitted, with data mapped to the REs, in which no DMRS 502 is transmitted in the third symbol, and the REs of the fourth to last symbols. Subcarrier spacing Δf represented in FIG. 5 is 15 kHz in the LTE/LTE-A system and one of {15, 30, 60, 120, 240, 480} kHz in the 5G system.

In the cellular system, the base station should transmit a reference signal to measure the downlink channel state. In the 3GPP long term evolution advanced (LTE-A) system, the UE may measure the channel state between the UE and the base station using the CRS or CSI-RS that the base station transmits.

The channel state should be measured considering various factors, and the measured channel state may include an amount of interference in downlink. The amount of interference in the downlink may include interference signals and thermal noise generated by an antenna belonging to an adjacent base station. The amount of interference in the downlink is important for the UE to determine the downlink channel condition. As an example, when a base station with one transmit antenna transmits a signal to a UE with one receive antenna, the UE should determine Es/Io by determining the per-symbol energy (Es), which may be received via downlink in the reference signal received from the base station, and the amount of interference Io, which is to be simultaneously received in the interval of receiving the symbol. The determined Es/Io is converted into a data transmission speed or a value corresponding to the data transmission speed and is transmitted, in the form of a channel quality indicator (CQI), to the base station and may be used to determine at what data transmission speed the base station is to transmit data to the UE.

More specifically, in the LTE-A system, the UE feedbacks information on the channel state of downlink to the base station so that it may be utilized for downlink scheduling by the base station. For example, the UE measures the reference signal transmitted from the base station on downlink and feedbacks the information extracted therefrom to the base station in a form as defined in the LTE-LTE-A standards. As described above, the information fed back by the UE in LTE/LTE-A may be referred to as channel state information, and the channel state information may include three pieces of information as follows.

Rank indicator (RI): the number of spatial layers that may be received by the UE in the current channel state
Precoder matrix indicator (PMI): an indicator for a precoding matrix favored by the UE in the current channel state
Channel quality indicator (CQI): the maximum data rate at which the UE may perform reception in the current channel state.

The CQI may be replaced with the signal-to-interference plus noise ratio (SINR), the maximum error correction code rate and modulation scheme, or data efficiency per frequency which may be utilized similar to the maximum data rate.

The RI, PMI, and CQI are associated with one another and have meanings. As an example, a different precoding matrix, as supported in LTE/LTE-A, is defined per rank. Accordingly, the PMI value X when the RI is 1 and the PMI value X when the RI is 2 may be interpreted differently.

Further, it is assumed that when the UE determines the CQI, the PMI value X, which the UE has reported to the base station, has also applied. In other words, reporting RI_X, PMI_Y, and CQI_Z to the base station by the UE is equal to reporting that the UE is able to receive the data rate corresponding to CQI_Z when the rank is RI_X, and PMI is PMI_Y. As such, the UE assumes the transmission scheme that is to be performed for the base station when computing the CQI, thereby enabling the securing of the optimized performance upon attending actual transmission in the corresponding transmission scheme.

In LTE/LTE-A, RI, PMI, and CQI, which are channel state information fed back by the UE, may be fed back periodically or aperiodically. When the base station is to aperiodically obtain channel state information about a specific UE, the base station may be configured to perform aperiodic feedback using the aperiodic feedback indicator (or channel state information request field or channel state information request information) contained in the downlink control information (DCI) about the UE. Further, if receiving the indicator configured to perform aperiodic feedback in the nth subframe, the UE may include aperiodic feedback information (or channel state information) in data transmission in the n+kth subframe and perform uplink transmission. Here, k is a parameter defined in the 3GPP LTE release 11 standards, and this is 4 for frequency division duplexing (FDD) and may be defined as shown in Table 8 below for time division duplexing (TDD).

TABLE 8 k for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, feedback information (or channel state information) may include RI, PMI, and CQI, and RI and PMI may not be fed back depending on feedback configuration (or channel state report configuration).

In the disclosure, same-band (in-band) full-duplex (hereinafter, simply "full-duplex") system refers to a system in which an uplink signal and a downlink signal may be simultaneously transmitted in the same band, same time resource, unlike the time division duplexing (TDD) or frequency division duplexing (FDD) system. In other words, in the full-duplex system, uplink and downlink signals may be mixed in the same cell, causing interference. In this case, the operation of the same-band full-duplex system may include uplink or downlink alone as necessary or may include both uplink and downlink. Further, transmission interference in the same-band full-duplex system may include leakage due to signals, as well as signals transmitted in the band. Further, full-duplex operation (communication) may be performed only in some of the used bands and may be carried out over the entire band. It is described herein that in the full-duplex system, simultaneous transmission occurs in the transmission unit and reception unit belonging to one node (e.g., a base station, UE, or IAB node) but, although the transmission unit and the reception unit belong to different nodes, such simultaneous transmission includes full-duplex operation between the different nodes if information necessary for full-duplex operation may be shared through mutual information sharing.

Self-interference is further caused due to use of the full-duplex system.

The self-interference means interference caused at one node A when the node A receives a signal from another node B. In this case, the node may be a base station, UE, IAB, or one of other various communication entities. Although entities recognized as one node are physically separated, they may recognize as a single node if wiredly or wirelessly connected to share information with each other. If a base station includes a digital unit or distributed unit (DU) and at least one radio unit (RU), self-interference cancellation and measurement operation may be applied to interference caused between the RUs. According to the 3GPP NR standard, one or more DUs may be connected to a central unit (CU) that may communicate with the core network and be included in the base station. The RU is a unit for processing radio signals, and the DU is a unit for processing digital signals by communicating with the RU wiredly or wirelessly. Even when the uplink base station and the downlink base station are different from each other in the distributed MIMO operation, the self-interference cancellation and measurement operation may be applied.

Therefore, self-interference may be understood as interference between two different nodes that may share information with each other. Further, self-interference may include signals received in a different band as well as signals received in the same band. Self-interference may also include out-of-band radiations caused by signal transmission in other bands. Since self-interference causes transmission and reception in a short distance as compared with a desired signal, it significantly reduces signal-to-interference and noise ratio (SINR) of the desired signal. Therefore, the transmission performance of the full-duplex system is greatly affected by the performance of self-interference cancellation technology.

Figure 6A:
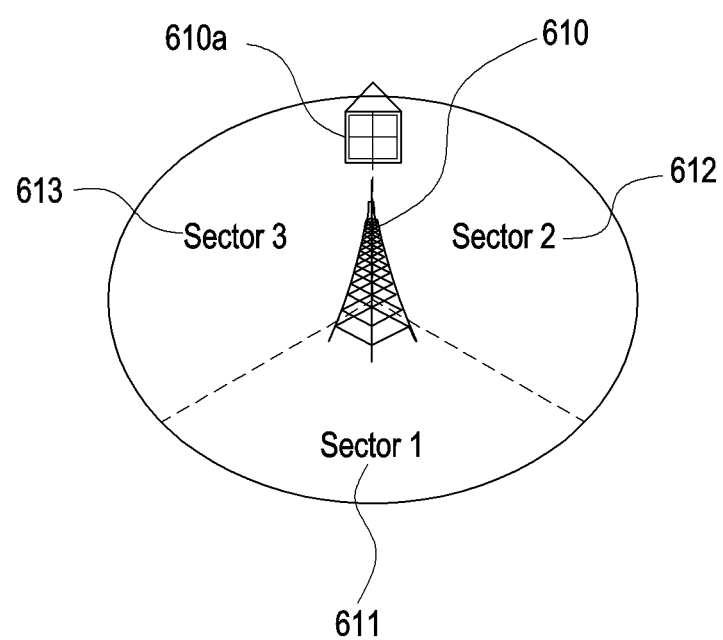
FIG. 6A is a view illustrating a base station configures a plurality of sectors according to an embodiment of the disclosure.

FIG. 6A is a view illustrating a base station configures a plurality of sectors according to an embodiment of the disclosure.

In the disclosure, when a plurality of cells are configured through a plurality of different directional antenna panels in one base station, each cell may be referred to as a sector.

Referring to FIG. 6A, it illustrates an example in which one base station 610 configures three sectors 611, 612, and 613 through three directional antennas 610a. However, the number of sectors is not limited to 3 as shown in FIG. 6A. Although belonging to the same base station, sectors facing geometrically in different positions or directions may be considered as different sectors.

Figure 6B:
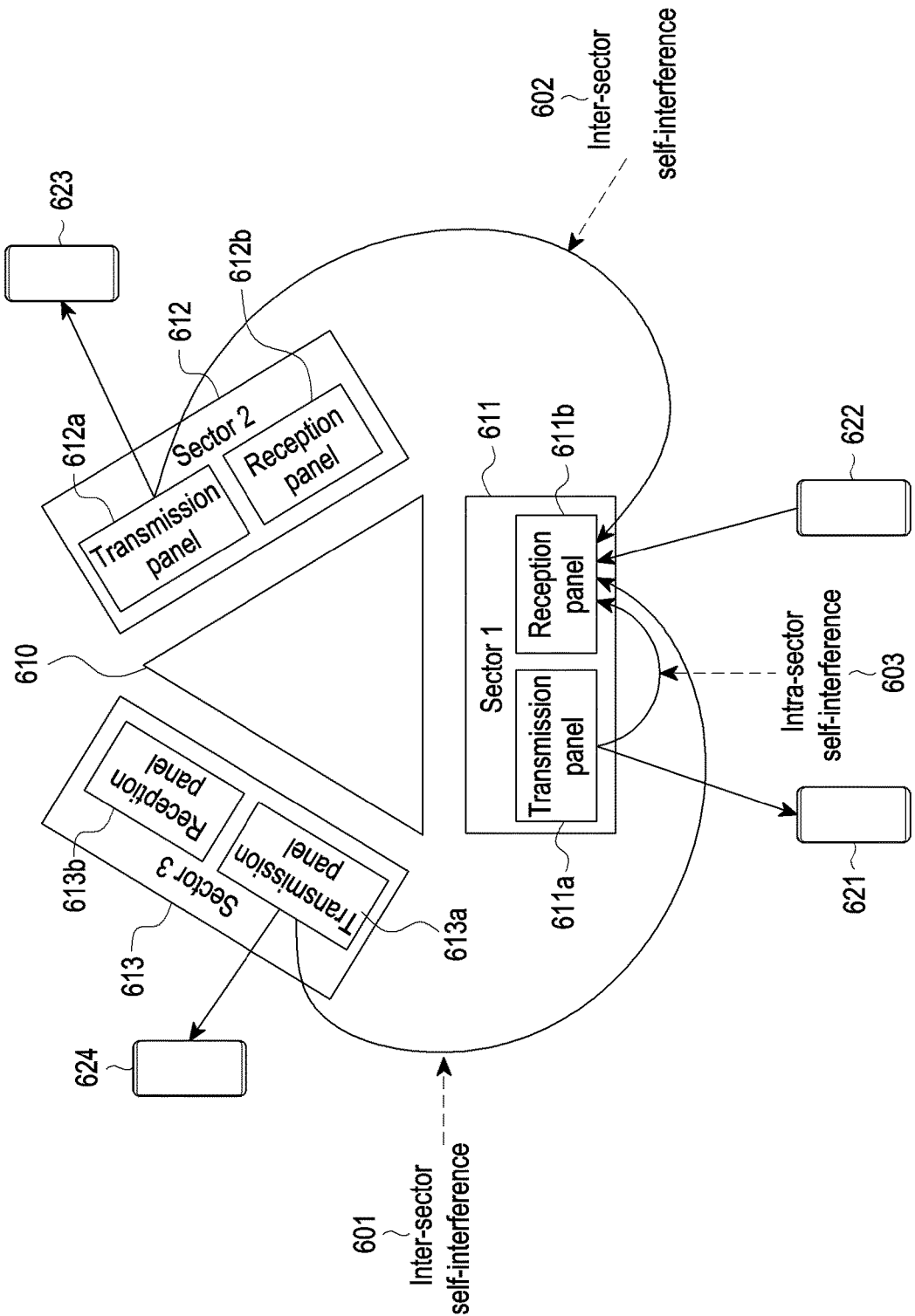
FIG. 6B is a view illustrating self-interference that occurs when a user equipment (UE) performs uplink transmission while a base station performs downlink transmission to the UE in each sector according to an embodiment of the disclosure.
Figure 6C:
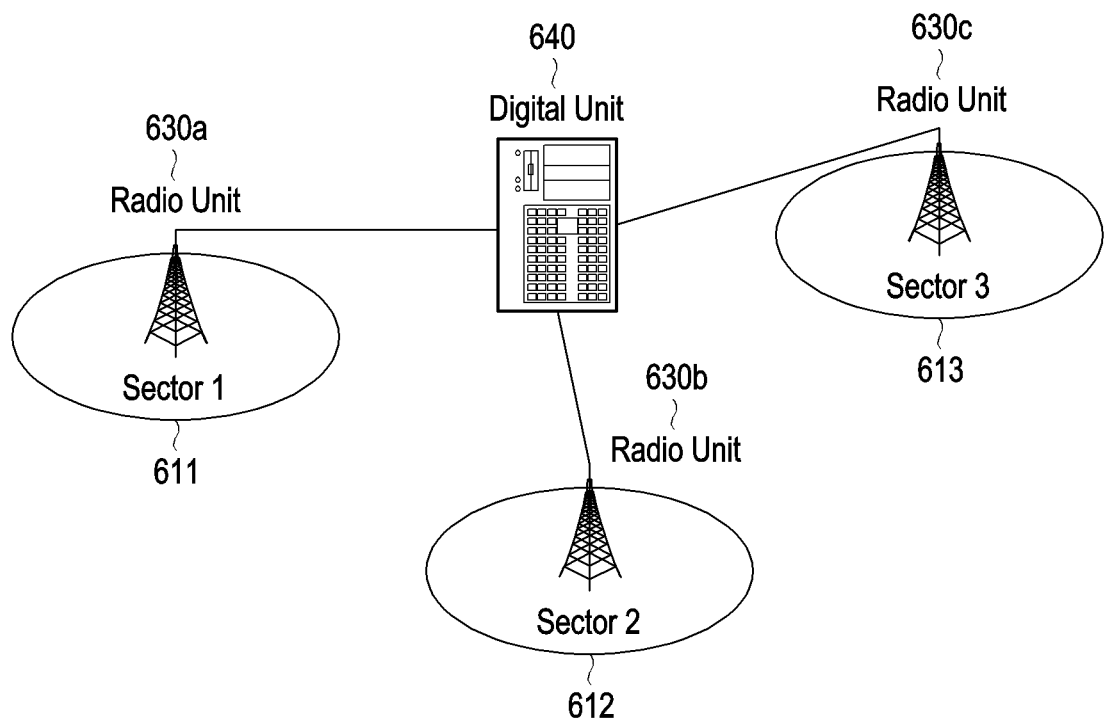
FIG. 6C is a view illustrating a sector in multiple radio units (Rus) sharing one digital unit (DU) according to an embodiment of the disclosure.

FIG. 6C is a view illustrating a sector in multiple RUs sharing one DU according to an embodiment of the disclosure.

Referring to FIG. 6C, if there are a plurality of radio units (RUs) 630a, 630b, and 630c in different positions to share one digital unit (DU) 640 as exemplified in FIG. 6C, the cell configured by each RU 630a, 630b, or 630c may be referred to as a sector 611, 612, or 613. As another example, the base station may be configured so that each RU has a DU, rather than one DU being shared by multiple RUs constituting multiple sectors (or cells). In this case, signaling may be performed to share information related to self-interference cancellation between the DUs individually connected to the multiple RUs.

In the disclosure, it is assumed that one base station is configured with three sectors for convenience of description.

FIG. 6B is a view illustrating self-interference caused at sector 1 when a UE in sector 1 performs uplink transmission while a base station performs downlink transmission to the UE in each sector according to an embodiment of the disclosure.

FIG. 6B also illustrates an example in which a base station 610 performs full-duplex communication with multiple UEs 621, 622, 623, and 624 using multiple antenna panels including transmission panels 611a, 612a, and 613a and reception panels 611b, 612b, and 613b in multiple sectors 611, 612, and 613 according to an embodiment of the disclosure.

Referring to FIG. 6B, the base station 610 may configure beams using antenna elements constituting the transmission panels 611a, 612a, and 613a in the sectors 611, 612, and 613 and provide services to the UEs 621, 622, 623, and 624. The UEs 621, 622, 623, and 624 may perform transmission/reception with the base station 610 through different beams depending on influence by, e.g., radio channels or relative positions from the base station 610.

In the disclosure, self-interference may be divided into two types: intra-sector self-interference and inter-sector self-interference.

Intra-sector self-interference means self-interference caused in the same sector.

Referring to FIG. 6B, intra-sector self-interference 603 may be interference with the reception unit of sector 1 611 by the transmission signal from the transmission unit of sector 1 611 and is self-interference that is caused when the full-duplex system is used in the same sector.

Inter-sector self-interference means self-interference caused from an adjacent sector in one/same base station.

Referring to FIG. 6B, inter-sector self-interference 601 and 602 means interference with the reception unit of sector 1 611 by the transmission signal from the transmission unit of sector 2 612 or sector 3 613. This is self-interference that may occur even when no full-duplex system is used in the sector.

Referring to FIG. 6B, the transmission unit and the reception unit may be understood as the transmission unit and reception unit of the base station 610.

Types of full-duplex systems in cellular-based mobile communication systems may come in two types: one in which only the base station supports self-interference cancellation for supporting full-duplex operation and the other in which both the base station and the UE support self-interference cancellation. Self-interference cancellation is not considered for the UE because of ease of implementation of separation self-interference cancellation, RF-circuit self-interference cancellation, and digital self-interference cancellation, as are described below, in light of the form factor size and circuit structure.

Figure 7:
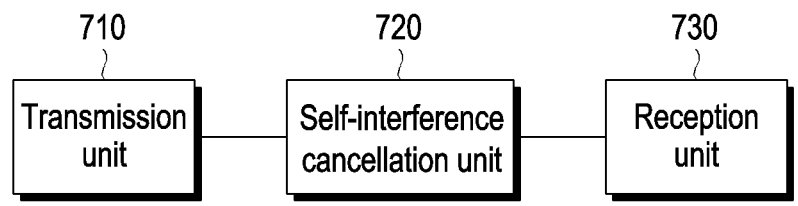
FIG. 7 is a view illustrating a configuration of a communication device having a self-interference cancellation function according to an embodiment of the disclosure.

FIG. 7 is a view illustrating a configuration of a communication device having a self-interference cancellation function according to an embodiment of the disclosure.

Referring to FIG. 7, the configuration of the communication device 700 in FIG. 7 is equally applicable to the base station and the UE without limited to either the base station or the UE. As the full-duplex system configured in the disclosure has the base station equipped with self-interference cancellation, the communication device 700 of FIG. 7 is assumed to be a base station in describing embodiments for convenience of description.

Referring to FIG. 7, the communication device 700 may correspond to a base station. The base station may include a transmission unit 710 for transmitting downlink signals to a UE, a self-interference cancellation unit 720 for self-interference cancellation, and a reception unit 730 for receiving uplink signals from the UE. In this case, the detailed method for configuring each component in the base station 700 may vary depending on how to implement the base station. Similarly, the communication device 700 of FIG. 7 may correspond to a UE. The UE may include a transmission unit 710 for transmitting uplink signals to the base station, a self-interference cancellation unit 720 for self-interference cancellation, and a reception unit 730 for receiving downlink signals from the base station.

Referring to FIG. 7, the transmission unit 710 and the reception unit 730 may be referred to as transmitter and receiver, respectively, and the transmitter and the receiver may be implemented as a transceiver for performing transmission and reception functions. The transceiver may perform both transmission and reception depending on the full-duplex operation. The transceiver may include a plurality of antenna panels described below. The self-interference cancellation unit 720 may be implemented in a processor that controls the operations of the base station or UE, related to self-interference cancellation, according to various embodiments described below. The base station or UE which does not perform self-interference cancellation may be implemented to include a transceiver for transmission/reception and a processor to control the operation of the transceiver as does a typical communication device.

Figure 8A:
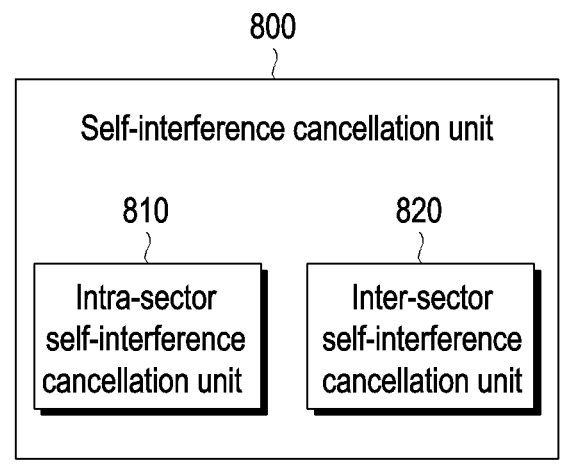
FIG. 8A is a view illustrating a configuration of a self-interference cancellation unit in a communication device according to an embodiment of the disclosure.

FIG. 8A is a view illustrating a configuration of a self-interference cancellation unit in a communication device according to an embodiment of the disclosure.

Referring to FIG. 8A, the self-interference cancellation unit 800 is an example of a configuration of the self-interference cancellation unit 720 of FIG. 7. The self-interference cancellation unit 800 may perform the above-described self-interference cancellation in the base station or UE. The self-interference cancellation unit 800 may include at least one of an intra-sector self-interference cancellation unit 810 for canceling intra-sector self-interference in the same sector and an inter-sector self-interference cancellation unit 820 for canceling inter-sector self-interference between different sectors.

Figure 8B:
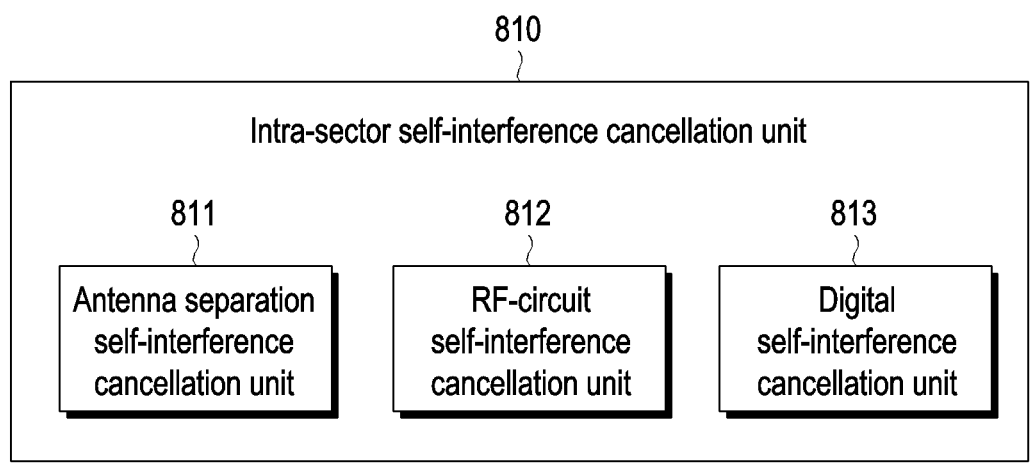
FIG. 8B is a view illustrating a configuration of an intra-sector self-interference cancellation unit according to an embodiment of the disclosure.

FIG. 8B is a view illustrating a configuration of an intra-sector self-interference cancellation unit according to an embodiment of the disclosure.

Referring to FIG. 8B, the intra-sector self-interference cancellation unit 810 is an example of a configuration of the intra-sector self-interference cancellation unit 810 of FIG. 8A.

The intra-sector self-interference cancellation unit 810 may include an antenna separation self-interference cancellation unit 811, an RF-circuit self-interference cancellation unit 812, and a digital self-interference cancellation unit 813. However, the configuration of the intra-sector self-interference cancellation unit 810 is not limited to those described above.

Figure 8C:
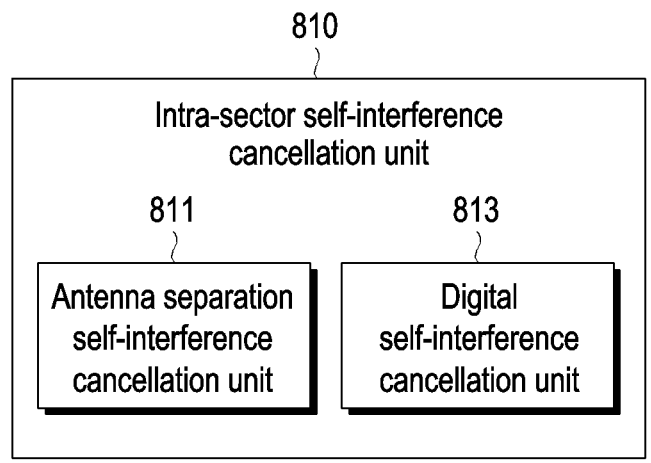
FIG. 8C is a view illustrating a configuration of an intra-sector self-interference cancellation unit according to an embodiment of the disclosure.

FIG. 8C is a view illustrating a configuration of an intra-sector self-interference cancellation unit according to an embodiment of the disclosure.

Referring to FIG. 8C, the intra-sector self-interference cancellation unit 810 may include an antenna separation self-interference cancellation unit 811 and a digital self-interference cancellation unit 813, excluding the RF-circuit self-interference cancellation unit 812 from the configuration of the intra-sector self-interference cancellation unit 810 of FIG. 8B. Although not shown, the antenna separation self-interference cancellation unit 811 may also be excluded from the intra-sector self-interference cancellation unit 810 as necessary. The communication device 700 may perform transmission/reception without operating the self-interference cancellation unit 800 as necessary.

Described below are operations of the antenna separation self-interference cancellation unit 811, RF-circuit self-interference cancellation unit 812, and digital self-interference cancellation unit 813.

The antenna separation self-interference cancellation unit 811 may physically separate the antennas of the transmitter and receiver of the base station so that signals with sufficiently attenuated intra-sector self-interference are received by the receiver of the base station. Physically separating the antenna of the transmitter and the antenna of the receiver in the base station may mean separating the antenna of the transmitter and the antenna of the receiver using a separation method using destructive interference of antennas, a method using a cycler in the same antenna, a method using a cross-pole antenna, or a method using an isolator to allow the downlink signal from the transmitter of the base station to be received by the receiver, which receives uplink signals, with reduced interference influence. However, the physical separation is not limited to the enumerated examples but may rather adopt other various separation methods capable of reducing interference influence on the uplink signal by the downlink signal from the base station.

The RF-circuit self-interference cancellation unit 812 may attenuate the strength of the self-interference signal before the intra-sector self-interference signal is quantified with an analog-to-digital converter (ADC) (not shown) connected with the RF circuit of the communication device 700. The RF circuit of the RF-circuit self-interference cancellation unit 812 may simulate the channel that was experienced by the intra-sector self-interference signal which is the self-interference signal transmitted from the transmitter of the base station, passing through the radio channel and the antenna separation self-interference cancellation unit 811, and arriving at the RF-circuit self-interference cancellation unit 812.

For example, the reception signal y(t), which passes through the antenna separation self-interference cancellation unit 811 and the radio channel, for the analog domain transmission signal x(t) of the base station may be expressed as in Equation 1 below.

$$y(t)=x(t)h(t)+n(t) \quad \text{Equation 1}$$

In Equation 1, h(t) denotes the time domain impulse response of the radio channel and the antenna separation self-interference cancellation unit 811, and n(t) denotes white noise. In this case, the RF circuit of the RF-circuit self-interference cancellation unit 812 may generate a pseudo channel h'(t) (i.e., self-interference channel) that simulates h(t), using a time delay module, a phase shift module, or an amp module. Thereafter, the transmission signal x(t) obtainable from the transmitter of the base station may be rendered to pass through the RF circuit, simulating the self-interference signal. Thereafter, the simulated self-interference signal is added with the minus sign and is added to the received self-interference signal and, resultantly, attenuates the intra-sector self-interference signal as in Equation 2 below.

$$y'(t)=x(t)h(t)-x(t)h'(t)+n(t) \quad \text{Equation 2}$$

The bandwidth where the performance of the RF-circuit self-interference cancellation unit 812 is maintained may vary depending on the bandwidth of the above-described components of the RF circuit, e.g., the time delay module, phase shift module, or amp module. For example, if the bandwidth where the performance of the RF-circuit self-interference cancellation unit 812 of the RF circuit is smaller than the system bandwidth, such a limit to the bandwidth of the RF-circuit self-interference cancellation unit 812 comes from limitations in the analog circuit.

The digital self-interference cancellation unit 813 may cancel the self-interference signal X[n] from signal Y[n] which is the frequency-domain signal into which signal y'(t) having passed through the RF-circuit self-interference cancellation unit 812 (or the antenna separation self-interference cancellation unit 811) is converted by the ADC. For example, as in Equation 3 below, the digital domain channel H[n] experienced by transmission signal X[n] is estimated and subtracted from reception signal Y[n]. In this case, the performance of the digital self-interference cancellation unit 813 is determined by the similarity between the estimated channel H'[n] and the actual channel H[n]. In other words, as the similarity between H'[n] and H[n] increases, the performance of the digital self-interference cancellation unit 813 increases. In Equation 3 below, Y'[n] denotes the estimated reception signal freed from intra-sector self-interference.

$$Y'[n]=X[n]H[n]-X[n]H'[n]+n(t) \quad \text{Equation 3}$$

Figure 8D:
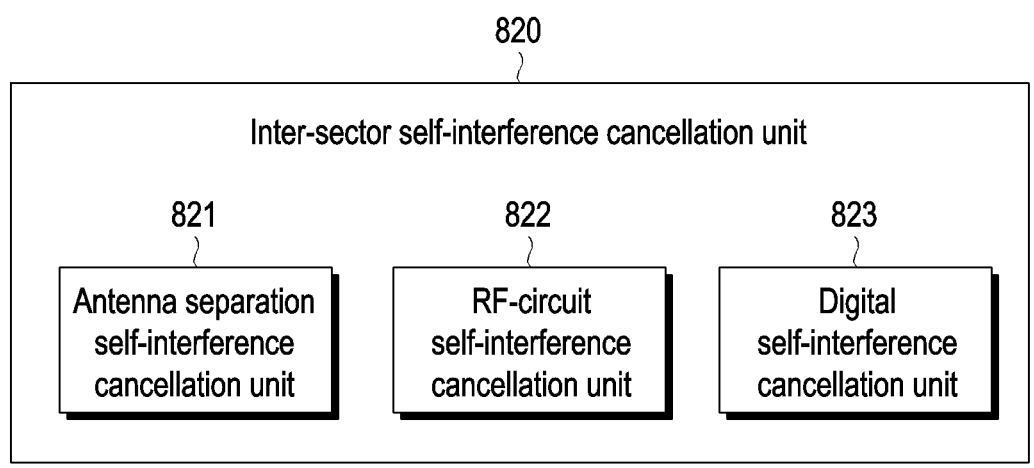
FIG. 8D is a view illustrating a configuration of an inter-sector self-interference cancellation unit according to an embodiment of the disclosure.

FIG. 8D is a view illustrating a configuration of an inter-sector self-interference cancellation unit according to an embodiment of the disclosure.

Referring to FIG. 8D, the inter-sector self-interference cancellation unit 820 is an example of a configuration of the inter-sector self-interference cancellation unit 820 of FIG. 8A.

The inter-sector self-interference cancellation unit 820 may include an antenna separation self-interference cancellation unit 821, an RF-circuit self-interference cancellation unit 822, and a digital self-interference cancellation unit 823. However, the configuration of the inter-sector self-interference cancellation unit 820 is not limited to those described above.

Figure 8E:
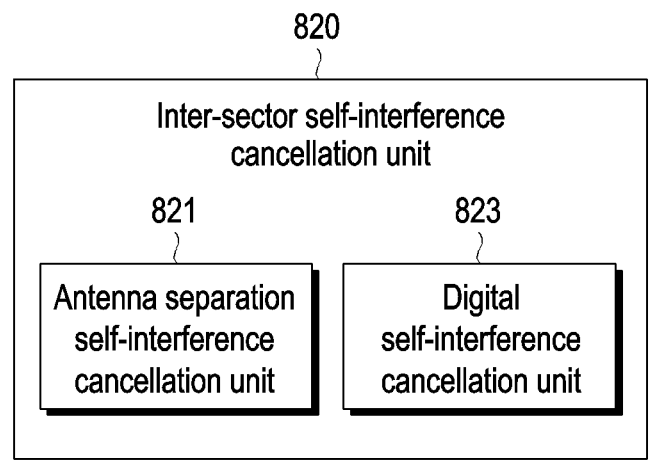
FIG. 8E is a view illustrating a configuration of an inter-sector self-interference cancellation unit according to an embodiment of the disclosure.

FIG. 8E illustrates a configuration of an inter-sector self-interference cancellation unit according to an embodiment of the disclosure.

Referring to FIG. 8E, the inter-sector self-interference cancellation unit 820 may include an antenna separation self-interference cancellation unit 821 and a digital self-interference cancellation unit 823, excluding the RF-circuit self-interference cancellation unit 822 from the configuration of the inter-sector self-interference cancellation unit 820 of FIG. 8B. Although not shown, the antenna separation self-interference cancellation unit 821 may also be excluded from the inter-sector self-interference cancellation unit 820 as necessary. The communication device 700 may perform transmission/reception without operating the self-interference cancellation unit 800 as necessary.

Described below are operations of the antenna separation self-interference cancellation unit 821, RF-circuit self-interference cancellation unit 822, and digital self-interference cancellation unit 823.

The antenna separation self-interference cancellation unit 821 may physically separate the antennas of the transmitter and receiver of the base station so that signals with sufficiently attenuated inter-sector self-interference are received by the receiver of the base station. Physically separating the antenna of the transmitter and the antenna of the receiver in the base station may mean separating the antenna of the transmitter and the antenna of the receiver using a separation method using destructive interference of antennas, a method using a cycler in the same antenna, a method using a cross-pole antenna, or a method using an isolator to allow the downlink signal from the transmitter of the base station to be received by the receiver, which receives uplink signals, with reduced interference influence. However, the physical separation is not limited to the enumerated examples but may rather adopt other various separation methods capable of reducing interference influence on the uplink signal by the downlink signal from the base station.

The RF-circuit self-interference cancellation unit 822 may attenuate the strength of the signal before the inter-sector self-interference signal is quantified with an ADC connected with the RF circuit of the communication device 700. The RF circuit of the RF-circuit self-interference cancellation unit 822 may simulate the channel that was experienced by the inter-sector self-interference signal which is the self-interference signal transmitted from the transmitter of the base station, passing through the radio channel and the antenna separation self-interference cancellation unit 821, and arriving at the RF-circuit self-interference cancellation unit 822.

For example, after the intra-sector self-interference is canceled from the analog domain transmission signal p(t) in the adjacent sector of the base station, the reception signal q(t) passing through the antenna separation self-interference cancellation unit 821 and the radio channel may be expressed as in Equation 4 below. In Equation 4, since the transmission signal is a signal transmitted to the adjacent sector, the parameters of the transmission signal and the reception signal are expressed as p(t) and q(t), respectively, to be distinguished from Equation 1.

$$q(t)=p(t)c(t)+n(t) \qquad \text{Equation 4}$$

In Equation 4, c(t) denotes the time domain impulse response of the radio channel and the antenna separation self-interference cancellation unit 821, and n(t) denotes white noise. In this case, the RF circuit of the RF-circuit self-interference cancellation unit 822 may generate a pseudo channel c'(t) (i.e., self-interference channel) that simulates c(t), using a time delay module, a phase shift module, or an amp module. Thereafter, the transmission signal p(t) obtainable from the transmitter of the base station may be rendered to pass through the RF circuit, simulating the self-interference signal. Thereafter, the simulated self-interference signal is added with the minus sign and is added to the received self-interference signal and, resultantly, attenuates the inter-sector self-interference signal as in Equation 5 below.

$$q'(t)=p(t)c(t)-p(t)c'(t)+n(t) \qquad \text{Equation 5}$$

The bandwidth where the performance of the RF-circuit self-interference cancellation unit 822 is maintained may vary depending on the bandwidth of the above-described components of the RF circuit, e.g., the time delay module, phase shift module, or amp module. For example, if the bandwidth where the performance of the RF-circuit self-interference cancellation unit 822 of the RF circuit is smaller than the system bandwidth, such a limit to the bandwidth of the RF-circuit self-interference cancellation unit 822 comes from limitations in the analog circuit.

The digital self-interference cancellation unit 823 may cancel the self-interference signal P[n] from signal Q[n] which is the frequency-domain signal into which signal q'(t) having passed through the RF-circuit self-interference cancellation unit 822 (or the antenna separation self-interference cancellation unit 821) is converted by the ADC. For example, as in Equation 6 above, the digital domain channel C[n] experienced by transmission signal P[n] is estimated and subtracted from reception signal Q[n]. In this case, the performance of the digital self-interference cancellation unit 823 is determined by the similarity between the estimated channel C'[n] and the actual channel C[n]. In other words, as the similarity between C'[n] and C[n] increases, the performance of the digital self-interference cancellation unit 823 increases. In Equation 6 below, Q'[n] denotes the estimated reception signal freed from inter-sector self-interference.

$$Q'[n]=P[n]C[n]-P[n]C'[n]+n(t) \qquad \text{Equation 6}$$

In the disclosure, although inter-sector self-interference cancellation is described as if it is performed once as an example, it may be performed as many times as the number of the adjacent sectors in the same manner. Further, although it is described that inter-sector self-interference cancellation is performed after intra-sector self-interference cancellation as an example, the order of self-interference cancellation is not limited thereto.

Figure 8F:
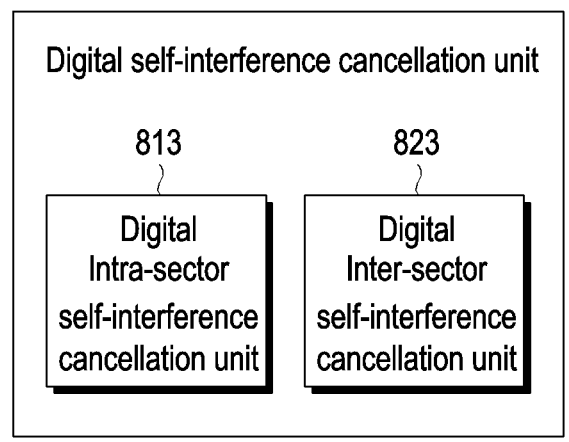
FIG. 8F is a view illustrating a configuration of a digital self-interference cancellation unit including an intra-sector digital self-interference cancellation unit and an inter-sector digital self-interference cancellation unit according to an embodiment of the disclosure.

FIG. 8F is a view illustrating a configuration of a digital self-interference cancellation unit including an intra-sector digital self-interference cancellation unit and an inter-sector digital self-interference cancellation unit according to an embodiment of the disclosure.

Referring to FIG. 8F, the intra-sector digital self-interference cancellation unit 813 for intra-sector self-interference cancellation in FIG. 8B and the inter-sector digital self-interference cancellation unit 823 for inter-sector self-interference cancellation in FIG. 8D may be implemented to be included in a digital self-interference cancellation unit so that intra-sector self-interference cancellation and inter-sector self-interference cancellation are performed selectively, sequentially, or in parallel.

Hereinafter, embodiments of the disclosure are described with reference to the accompanying drawings. Further, although LTE or LTE-A system is described in connection with embodiments of the disclosure, as an example, embodiments may also apply to other communication systems with similar technical background or channel form. For example, communication systems to which embodiments are applied may include post-LTE-A, 5G mobile communication technology (e.g., 5G or new radio (NR)). Further, embodiments may be modified in such a range as not to significantly depart from the scope of the disclosure under the determination by one of ordinary skill in the art and such modifications may be applicable to other communication systems.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Embodiment 1

Embodiment 1 of the disclosure relates to a method for performing full-duplex communication when a base station configures a beam using multiple antenna elements and provides a UE with a communication service using the beam.

Figure 9:
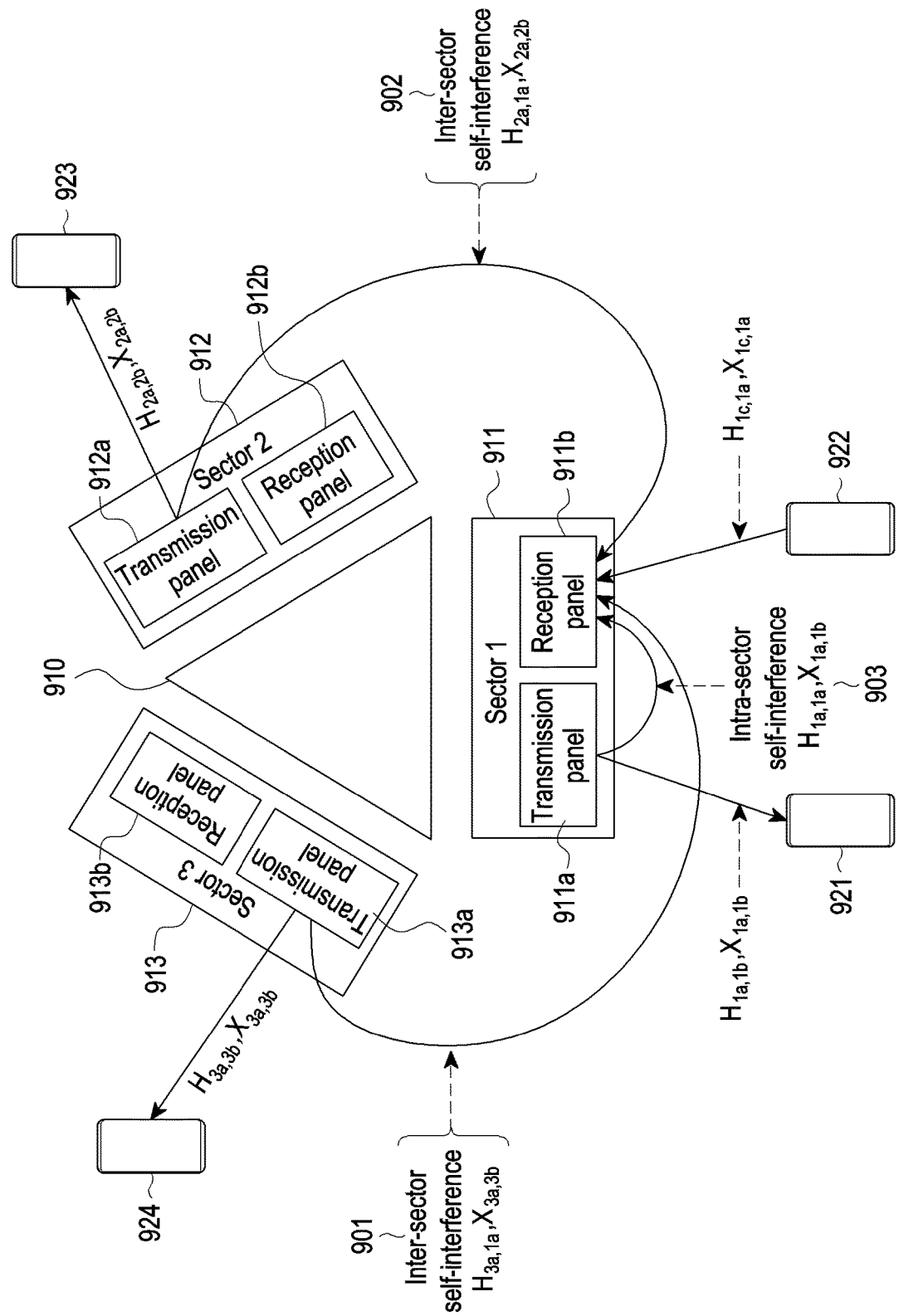
FIG. 9 is a view illustrating a base station performs full-duplex communication with a plurality of UEs using a plurality of antenna panels in a plurality of sectors according to an embodiment of the disclosure.

FIG. 9 is a view illustrating a base station performs full-duplex communication with a plurality of UEs using a plurality of antenna panels in a plurality of sectors according to an embodiment of the disclosure.

FIG. 9 also illustrates a base station 910 performs full-duplex communication with multiple UEs 921, 922, 923, and 924 using multiple antenna panels including transmission panels 911a, 912a, and 913a and reception panels 911b, 912b, and 913b in multiple sectors 911, 912, and 913 according to an embodiment of the disclosure. The base station 910 may form beams using antenna elements constituting the transmission panels 911a, 912a, and 913a in the sectors 911, 912, and 913 and provide services to the UEs 921, 922, 923, and 924. The UEs 921, 922, 923, and 924 may perform transmission/reception with the base station 910 through different beams depending on influence by, e.g., radio channels or relative positions from the base station 910. Accordingly, when the UEs 921, 922, 923, and 924 and the base station 910 communicate with each other, they may perform transmission/reception using beams appropriate for, e.g., variations in channel.

Referring to FIG. 9, the base station 910 transmits a downlink signal to each UE 921, 923, and 924 connected to a corresponding sector 911, 912, and 913 while receiving an uplink signal from the UE 922 in sector 1 911.

Referring to sector 1 911 in the example of FIG. 9, the signal transmitted from sector 1 911 of the base station 910 to the UE 921 is $X\_(1a, 1b)$, and the channel $H\_(1a, 1b)$ is a channel between the UE 921 and sector 1 911 of the base station 910. In this case, the channel $H\_(1a, 1b)$ is a channel including the influence by the transmit beam formed using the transmission panel 911a by the base station 910 and the influence by the receive beam formed by the UE 921. Accordingly, if the UE 921 changes the beam or the base station 910 changes the beam of sector 1 911, the channel $H\_(1a, 1b)$ is rendered to have a different value. It may also have different values depending on changes in channel environment between the base station 910 and the UE 921, e.g., changes in air temperature, humidity, reflector, position between the UE 921 and the base station 910, and the angle of the antenna of the UE 921.

Referring to FIG. 9, the signal and channel transmitted from sector 2 912 of the base station 910 to the UE 923 are expressed as $X\_(2a, 2b)$ and $H\_(2a, 2b)$, respectively, and the signal and channel transmitted from sector 3 913 to the UE 924 are expressed as $X\_(3a, 3b)$ and $H\_(3a, 3b)$, respectively.

Referring to FIG. 9, the signal transmitted from the UE 922 to sector 1 911 of the base station 910 is $X\_(1c, 1a)$, and the channel $H\_(1c, 1a)$ is a channel between the UE 922 and sector 1 911 of the base station 910. In this case, the channel $H\_(1c, 1a)$ is a channel including the influence by the receive beam formed using the reception panel 911b by sector 1 911 of the base station 910 and the influence by the transmit beam formed by the UE 922. Accordingly, if the UE 922 changes the beam or the base station 910 changes the beam of sector 1 911, the channel $H\_(1c, 1a)$ is rendered to have a different value. It may also have different values depending on changes in channel environment between the base station 910 and the UE 922, e.g., changes in air temperature, humidity, reflector, position between the UE 922 and the base station 910, and the angle of the antenna of the UE 922.

Referring to FIG. 9, the channel of the intra-sector self-interference 903 caused when the reception panel 911b of sector 1 911 receives the signal transmitted from the transmission panel 911a of sector 1 911 of the base station 910 is denoted by $H\_(1a, 1a)$. In this case, the intra-sector self-interference channel $H\_(1a, 1a)$ is a channel including the influence by the receive beam formed using the reception panel 911b by sector 1 911 of the base station 910 and the influence by the transmit beam formed using the transmission panel 911a by the base station 910. Accordingly, if the base station 910 changes the transmit beam of sector 1 911 or the base station 910 changes the receive beam of sector 1 911, the channel $H\_(1a, 1a)$ is rendered to have a different value. Further, the channel $H\_(1a, 1a)$ may have different values depending on changes in channel environment between the transmission panel 911a and reception panel 911b of the base station 910, e.g., changes in air temperature, humidity, reflector, or position of the base station 910.

Referring to FIG. 9, the channel of the inter-sector self-interference 902 experienced upon reception from the transmission channel 912a of sector 2 912 of the base station 910 to the reception panel 911b of sector 1 911 is denoted by $H\_(2a, 1a)$. Similarly, the channel of the inter-sector self-interference caused upon receiving the signal from the transmission panel 913a of sector 3 913 of the base station 910 by the reception panel 911b of sector 1 911 is denoted by $H\_(3a, 1a)$. In this case, the channels $H\_(2a, 1a)$ and $H\_(3a, 1a)$ of the inter-sector self-interference 902 and 901 are channels including the influence of the receive beam formed using the reception panel 911b of sector 1 911 by the base station 910 and the influence by the transmit beam formed using the transmission panel 912a or 913a of sector 2 912 or sector 3 913 by the base station 910. Accordingly, if the base station 910 changes the transmit beam of sector 2 912 or sector 3 913 or the base station 910 changes the receive beam of sector 1 911, the channels $H\_(2a, 1a)$ and $H\_(3a, 1a)$ are rendered to have different values. Further, the channel $H\_(2a, 1a)$ or $H\_(3a, 1a)$ may have different values depending on changes in channel environment between the transmission panel 912a or 913a and reception panel 911b of the base station 910, e.g., changes in air temperature, humidity, reflector, or position of the base station 910.

Referring to FIG. 9, the intra-sector self-interference signal received by the base station 910 is denoted by $H\_(1a, 1a)X\_(1a, 1b)$ using the signal $X\_(1a, 1b)$, which is a signal transmitted from sector 1 911, and the intra-sector self-interference channel, and the inter-sector self-interference signals are denoted by $H\_(2a, 1a)X\_(2a, 2b)$ and $H\_(3a, 1a)X\_(3a, 3b)$ using the signals $X(2a, 2b)$ and $X\_(3a, 3b)$, which are signals transmitted from sector 2 912 and sector 3 913, and the corresponding intra-sector self-interference channel. Although not shown, upon transmission to other UEs, transmit signals and self-interference channels may be changed into different values.

Referring to FIG. 9, an antenna panel is shown per sector in the base station 910 for convenience, one or more antenna panels may be operated for multiple sectors. Further, although three sectors for the base station 910 are configured for convenience, the methods described herein may be likewise applied regardless of the number of sectors.

Referring to FIG. 9, embodiment 1 considers the case where the base station transmits a downlink signal to one UE while receiving an uplink signal from another UE. However, the base station may consider the operation equally even when the UE to which the downlink signal is transmitted is identical to the UE from which the uplink signal is received.

Referring to FIG. 9, the transmission panel in each sector of the base station performs beamforming to fit for the physical channel between each sector of the base station and the UE. Similarly, the reception antenna of the UE performs beamforming according to the physical channel between itself and each sector of the base station.

The UE estimates the channel between the sector of the base station and the UE and performs decoding to receive signals from the sector of the base station. For example, in the example of FIG. 9, the UE 921 estimates the channel H_(1a, 1b) and decodes the downlink signal X_(1a, 1b). To that end, the base station 910 may transmit the downlink signal X_(1a, 1b) including a demodulation reference signal (DMRS) in sector 1 911. The UE 921 may estimate the channel H_(1a, 1b) using the DMRS.

Referring to FIG. 9, the reception panel in each sector of the base station performs beamforming to fit for the physical channel between each sector of the base station and the UE. Similarly, the transmission antenna of the UE performs beamforming according to the physical channel between itself and each sector of the base station.

The base station estimates the channel between the sector of the base station and the UE and performs decoding to receive signals from the UE in each sector of the base station.

Referring to FIG. 9, the base station 910 estimates the channel H_(1c, 1a) and decodes the uplink signal X_(1c, 1a). To that end, the UE 922 may transmit the uplink signal X_(1c, 1a) including a DMRS. The base station 910 may estimate the channel H_(1c, 1a) using the DMRS.

Figure 10A:
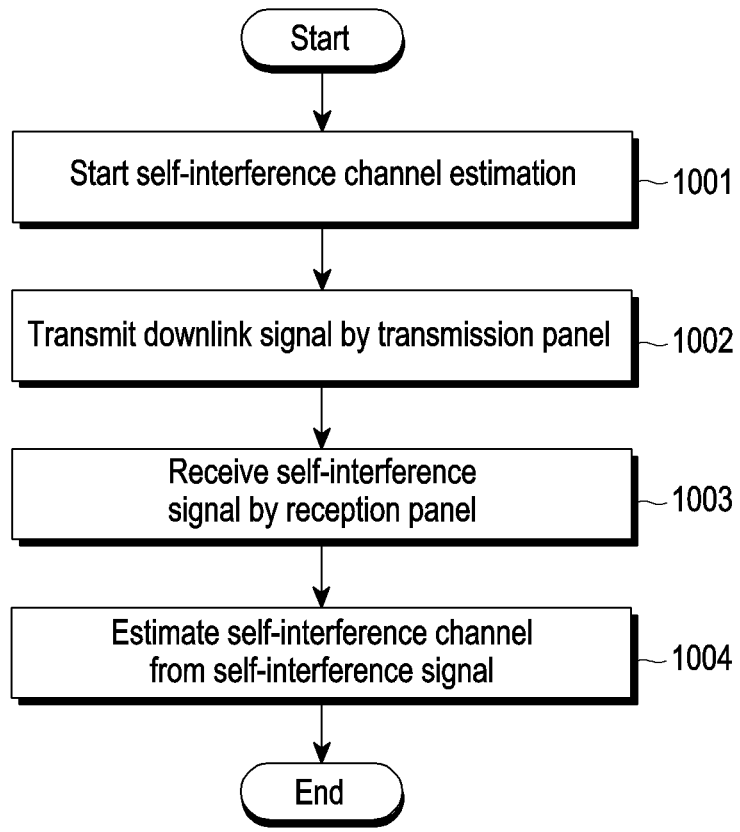
FIG. 10A is a view illustrating a method for estimating a self-interference channel by a base station performing full-duplex communication according to an embodiment of the disclosure.

FIG. 10A is a view illustrating a method for estimating a self-interference channel by a base station performing full-duplex communication according to an embodiment of the disclosure.

Referring to FIG. 10A, the base station may perform the above-described self-interference cancellation for supporting full-duplex communication to transmit a downlink signal to the UE in a first sector while receiving an uplink signal from the UE in the first sector in the same band (in-band). In this case, the base station may be transmitting a downlink signal to a UE in another sector, e.g., a second sector or a third sector. The self-interference cancellation may include at least one of intra-sector self-interference cancellation for canceling interference caused in the same sector and inter-sector self-interference cancellation for canceling interference caused between different sectors as described above in connection with FIG. 9. To that end, the base station may perform self-interference channel estimation.

Specifically, starting self-interference channel estimation in operation 1001, the base station transmits a downlink signal to the UE through the transmission panel of the first sector in operation 1002 while receiving a self-interference signal according to the downlink signal through the reception panel in the first sector or second sector in operation 1003. In operation 1004, the base station performs self-interference channel estimation based on the received self-interference signal. The self-interference channel estimation may include at least one of intra-sector self-interference channel estimation in the same sector and inter-sector self-interference channel estimation between different sectors. The estimated self-interference channel may be used for self-interference cancellation as described above in connection with Equations 2 and 3. In the disclosure, referring to Equation 3 above, the self-interference cancellation performance of the base station is proportional to the self-interference channel estimation performance.

Figure 10B:
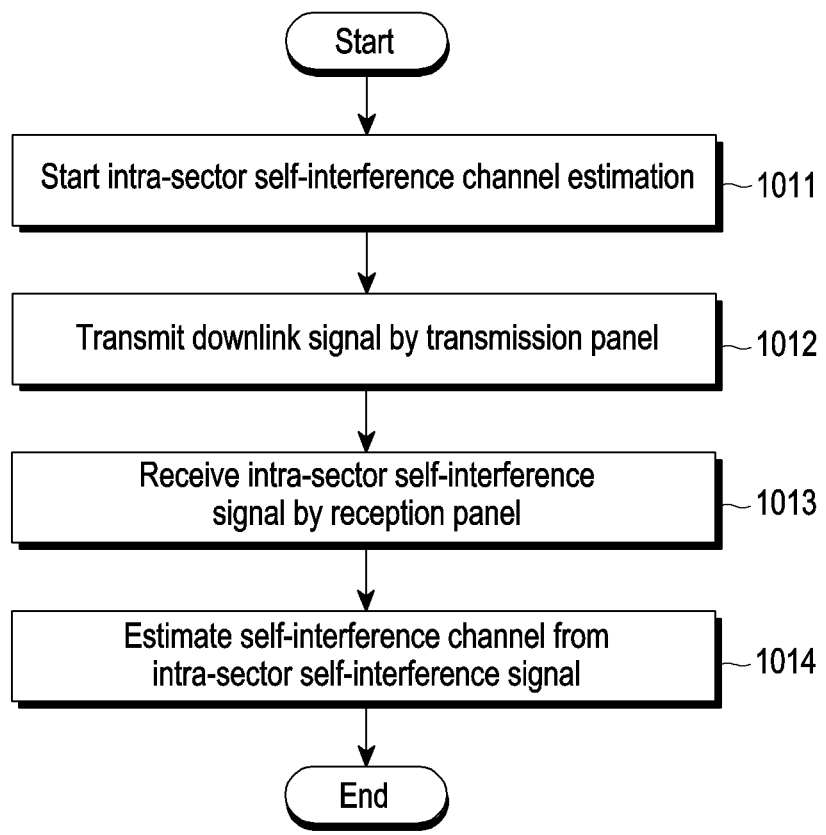
FIG. 10B is a view illustrating a method for estimating an intra-sector self-interference channel by a base station performing full-duplex communication according to an embodiment of the disclosure.

FIG. 10B is a view illustrating a method for estimating an intra-sector self-interference channel by a base station performing full-duplex communication according to an embodiment of the disclosure. The operation of FIG. 10B is described with reference to the configuration of FIG. 9.

Referring to FIG. 10B, the base station 910 may perform intra-sector self-interference cancellation as described above in connection with FIG. 9 to support full-duplex communication to transmit a downlink signal to the UE 921 in sector 1 911 while receiving an uplink signal from the UE 922 in the same sector, i.e., sector 1 911 in the same band. To that end, the base station 910 may perform intra-sector self-interference channel H_(1a, 1a) other than estimation of the uplink channel H_(1c, 1a) of the UE 922.

Specifically, starting intra-sector self-interference channel estimation in operation 1011, the base station 910 transmits a downlink signal to the UE 921 through the transmission panel 911a of sector 1 911 in operation 1012 while receiving an intra-sector self-interference signal according to the downlink signal through the reception panel 911b in sector 1 911 in operation 1013. In operation 1014, the base station 910 performs intra-sector self-interference channel estimation based on the received intra-sector self-interference signal. The estimated intra-sector self-interference channel may be used for intra-sector self-interference cancellation as described above in connection with Equations 2 and 3. In the disclosure, the performance of intra-sector self-interference cancellation in sector 1 911 of the base station 910 is proportional to the estimation performance of the intra-sector self-interference channel H_(1a, 1a) as described above in connection with Equation 3. Channel estimation is proportional to the SINR upon channel estimation as widely known.

Accordingly, if there is another signal for the position of self-interference channel estimation when the base station 910 receives the intra-sector self-interference signal, the SINR may reduce, causing performance deterioration. In other words, the performance of intra-sector self-interference channel estimation may be degraded if there is the uplink signal of the UE 922 shown in FIG. 9 in sector 1 911 of the base station 910 when intra-sector self-interference channel estimation is performed. Further, if another sector 912 or 913 has a UE transmitting an uplink signal, the performance of intra-sector self-interference channel estimation may be likewise deteriorated. Accordingly, if uplink transmission from the UE 922 in sector 1 911 (or transmission in some uplink resource in relation to intra-sector self-interference channel estimation) is muted upon intra-sector self-interference channel estimation by transmission of a downlink signal in sector 1 911 of the base station 910 as in the example of FIG. 9, the performance of self-interference channel estimation in the base station 910 may be further enhanced. Upon intra-sector self-interference channel estimation, uplink transmission from UEs in sector 2 and sector 3 912 and 913 may also be muted.

Figure 10C:
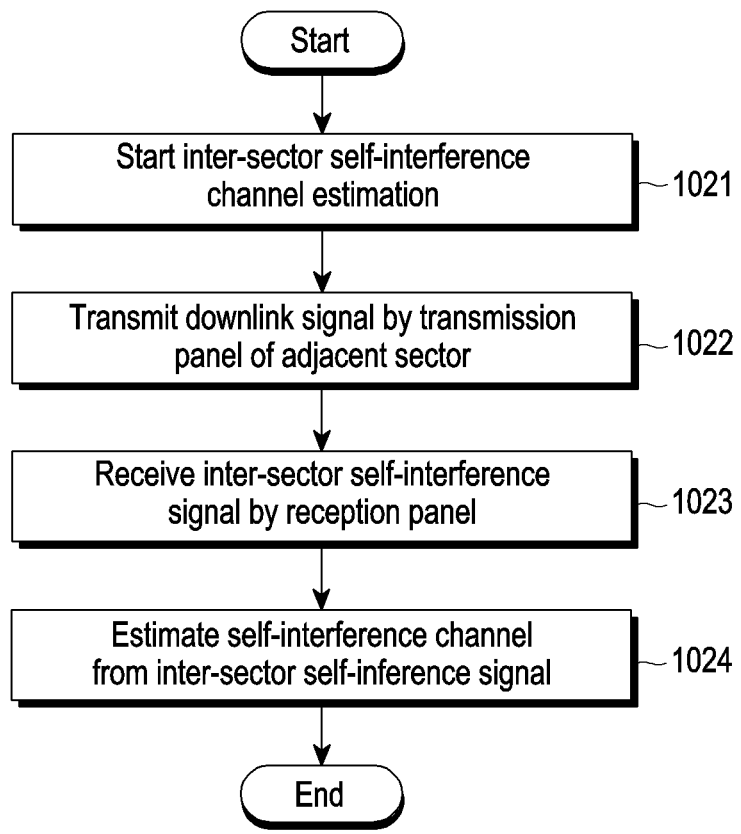
FIG. 10C is a view illustrating a method for estimating an inter-sector self-interference channel by a base station performing full-duplex communication according to an embodiment of the disclosure.

FIG. 10C is a view illustrating a method for estimating an inter-sector self-interference channel by a base station performing full-duplex communication according to an embodiment of the disclosure. The operation of FIG. 10C is described with reference to the configuration of FIG. 9.

Referring to FIG. 10C, the base station 910 may perform inter-sector self-interference cancellation as described above in connection with FIG. 9 to support full-duplex communication to transmit a downlink signal to the UE 923 and/or UE 924 in sector 2 912 and/or sector 3 913 while receiving an uplink signal from the UE 922 in sector 1 911. To that end, the base station 910 may perform inter-sector self-interference channel H_(2a, 1a) and/or H_(3a, 1a) other than estimation of the uplink channel H_(1c, 1a) of the UE 922.

Specifically, starting inter-sector self-interference channel estimation in operation 1021, the base station 910 transmits a downlink signal to the UE 923 and/or UE 924 through the transmission panel 912a and/or 913a of sector 2 912 and/or sector 3 913, which is a neighbor sector of sector 1 911, in operation 1022 while receiving an inter-sector self-interference signal according to the downlink signal through the reception panel 911b in sector 1 911 in operation 1023. In operation 1024, the base station 910 performs inter-sector self-interference channel estimation based on the received inter-sector self-interference signal. The estimated inter-sector self-interference channel may be used for inter-sector self-interference cancellation as described above in connection with Equations 2 and 3.

Referring to FIG. 9, the performance of canceling the inter-sector self-interference caused in sector 1 911 by the downlink signal in sector 2 912 and/or sector 3 913 is proportional to the performance of estimation of the inter-sector self-interference channel H_(2a, 1a) and/or H_(3a, 1a) as described above in connection with Equation 3. In this case, the channel estimation performance is also proportional to the SINR during channel estimation.

Accordingly, if there is another signal for the position of self-interference channel estimation when the base station 910 receives the inter-sector self-interference signal, the SINR may reduce, causing performance deterioration. In other words, the performance of inter-sector self-interference channel estimation may be degraded if there is the uplink signal of the UE 922 shown in FIG. 9 in sector 1 911 of the base station 910 when inter-sector self-interference channel estimation is performed. Further, if another sector 912 or 913 has a UE transmitting an uplink signal, the performance of inter-sector self-interference channel estimation may be likewise deteriorated. Accordingly, if uplink transmission from the UE 922 in sector 1 911 (or transmission in some uplink resource in relation to inter-sector self-interference channel estimation) is muted upon inter-sector self-interference channel estimation by transmission of a downlink signal in sector 2 912 and/or sector 3 913 of the base station 910 as in the example of FIG. 9, the performance of self-interference channel estimation in the base station 910 may be further enhanced. Upon inter-sector self-interference channel estimation, uplink transmission from UEs in sector 2 and sector 3 912 and 913 may also be muted.

Further, as shown in the example of FIGS. 9, 10A, 10B, and 10C, if there is inter-sector self-interference other than the uplink signal upon estimation of the intra-sector self-interference channel, the SINR may reduce, causing degradation of intra-sector self-interference channel estimation performance. Similarly, even when there is no uplink signal upon estimation of the inter-sector self-interference channel, if intra-sector self-interference or other inter-sector self-interference exists, the performance self-interference channel estimation may be deteriorated.

Referring to of FIG. 9, if there is inter-sector self-interference caused from sector 3 913 when estimating the channel of inter-sector self-interference caused from sector 2 912 in sector 1 911 of the base station 910, the SINR may decrease so that the performance of channel estimation may be lowered. Accordingly, to enhance the performance of channel estimation upon estimating intra-sector self-interference channel, a resource allocation considering inter-sector self-interference may be performed and, to enhance the performance of channel estimation upon estimating inter-sector self-interference channel, a resource allocation considering intra-sector self-interference may be conducted. In the disclosure, configuration information of the base station for the self-interference channel estimation interval may be provided from the base station to the UE(s) in each sector.

Embodiment 2

Embodiment 2 relates to a method for limiting uplink transmission in the symbol where self-interference channel estimation is performed and a method for selectively limiting downlink transmission between the sectors of a base station to enhance channel estimation performance when the base station estimates an intra-sector self-interference channel and an inter-sector self-interference channel. In this case, it is assumed for ease of description that all sectors have UEs performing uplink transmission in the example of FIG. 9.

Figure 11:
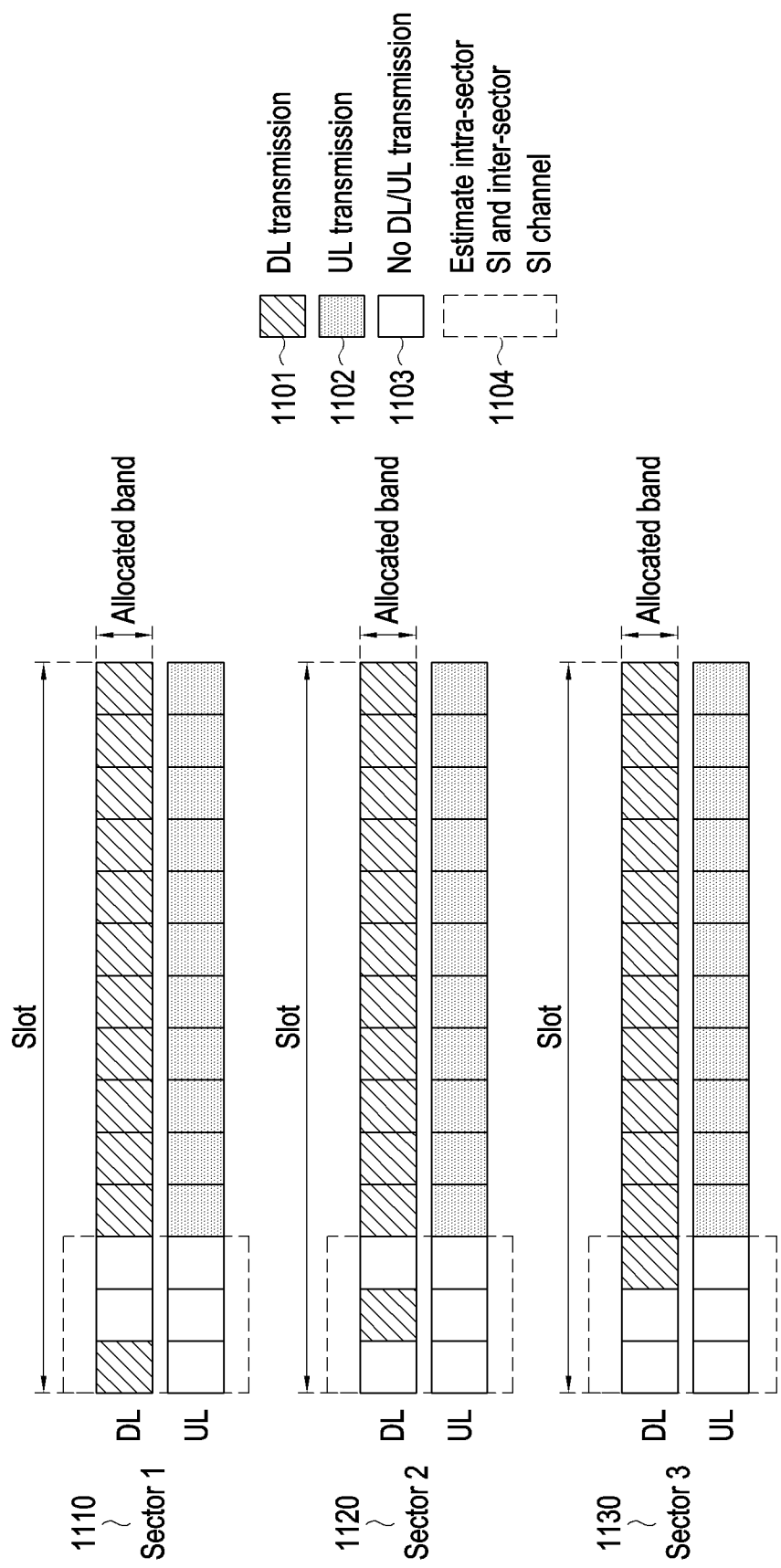
FIG. 11 is a view illustrating a slot structure including a self-interference channel estimation section according to an embodiment of the disclosure.

FIG. 11 is a view illustrating a slot structure including a self-interference channel estimation section according to an embodiment of the disclosure.

Referring to FIG. 11, the base station may perform DL transmission to the UE in each sector (or cell) in a time division multiplexing (TDM) manner during a self-interference channel estimation interval as described below.

Referring to FIG. 11, the allocated band shown on the vertical axis means the frequency band available to the UE, e.g., the resource block allocated to the UE by the base station, the UE's bandwidth part (BWP), or the entire bandwidth used by the base station.

The slot shown on the horizontal axis in the example of FIG. 11 includes multiple symbols. In the disclosure, a slot is exemplified which includes 14 symbols as does NR for convenience of description. However, the number of symbols in the slot is not limited to 14, and slot refers to one default unit in resource allocation, and embodiments are not limited by the name.

Referring to FIG. 11, reference numbers 1110, 1120, and 1130 denote example slot structures including downlink (DL) symbols and uplink (UL) symbols allocated in relation to self-interference channel estimation upon full-duplex communication in each of sector 1, sector 2, and sector 3 as in the example of FIG. 9.

Referring to FIG. 11, the base station may perform DL transmission 1101 during a time interval corresponding to at least one symbol allocated among multiple symbols (e.g., 14 symbols) in the slot for downlink transmission in sector 1, sector 2, or sector 3 and, in sector 1, sector 2, or sector 3, each UE may perform UL transmission 1102 during a time interval corresponding to at least one symbol allocated among the multiple symbols in the slot for uplink transmission. The slot may also have a resource (e.g., at least one symbol) 1103 where the base station does not perform DL transmission 1101 or the UE does not perform UL transmission 1102.

Further, referring to FIG. 11, during the self-interference channel estimation interval (e.g., at least one symbol) 1104 shown in dashed line, the base station may perform at least one of intra-sector self-interference channel estimation and inter-sector self-interference channel estimation. Further, the base station may secure the self-interference channel estimation interval 1104 by configuring the UE not to perform uplink transmission in at least one symbol to enhance the performance of self-interference channel estimation and, upon self-interference channel estimation, enhance SINR. Further, the base station may increase the performance of intra-sector self-interference channel estimation by limiting downlink transmission in sectors adjacent to the corresponding sector upon self-interference channel estimation in each sector.

Referring to FIG. 11, the base station may perform intra-sector self-interference channel and/or intra-sector self-interference channel estimation using the first to third symbols (symbols #0 to #2) in the slot corresponding to the self-interference channel estimation interval.

Referring to FIG. 11, configuring at least one symbol where the UE does not perform uplink transmission for the purpose of increasing the reception SINR upon self-interference channel estimation may be performed by selecting at least one from among other symbol(s), e.g., symbols #0 to #13, than symbols #0 to #2. Hereinafter, the (position of) symbol(s) where intra-sector self-interference channel estimation and/or inter-sector self-interference channel estimation is performed may be referred to as a self-interference channel estimation symbol set. As an example, a downlink signal may be transmitted for intra-sector self-interference channel estimation in a specific sector in the self-interference channel estimation symbol set, and no downlink signal may be transmitted in the symbol position where the intra-sector self-interference channel estimation is performed in sectors adjacent to the specific sector. Further, in this case, the UEs may perform no uplink transmission in the self-interference channel estimation symbol set.

Referring to FIG. 11, the self-interference channel estimation interval 1104 may be used to estimate the intra-sector self-interference channel in each sector. As an example, in a case where intra-sector self-interference channel estimation for sector 1 is performed in the first symbol (symbol #0) in the slot, since sector 1 performs downlink transmission in symbol #0, channel estimation of the inter-sector self-interference caused from sector 1 may be performed in sectors 2 and 3. In this case, symbol #0 may be used for measuring the intra-sector self-interference channel while simultaneously used for downlink transmission. Similarly, if intra-sector self-interference channel estimation for sector 2 or 3 is performed, channel estimation of the inter-sector self-interference caused from sector 2 or 3 may be performed for sector 1.

Figure 12:
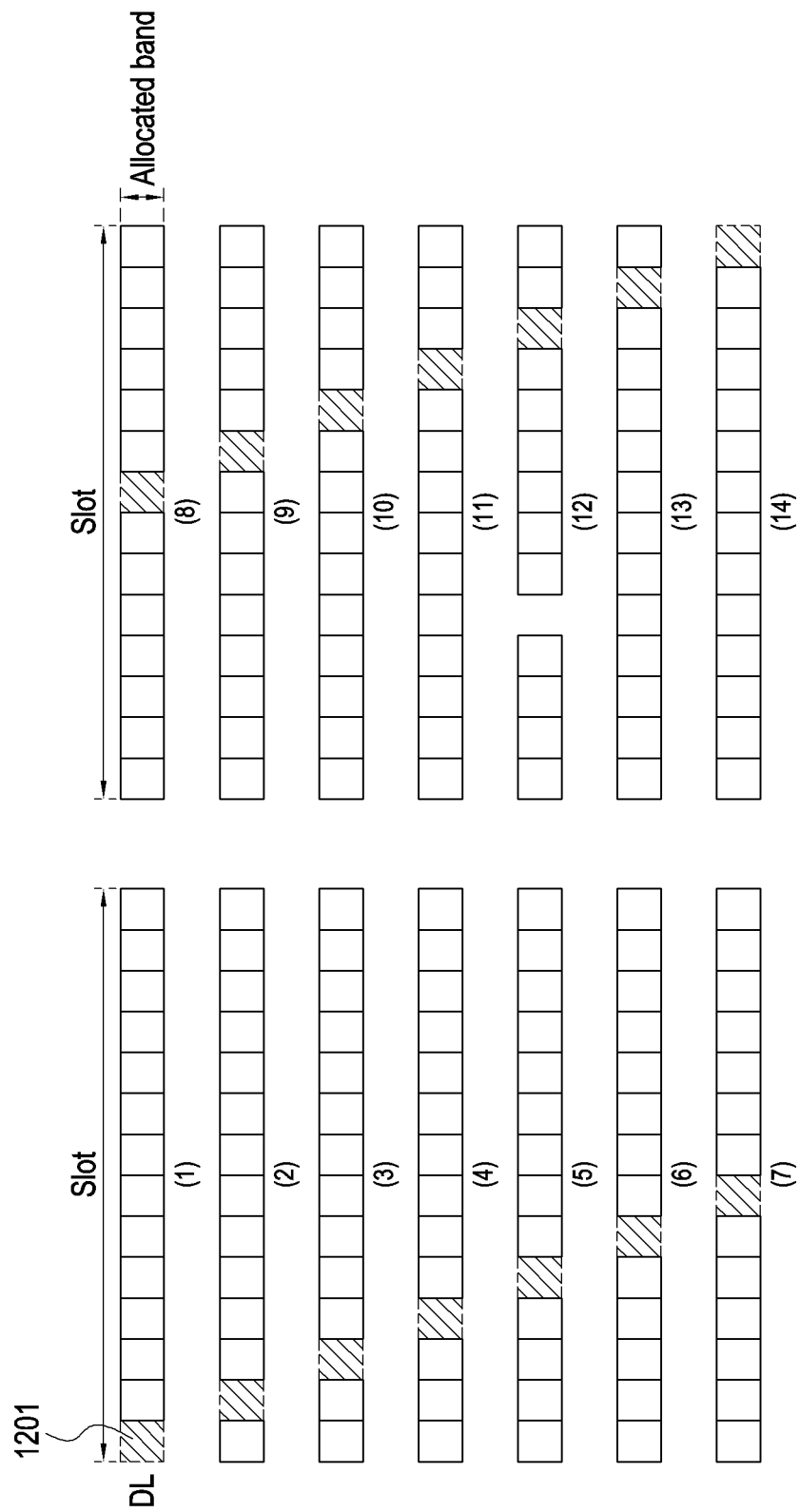
FIG. 12 is a view illustrating a base station allocates one symbol in a slot for intra-sector self-interference channel estimation according to an embodiment of the disclosure.

FIG. 12 is a view illustrating a base station allocates one symbol in a slot for intra-sector self-interference channel estimation according to an embodiment of the disclosure.

Referring to FIG. 12, it shows various types of symbol positions where intra-sector self-interference channel estimation is performed in an allocated band when intra-sector self-interference channel estimation is performed per sector of the base station using one symbol 1201 among 14 symbols (symbol #0 to symbol #13) in a slot. Downlink transmission may, or may not, be performed in the other symbols than one symbol 1201 depending on network contexts. For example, if intra-sector self-interference channel estimation is performed in sector(s) adjacent to one sector of the base station, no downlink transmission may be performed in the one sector in the corresponding symbol position where the estimation is performed. Various symbol allocation examples of FIG. 12 may be applied to the slot structure of FIG. 11.

Although it is exemplified, for convenience, in FIG. 12 that self-interference channel estimation is performed in one symbol in each sector of the base station, self-interference channel estimation may be performed in two or more continuous or discrete symbols, and the UE may be limited so that no uplink transmission is performed in the symbol(s) where self-interference channel estimation is performed.

Further, the base station may change the number or position of symbols for which uplink transmission is limited depending on specific purposes. For example, if channel estimation performance for intra-sector self-interference or inter-sector self-interference cancellation is not enough with one symbol, the base station may increase the number of symbols.

Further, if the beam of the base station (or UE) is changed in the slot, one or more additional self-interference channel estimation symbol sets for limiting uplink transmission may be operated, and a self-interference channel estimation symbol set for limiting downlink transmission for intra-sector self-interference channel and/or inter-sector self-interference channel estimation may be operated.

For example, in a case where the base station uses multiple downlink channels and uplink channels, if the uplink receive beam used in each channel differs from the downlink transmit beam, the base station may allocate one or more self-interference channel estimation symbol sets to the corresponding beam and use it for estimating the self-interference channel.

Further, if the self-interference channel is not changed during multiple slots, the base station may not use the self-interference channel estimation symbol set in the slots.

Further, when performing no downlink transmission for the corresponding slot, the base station may not use the self-interference channel estimation symbol set either.

Embodiment 3

Embodiment 3 relates to a method for enhancing uplink resource overhead to estimate intra-sector and inter-sector self-interference channel in embodiment 2. Like in embodiment 2, such an example is described in which all of the sectors of the base station have UEs performing uplink transmission in the network context as in the example of FIG. 9.

Figure 13A:
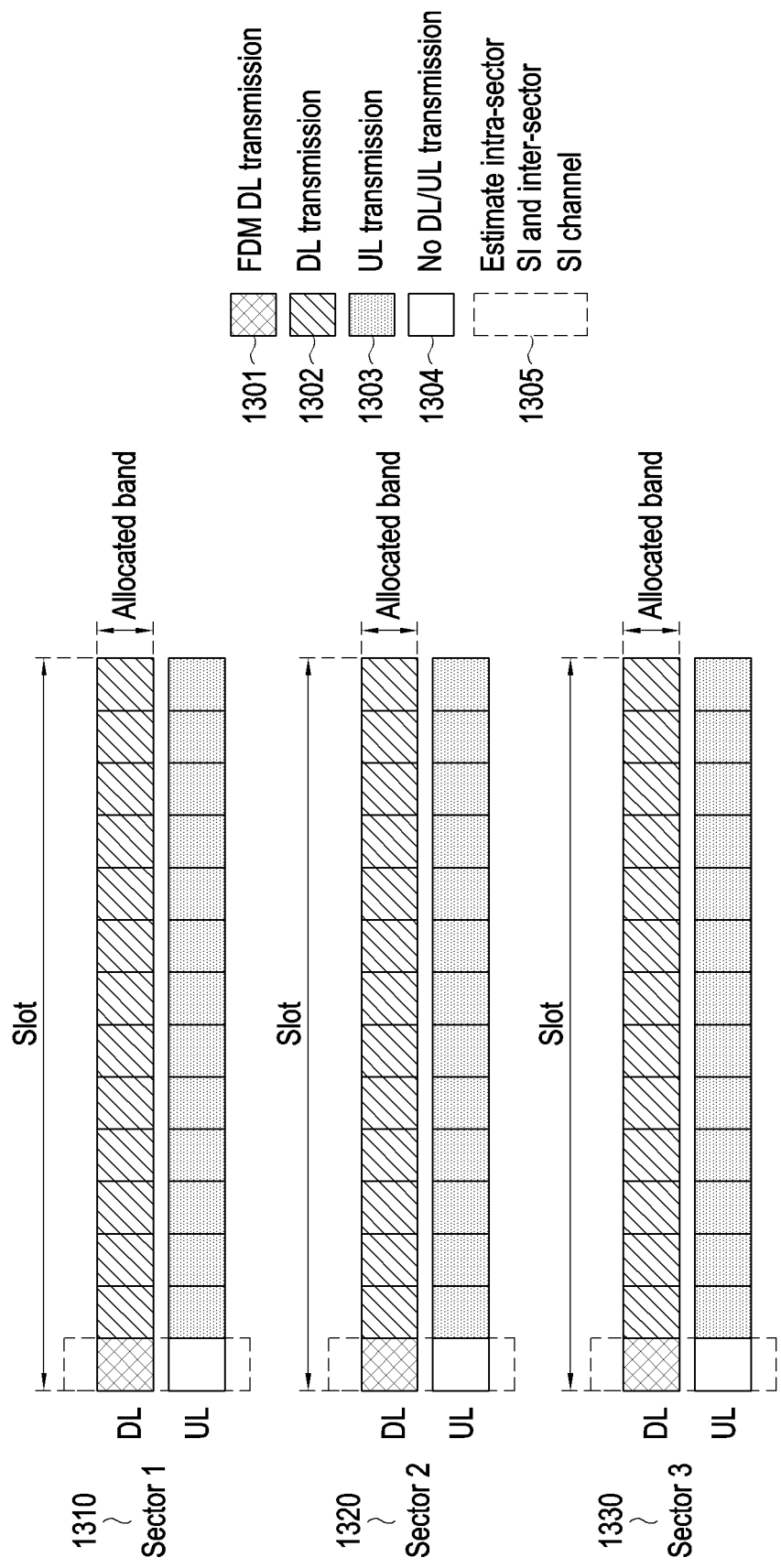
FIG. 13A is a view illustrating a slot structure including a self-interference channel estimation section according to an embodiment of the disclosure.

FIG. 13A is a view illustrating a slot structure including a self-interference channel estimation section according to an embodiment of the disclosure.

Referring to FIG. 13A, the base station may perform DL transmission to the UE in each sector (or cell) in a frequency division multiplexing (FDM) manner during a self-interference channel estimation interval.

Referring to FIG. 13A, the allocated band shown on the vertical axis means the frequency band available to the UE, e.g., the RB allocated to the UE by the base station, the UE's BWP, or the entire bandwidth used by the base station. The slot shown on the horizontal axis in the example of FIG. 13A includes multiple symbols. In the disclosure, a slot is exemplified which includes 14 symbols as does NR for convenience of description.

Referring to FIG. 13A, reference numbers 1310, 1320, and 1330 denote example slot structures including downlink (DL) symbols and uplink (UL) symbols allocated in relation to self-interference channel estimation upon full-duplex communication in each of sector 1, sector 2, and sector 3 as in the example of FIG. 9.

Referring to FIG. 13A, the base station may perform DL transmission 1302 in the symbols in the slot for downlink transmission in sector 1, sector 2, and sector 3 and, in sector 1, sector 2, and sector 3, each UE may perform UL transmission 1303 in the symbols in the slot for uplink transmission.

Referring to FIG. 13A, a symbol interval 1304 may be configured during which the base station performs FDM DL transmission 1301 in some frequency resources, and the UE does not perform UL transmission.

Referring to FIG. 13A, during the self-interference channel estimation interval (e.g., at least one symbol) 1305 shown in dashed line, the base station may perform at least one of intra-sector self-interference channel estimation and inter-sector self-interference channel estimation. Further, the base station may secure the self-interference channel estimation interval 1305 by configuring the UE not to perform uplink transmission in at least one symbol (the first symbol in the slot in the example of FIG. 13A) to enhance the performance of self-interference channel estimation and, upon self-interference channel estimation, enhance SINR. Further, the base station may increase the performance of intra-sector self-interference channel estimation by limiting downlink transmission in sectors adjacent to the corresponding sector upon self-interference channel estimation in each sector.

Referring to FIG. 13A, FDM DL transmission 1301 is described. DL transmission may be performed in some preset RBs or REs of the allocated band in the FDM scheme.

Figure 13B:
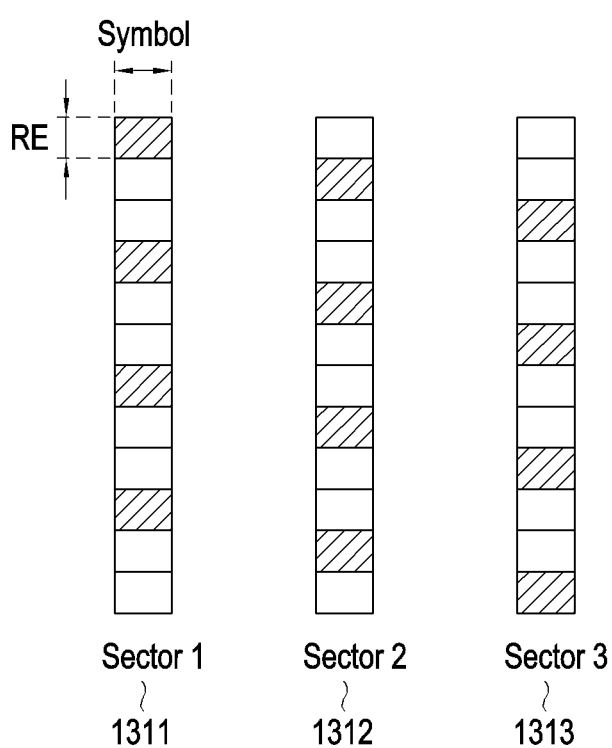
FIG. 13B is a view illustrating frequency division multiplexing (FDM) pattern allocated in units of resource elements (Res) within an RB of a self-interference channel estimation section in FIG. 13A according to an embodiment of the disclosure.

FIG. 13B is a view illustrating frequency division multiplexing (FDM) pattern allocated in RE units within an RB of a self-interference channel estimation section according to an embodiment of the disclosure.

Referring to FIG. 13B, the base station may configure the RE used for DL transmission in each sector not to overlap in the frequency domain as in the examples denoted by reference numbers 1311, 1312, and 1313, thereby performing intra-sector self-interference channel estimation in the RE 1321 in sector 1 in RE units and estimating the inter-sector self-interference channel in the RE 1322 and/or RE 1323 from sector 2 and/or sector 3.

Figure 13C:
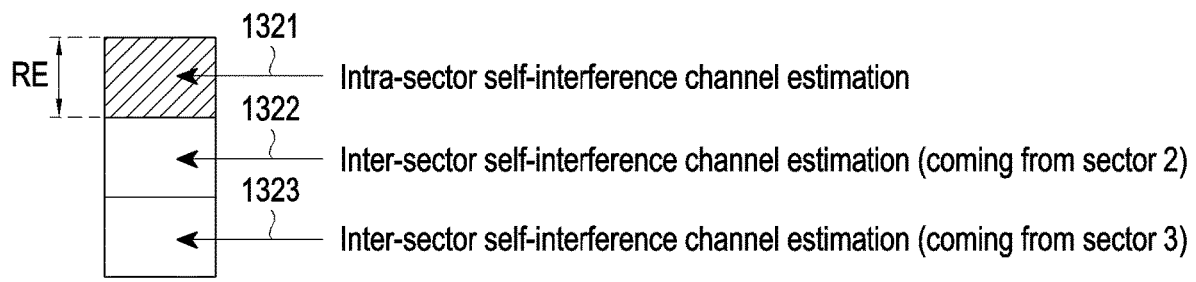
FIG. 13C is a view illustrating an RE position in which intra-sector and/or inter-sector self-interference channel estimation is performed in an FDM pattern of FIG. 13B according to an embodiment of the disclosure.

FIG. 13C is a view illustrating an RE position in which intra-sector and/or inter-sector self-interference channel estimation is performed in an FDM pattern in reference number 1311 of FIG. 13B according to an embodiment of the disclosure. Like embodiment 2, embodiment 3 may also enhance the performance of self-interference channel estimation because the UE's uplink transmission and adjacent sectors' downlink transmission are not performed during the self-interference channel estimation interval 1305.

In the case shown in FIG. 13A, the base station may perform intra-sector self-interference channel estimation and/or inter-sector self-interference channel estimation using the first symbol (symbol #0) in the slot, in the FDM scheme, during the self-interference channel estimation interval 1305. FIG. 13B shows an example in which the sectors of each base station uses the FDM scheme in RE units. Unlike in embodiment 2, in embodiment 3, the first symbol (symbol #0) in the slot is used in the FDM scheme and, thus, the self-interference channel estimation symbol set has symbol #0 alone. Although not shown in the example, if the same channel state is ensured for multiple RBs, such as by physical resource block (PRB) bundling, the self-interference channel estimation symbol set may be used in RB units, rather than RE units. Further, the self-interference channel estimation symbol set is not limited to the pattern, FDM, shown in the example of FIG. 13B but may rather be configured in other various patterns. Configuring symbols where UE's uplink transmission is not performed for the purpose of increasing the reception SINR upon self-interference channel estimation may be performed by selecting one or more symbols from among other symbol(s), e.g., symbol #0 to symbol #13, than the first symbol (symbol #0) in the example of FIG. 13A.

Each RE shown in shading in FIGS. 13B and 13C may be used to estimate intra-sector self-interference in each corresponding sector.

Referring to FIG. 13C, in the example of estimating self-interference in sector 1, the base station may estimate intra-sector self-interference for sector 1 in RE #0 1321 and may estimate inter-sector self-interference for the interference signal received from sector 2 and/or sector 3 in RE #1 1322 and/or RE #2 1323. In such a manner, at least one symbol (e.g., symbol #0) in the slot may be used as a resource for downlink transmission, as well as for intra-sector self-interference channel and/or intra-sector self-interference channel estimation.

Referring to FIG. 13A, intra-sector self-interference channel estimation and/or inter-sector self-interference channel estimation is performed in the position of symbol #0 in the slot, the resource position where intra-sector self-interference channel estimation and/or inter-sector self-interference channel estimation may be performed is not limited to the symbol position exemplified in FIG. 13A, in the disclosure. Like embodiment 2, embodiment 3 may also estimate the self-interference channel using one or more symbols among the available symbol positions of FIG. 12.

Although it is exemplified, for convenience, in FIG. 13A that self-interference channel estimation is performed in one symbol in each sector of the base station, self-interference channel estimation may be performed in two or more continuous or discrete symbols, and the UE may be limited so that no uplink transmission is performed in the symbol(s) where self-interference channel estimation is performed.

Further, the base station may change the number or position of symbols for which uplink transmission is limited depending on specific purposes. For example, if channel estimation performance for intra-sector self-interference or inter-sector self-interference cancellation is not enough with one symbol, the base station may increase the number of symbols.

Further, if the beam of the base station (or UE) is changed in the slot, one or more additional self-interference channel estimation symbol sets for limiting uplink transmission may be operated, and a self-interference channel estimation symbol set for limiting downlink transmission for intra-sector self-interference channel and/or inter-sector self-interference channel estimation may be operated.

For example, in a case where the base station uses multiple downlink channels and uplink channels, if the uplink receive beam used in each channel differs from the downlink transmit beam, the base station may allocate one or more self-interference channel estimation symbol sets to the corresponding beam and use it for estimating the self-interference channel.

Further, if the self-interference channel is not changed during multiple slots, the base station may not use the self-interference channel estimation symbol set in the slots.

Further, when performing no downlink transmission for the corresponding slot, the base station may not use the self-interference channel estimation symbol set either.

Embodiment 4

Embodiment 4 relates to a frame structure depending on a signal type used for intra-sector self-interference channel estimation and/or inter-sector self-interference channel estimation.

Figure 14:
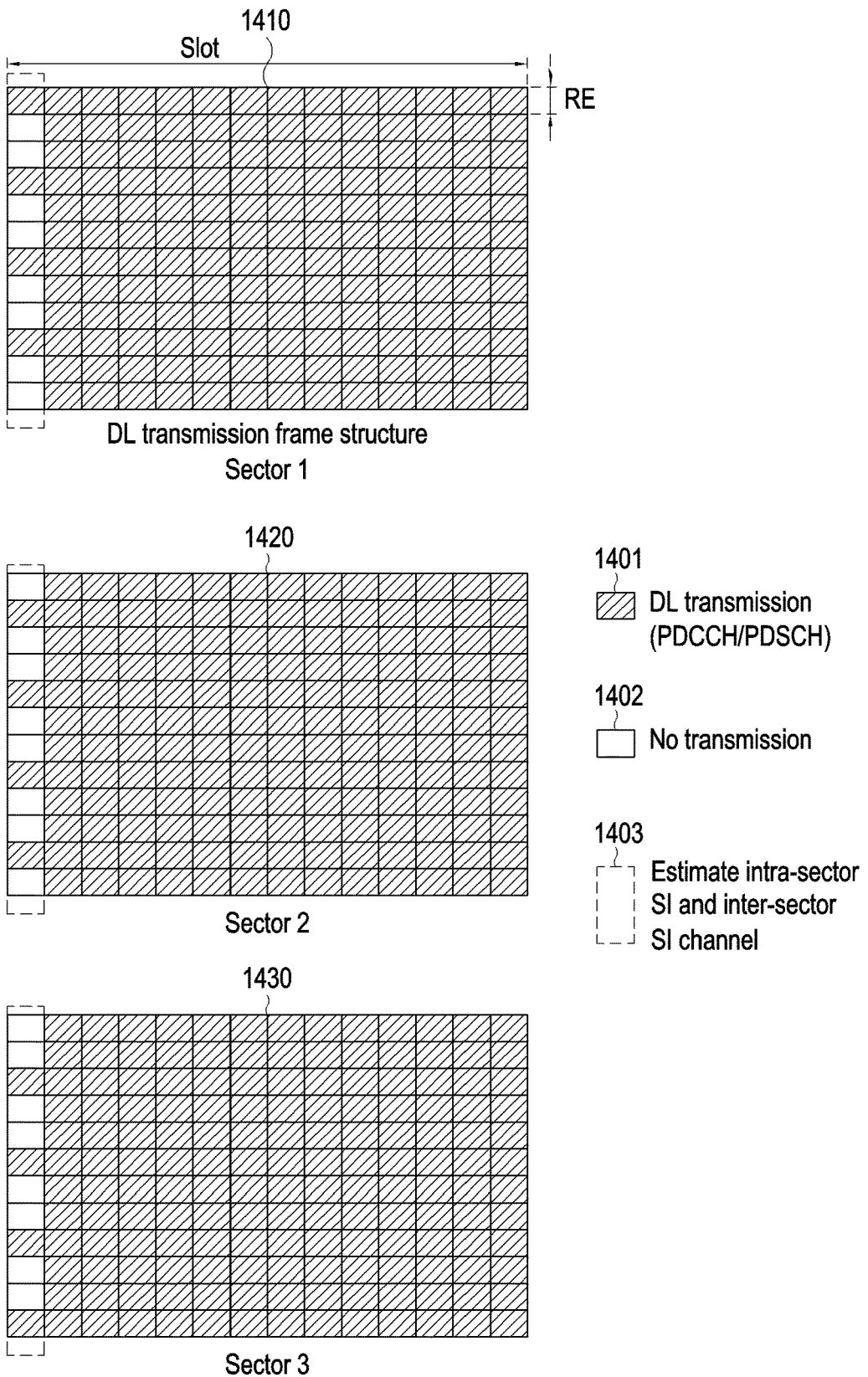
FIG. 14 is a view illustrating self-interference channel estimation in a frame structure in which physical downlink control channel (PDCCH) and/or physical downlink shared channel (PDSCH) data is transferred according to an embodiment of the disclosure.
Figure 15:
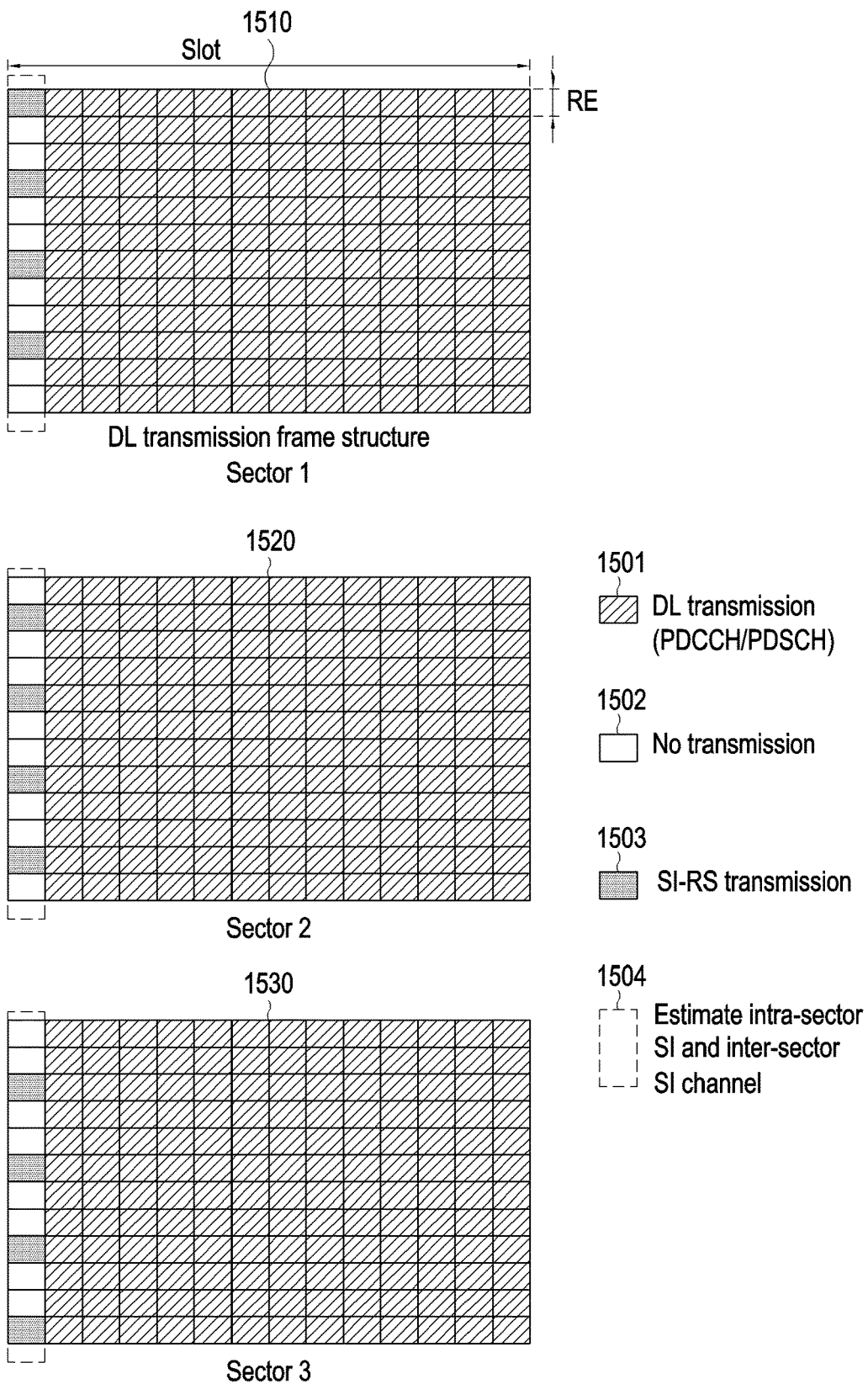
FIG. 15 is a view illustrating self-interference channel estimation in a frame structure in which a reference signal for self-interference channel estimation (SI-RS) is transferred according to an embodiment of the disclosure.

FIGS. 14 and 15 illustrate per-sector downlink frame structures applicable to the example of embodiment 3. In the frame structures of FIGS. 14 and 15, one RB and one slot are shown on the frequency axis and the time axis, respectively. Embodiment 4 is described under the assumption that, as in the 3GPP NR standard, one RB includes 12 REs, and one slot includes 14 symbols. Although FIGS. 14 and 15 exemplify that the first symbol (symbol #0) in the slot is used for intra-sector self-interference channel estimation and inter-sector self-interference channel estimation, other symbol positions in the slot may also be used for self-interference channel estimation as described above in the foregoing embodiments.

FIG. 14 is a view illustrating self-interference channel estimation in a frame structure in which physical downlink control channel (PDCCH) and/or physical downlink shared channel (PDSCH) data is transferred according to an embodiment of the disclosure.

Referring to FIG. 14, reference numbers 1410, 1420, and 1430 exemplify per-sector frame structures in which PDCCH or PDSCH data is used for self-interference channel estimation in each sector of the base station operating three sectors (sector 1, sector 2, and sector 3). Reference numbers 1401, 1402, and 1403 denote a resource(s) where DL transmission is performed, resource(s) where no DL transmission is performed, and the self-interference channel estimation interval, respectively, in the frame structure of FIG. 14. The base station may estimate the inter-sector self-interference channel caused from sector 2 and sector 3 adjacent to sector 1 upon self-interference channel estimation in sector 1 and, in this case, it needs to know the PDCCH data or PDSCH data transmitted from sector 2 and sector 3. The PDCCH data or PDSCH data transmitted from sector 2 and sector 3 may be X_(2a, 2b) and X_(3a, 3b) in the example of FIG. 9. If there is an individual DU connected to the RU for each sector of the base station, information exchange regarding the transmission signal of each sector may be performed between the sectors.

Referring to FIG. 14, when PDCCH data or PDSCH data is used for self-interference channel estimation, the base station may not allocate additional resources for self-interference channel estimation, and in this case, since additional resources for self-interference channel estimation are not required in downlink, no additional overhead occurs.

Referring to FIG. 14, intra-sector self-interference channel estimation and/or inter-sector self-interference channel estimation is performed in the position of symbol #0 in the slot, the resource position where intra-sector self-interference channel estimation and/or inter-sector self-interference channel estimation may be performed is not limited to the symbol position exemplified in FIG. 14, in the disclosure. The embodiment of FIG. 14 may be modified to be able to estimate the self-interference channel using one or more symbols among the available symbol positions of FIG. 12.

Referring to FIG. 14, when PDCCH data is used for self-interference channel estimation, the capacity of transmittable PDCCH information may be reduced. To prevent this, as described in connection with embodiment 3, a symbol position used for self-interference channel estimation may be allocated not to overlap the symbol where PDCCH data is transmitted among the options of FIG. 12. This may also be addressed by adjusting the symbol position of the PDCCH data.

Nevertheless, if the PDCCH data is used for self-interference channel estimation, a resource element group (REG) for PDCCH decoding may be defined in a different way since there is(are) a resource position(s) where no downlink transmission is performed on the frequency axis as in the example of FIG. 14. For example, assuming a base station operating N sector(s), a method for recognizing N RBs as one REG may be considered. In this case, a method of configuring multiple non-continuous REs, except for the RE(s) where no downlink transmission is performed on the frequency axis, as one REG may be taken into account.

FIG. 15 is a view illustrating self-interference channel estimation in a frame structure in which a reference signal for self-interference channel estimation (hereinafter, "SI-RS") is transferred according to an embodiment of the disclosure.

Referring to FIG. 15, reference numbers 1510, 1520, and 1530 exemplify per-sector frame structures in which the SI-RS is used for self-interference channel estimation in each sector of the base station operating three sectors (sector 1, sector 2, and sector 3). Reference numbers 1501, 1502, 1503, and 1504 denote a resource(s) where DL transmission is performed, resource(s) where no DL transmission is performed, resource(s) where SI-RS transmission is performed, and the self-interference channel estimation interval, respectively, in the frame structure of FIG. 15.

Unlike in the example of FIG. 14, referring to FIG. 15, a pre-defined/configured SI-RS is used. Thus, information exchange between sectors to know X_(2a, 2b) and X_(3a, 3b) may not be required as in the example of FIG. 14. However, each sector of the base station may agree in advance on what SI-RS is to be used. In contrast, in the example of FIG. 15, an additional resource for SI-RS is required for self-interference channel estimation unlike in the example of FIG. 14 and, thus, additional overhead occurs in downlink. However, if information about the SI-RS is shared with the UE, the UE may increase the accuracy of channel estimation using the combining gain of the SI-RS and DMRS.

Referring to FIG. 15, intra-sector self-interference channel estimation and/or inter-sector self-interference channel estimation is performed in the position of symbol #0 in the slot as in the foregoing embodiments of the disclosure, the resource position where intra-sector self-interference channel estimation and/or inter-sector self-interference channel estimation is performed is not limited to the symbol position exemplified in FIG. 15, in the disclosure. The embodiment of FIG. 15 may be modified to be able to estimate the self-interference channel using one or more symbols among the available symbol positions of FIG. 12.

Embodiment 5

Embodiment 5 describes information, which should be previously agreed on or needs to be changed whenever necessary, for all the sectors of the base station to perform intra sector and/or inter-sector self-interference channel estimation.

If information 1) among information 1) to 3) indicates that self-interference channel estimation is needed between the sectors of the base station information 2) and 3) may previously be shared. If information 1) indicates that no self-interference channel estimation is needed, information 2) and 3) is not required and, thus, not previously shared between the sectors. The shared information may include information about the self-interference channel estimation interval.

1) Whether self-interference channel estimation is necessary
2) Signal information transmitted for estimating intra-sector and/or inter-sector self-interference channel 3) The resource position of the signal transmitted for estimating intra-sector and/or inter-sector self-interference channel Regarding information 1) above, since the intra-sector self-interference channel and/or inter-sector self-interference channel is changed when the transmit/receive beam of a specific sector of the base station is changed as described above in connection with the foregoing embodiments of the disclosure, the base station should perform self-interference channel estimation again.

Figure 16:
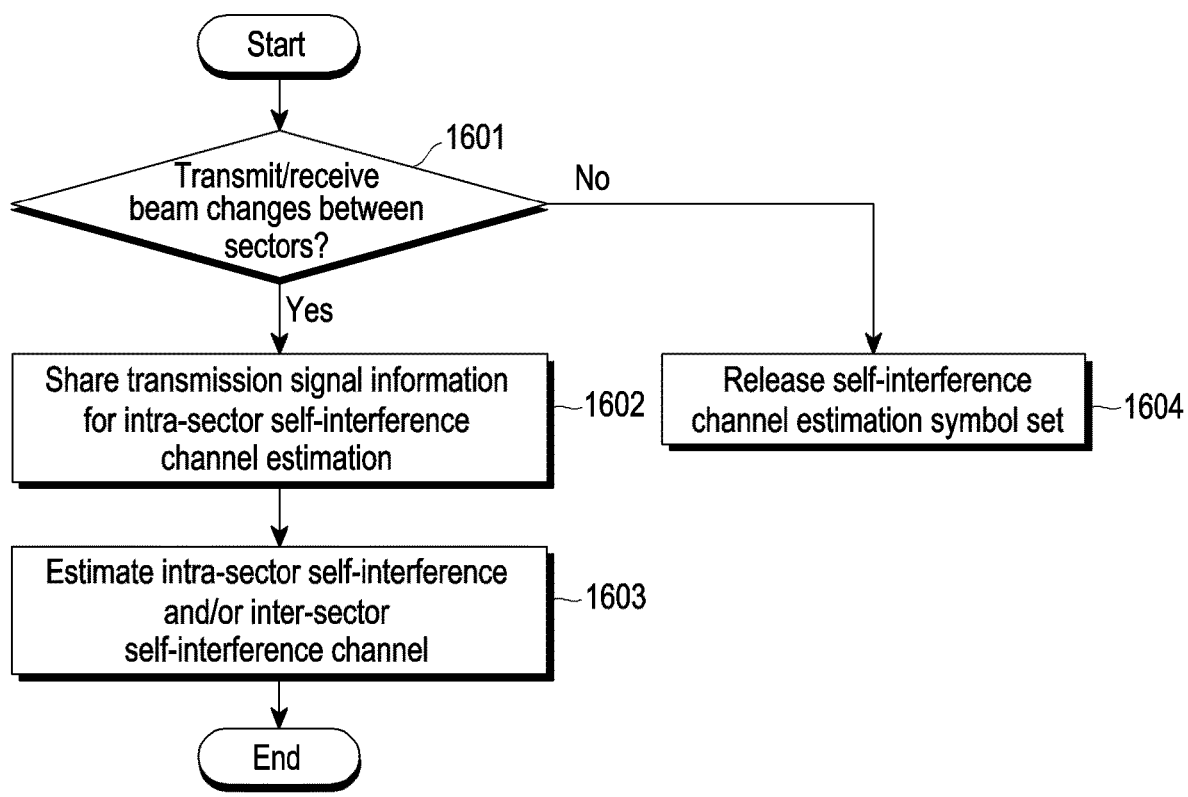
FIG. 16 is a view illustrating an operation for a base station when self-interference channel estimation is required again due to a change in transmission/reception beam in at least one sector among sectors of the base station according to an embodiment of the disclosure.

FIG. 16 is a flowchart illustrating an operation for a base station when self-interference channel estimation is required again due to a change in transmission/reception beam in at least one sector among sectors of the base station according to an embodiment of the disclosure.

Referring to FIG. 16, in operation 1601, the base station determines whether it is required to change at least one of the transmit beam and the receive beam in at least one sector among the sectors. If a beam change is required, the base station shares at least one of information 1) to 3) above for intra-sector self-interference channel estimation and/or inter-sector self-interference channel estimation in operation 1602 and, in operation 1603, the base station again performs intra-sector self-interference channel estimation and/or inter-sector self-interference channel estimation based on the changed beam. If no beam change is required in operation 1601, the base station may release the above-described self-interference channel estimation symbol set in operation 1604. Operation 1604 may be optionally selected considering that intra-sector self-interference channel estimation and/or inter-sector self-interference channel estimation may periodically be performed.

Figure 17:
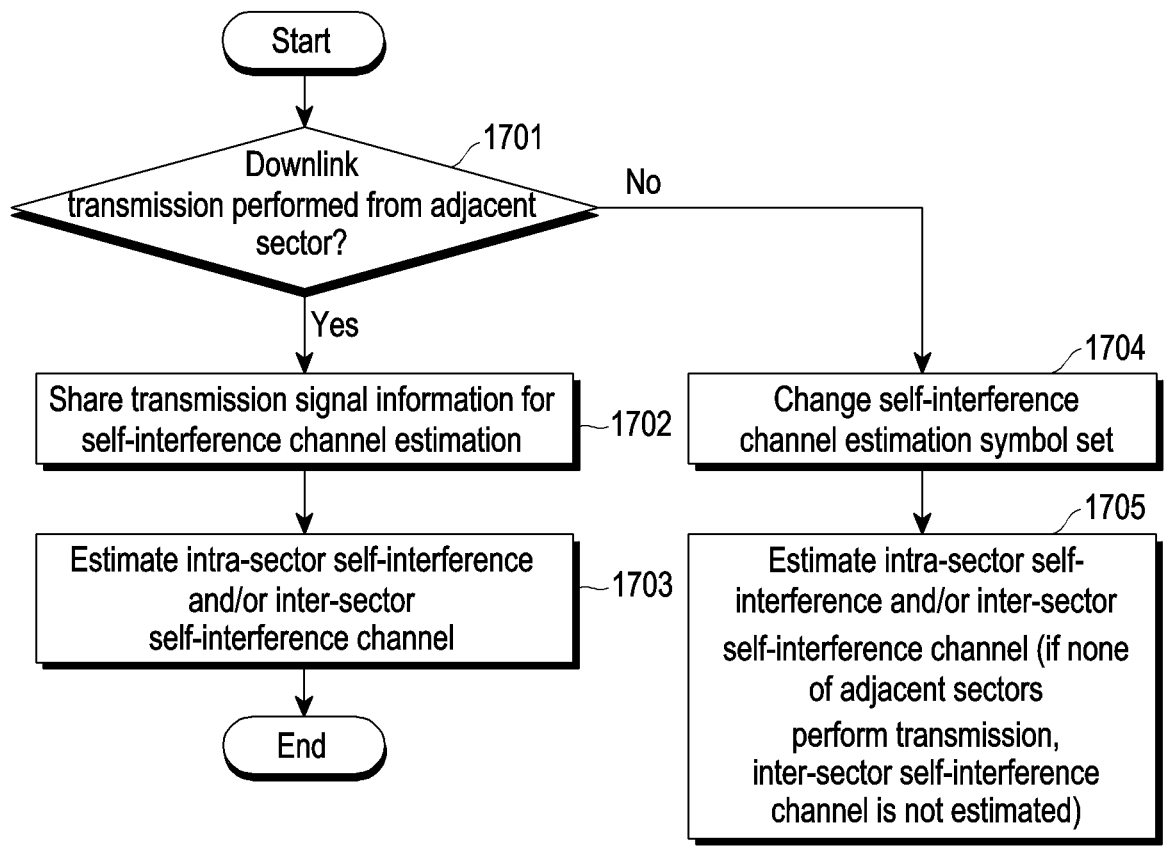
FIG. 17 is a view illustrating a self-interference channel estimation operation of a base station according to whether downlink transmission is performed in at least one sector among sectors of the base station according to an embodiment of the disclosure.

FIG. 17 is a flowchart illustrating a self-interference channel estimation operation of a base station according to whether downlink transmission is performed in at least one sector among sectors of the base station according to an embodiment of the disclosure.

Referring to FIG. 17, in operation 1701, the base station determines whether downlink transmission is performed in a sector adjacent to the sector where intra-sector self-interference channel estimation is to be performed. If downlink transmission is performed in at least one adjacent sector, the base station shares information about the transmission signal for intra-sector self-interference channel estimation with the at least one adjacent sector in operation 1702. In operation 1703, the base station performs intra-sector self-interference channel estimation and/or inter-sector self-interference channel estimation. If no downlink transmission is performed in the adjacent sector in operation 1701, inter-sector self-interference is not caused by the downlink transmission of the adjacent sector so that the base station may not perform inter-sector channel estimation. Accordingly, in operation 1704, the base station may change the self-interference channel estimation symbol set. In operation 1705, the base station may perform intra-sector self-interference channel estimation and/or inter-sector self-interference channel estimation using the changed self-interference channel estimation symbol set and, if no downlink exists in all of the adjacent sectors, the base station may estimate the intra-sector self-interference channel alone.

Among the information that may be shared between the sectors of the base station, information 2) above (i.e., signal information transmitted for intra-sector self-interference channel estimation and/or inter-sector self-interference channel estimation) may include information about when PDCCH data or PDSCH data is used and when the SI-RS is used as in embodiment 4.

Figure 18:
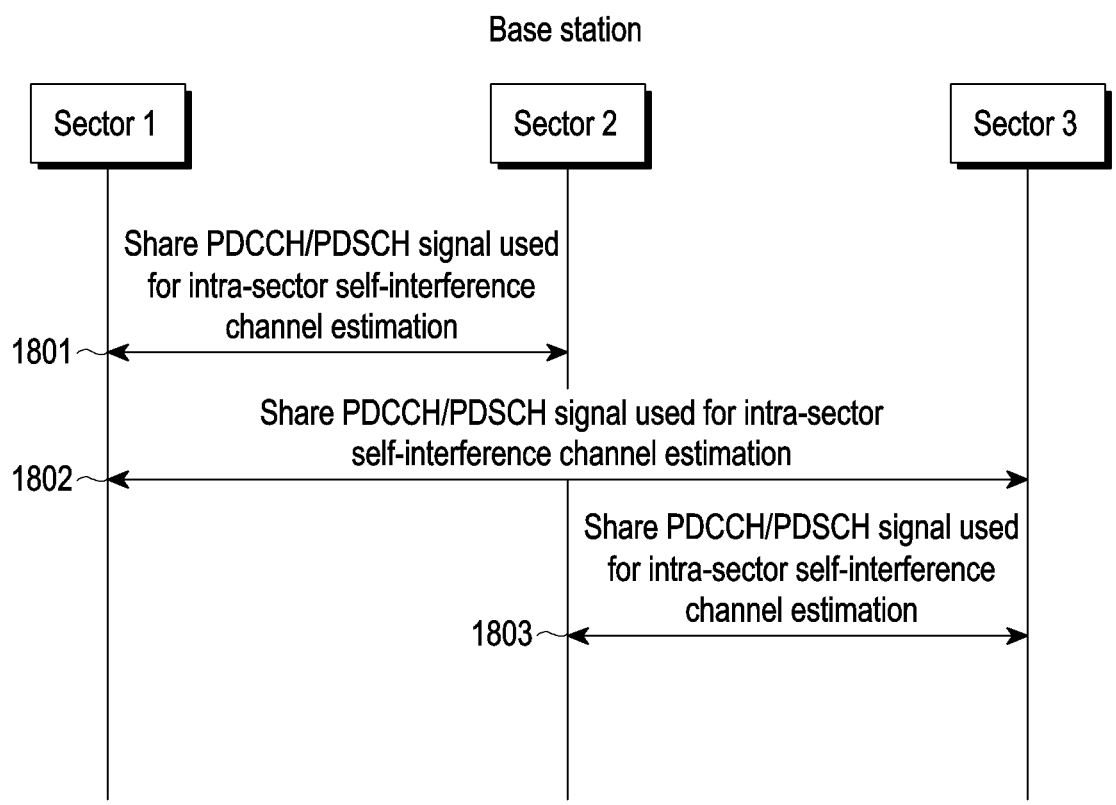
FIG. 18 is a view illustrating information sharing between sectors of a base station when estimating a self-interference channel in a frame structure in which PDCCH and/or PDSCH data is transferred according to an embodiment of the disclosure.

FIG. 18 is a flowchart illustrating information sharing between sectors of a base station when estimating a self-interference channel in a frame structure in which PDCCH and/or PDSCH data is transferred according to an embodiment of the disclosure.

Referring to FIG. 18, in operation 1801, sector 1 and sector 2 of the base station may share information about the PDCCH and/or PDSCH data transmitted upon intra-sector self-interference channel estimation. In operation 1802, sector 1 and sector 3 of the base station may share information about the SI-RS transmitted upon intra-sector self-interference channel estimation. Sector 2 and sector 3 of the base station may share information about the SI-RS transmitted upon intra-sector self-interference channel estimation. The order of operations 1801, 1802, and 1803 is not limited to that shown in FIG. 18, and any one of them may be performed earlier than the others, or operations 1801, 1802, and 1803 may be simultaneously performed. If each sector has an RU and a DU, the example of FIG. 18 may be performed between the respective DUs of the sectors. It may also apply where all of the sectors share one DU in the example of FIG. 18. However, the DU may manage the information of each sector, rather than actually sharing the information.

Referring to FIG. 18, the information shared between the sectors may include at least one of information 1) to 3).

Figure 19:
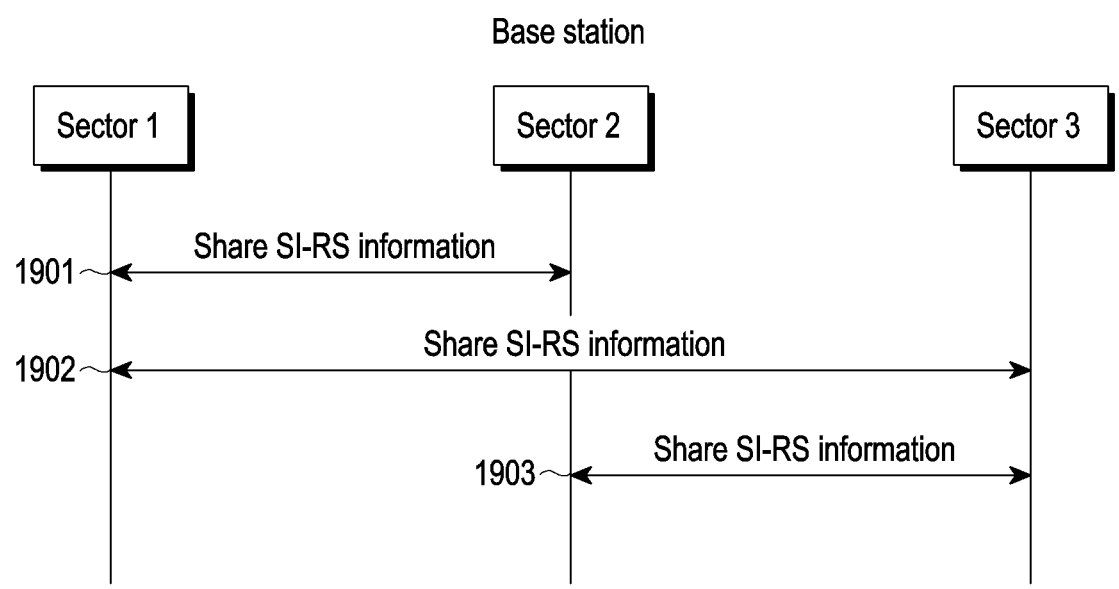
FIG. 19 is a view illustrating information sharing between sectors of a base station when estimating a self-interference channel in a frame structure in which an SI-RS is transferred according to an embodiment of the disclosure.

FIG. 19 is a flowchart illustrating information sharing between sectors of a base station when estimating a self-interference channel in a frame structure in which an SI-RS is transferred according to an embodiment of the disclosure.

Referring to FIG. 19, in operation 1901, sector 1 and sector 2 of the base station may share information about the SI-RS transmitted upon intra-sector self-interference channel estimation. In operation 1802, sector 1 and sector 3 of the base station may share information about the SI-RS transmitted upon intra-sector self-interference channel estimation. Sector 2 and sector 3 of the base station may share information about the SI-RS transmitted from sector 1 upon intra-sector self-interference channel estimation. The order of operations 1901, 1902, and 1903 is not limited to that shown in FIG. 19, and any one of them may be performed earlier than the others, or operations 1901, 1902, and 1903 may be simultaneously performed. If each sector has an RU and a DU, the example of FIG. 19 may be performed between the respective DUs of the sectors. It may also apply where all of the sectors share one DU in the example of FIG. 19. However, the DU may manage the information of each sector, rather than actually sharing the information.

Referring to FIG. 19, the information shared between the sectors may include at least one of information 1) to 3).

For example, use of a sequence in which a method for generating an SI-RS is predefined when an SI-RS is used for self-interference channel estimation as in the example of FIG. 19 may allow the sectors of the base station to share the parameter values used to generate the sequence of the SI-RS. As an example, if Zadoff-chu sequence which is a physical random access channel (PRACH) signal is used for generating an SI-RS, generation parameters, such as root sequence, may be shared between the sectors. However, as the sequence for generating the SI-RS, various sequences that may be mathematically defined may be used instead of the Zadoff-chu sequence, and detailed information shared between the sectors may vary depending on sequences to be used. Further, the UE may increase the accuracy of channel estimation using the combining gain of the SI-RS and the DMRS.

Information 3) above which is related to the resource position of the signal transmitted to estimate the self-interference channel among the information shared between the sectors is required to differentiate the inter-sector self-interference caused from the adjacent sector, and exchange of position information about the intra-sector self-interference channel estimation and/or inter-sector self-interference channel estimation may use one of methods a), b), and c) as follows.

a) Explicitly exchange the position of self-interference channel estimation resource (dynamic)
b) Exchange the pattern and repetition period for the position of the self-interference channel estimation resource (periodic)
c) Conjecture the position by combining other information about the position of the self-interference channel estimation resource Method a) above may configure information about the radio resource as bitmap information whenever information exchange is needed between the sectors and exchange information. This method may configure and use a resource for a self-interference channel per sector to fit the context in which the channel changes very quickly or in a frequency selective channel.

Method b) above may be used when there are predefined specific patterns in the self-interference channel estimation resource.

Referring to FIG. 12 or 13B, when there are predefined patterns for the self-interference channel estimation resource, the index corresponding to the corresponding pattern may be exchanged between the sectors. Further, even when the pattern for the self-interference channel estimation resource is periodically changed, the order and/or time of the pattern changed may be previously exchanged.

Method c) above may be performed without exchanging information about the position of the self-interference channel estimation resource between the sectors in a method predetermined between the sectors. For example, a possible method is to predetermine the position of the self-interference channel estimation resource according to the sector/cell identification (ID) using information, such as the sector/cell ID of the base station.

Embodiment 6

Embodiment 6 relates to sharing information between each sector of a base station and a UE. The UE's uplink transmission may not be performed to enhance the performance of self-interference channel estimation in an interval during which intra-sector self-interference channel estimation and/or self-interference channel estimation is performed in each sector of the base station. To that end, in embodiment 5 above, information 1) and 3) may be provided from the base station to the UE. In this case, if information 1) above indicates that self-interference channel estimation is needed, information 2) and 3) are provided to the UE and, if information 1) indicates that no self-interference channel estimation is required, information 2) and 3) may not be provided to the UE.

Figure 20:
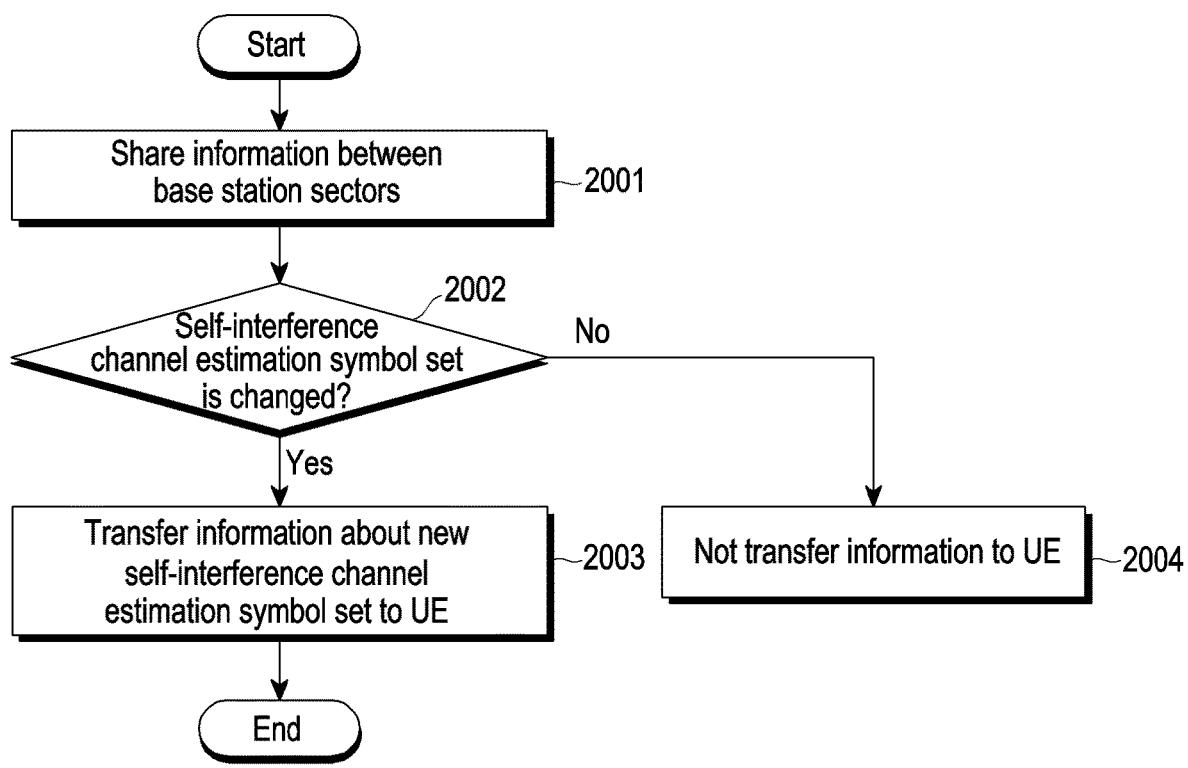
FIG. 20 is a view illustrating an operation for providing self-interference channel estimation symbol set information from a base station to a UE for self-interference channel estimation according to an embodiment of the disclosure.

FIG. 20 is a flowchart illustrating an operation for providing self-interference channel estimation symbol set information from a base station to a UE for self-interference channel estimation according to an embodiment of the disclosure. The self-interference channel estimation symbol set may be included in configuration information about the above-described self-interference channel estimation interval provided from the base station to the UE.

Referring to FIG. 20, in operation 2001, information exchange described in connection with embodiment 5 may be performed between the sectors of the base station. In operation 2002, the base station may determine whether the self-interference channel estimation symbol set is changed in each sector and, if the self-interference channel estimation symbol set is changed, the base station provides information about the changed self-interference channel estimation symbol set to the UE in the corresponding sector in operation 2003. In this case, the UE may not transmit uplink data in the position of the changed self-interference channel estimation symbol set. If the self-interference channel estimation symbol set is not changed in operation 2002, the base station may not provide the relevant information to the UE in operation 2004, and the UE may implicitly determine that the self-interference channel estimation symbol set is not changed and operate accordingly. Further, although not shown in the example of FIG. 20, if self-interference channel estimation is not required as there is no change in transmit/receive beam in all the sectors, the base station may transfer information indicating that the corresponding self-interference channel estimation symbol set is released to the UE and, in this case, the UE may perform uplink transmission in all symbol positions.

Embodiment 7

Embodiment 7 relates to operations between a base station and a UE to perform intra-sector self-interference channel estimation and/or inter-sector self-interference channel estimation.

Figure 21:
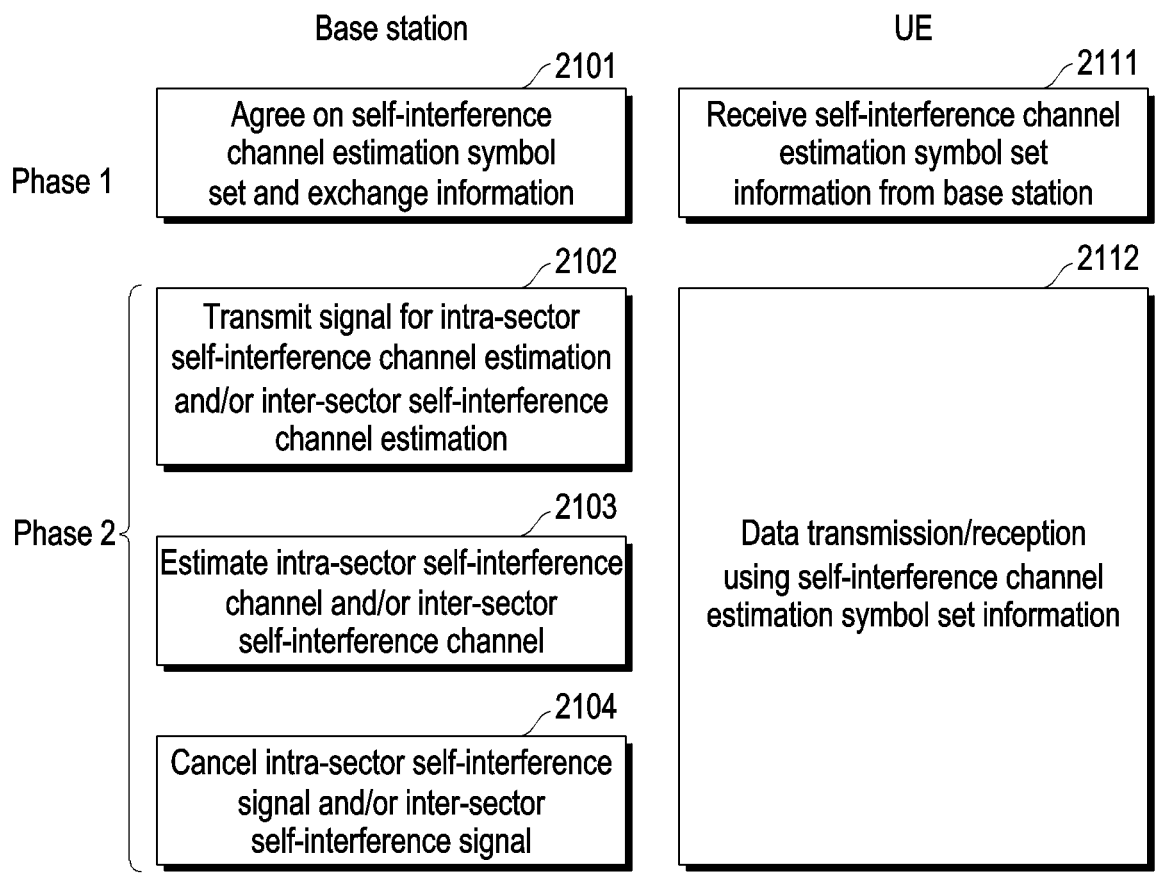
FIG. 21 is a view illustrating operations performed by a base station and a UE for self-interference channel estimation according to an embodiment of the disclosure.

FIG. 21 is a view illustrating operations performed by a base station and a UE for self-interference channel estimation according to an embodiment of the disclosure.

Referring to FIG. 21, in operations 2101 and 2111 of phase 1, as described in connection with embodiments 5 and 6, the base station may previously agree on self-interference channel estimation symbol set information between the sectors and previously exchange necessary information between the sectors. Further, the base station may transfer information about the self-interference channel estimation symbol set (configuration information about the self-interference channel estimation interval, including the same) to the UE, so that the UE may identify the self-interference channel estimation symbol set information.

Referring to FIG. 21, in operations 2102, 2103, and 2104 of phase 2, the base station transmits a signal for intra-sector self-interference channel estimation and/or inter-sector self-interference channel estimation. After performing intra-sector self-interference channel estimation and/or inter-sector self-interference channel estimation in each sector using the same, the base station may rid the intra-sector self-interference and/or inter-sector self-interference signals. In operation 2112 of phase 2, the UE may receive downlink data from the base station, transmit uplink data, or may not transmit uplink data in the self-interference channel estimation interval, based on the self-interference channel estimation symbol set information received from the base station.

Figure 22:
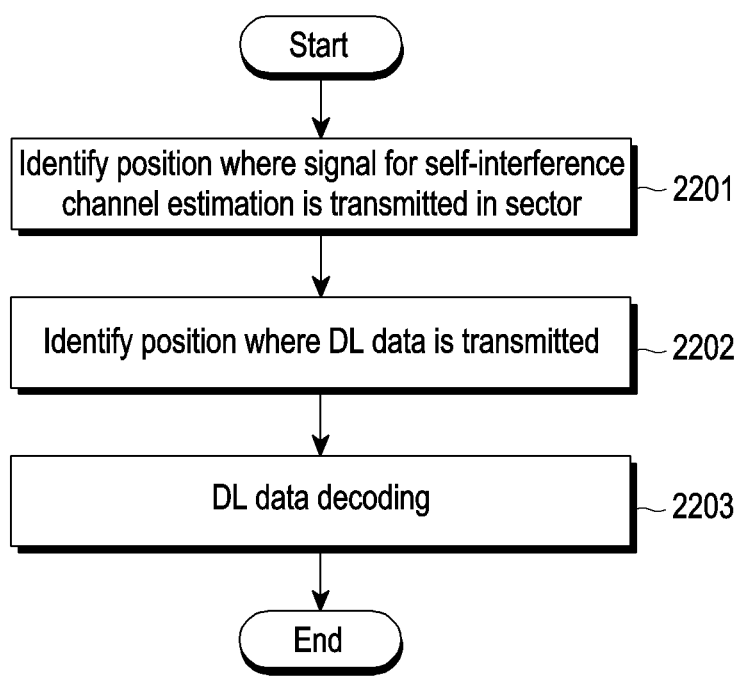
FIG. 22 is a view illustrating an operation for receiving downlink data by a UE that has received self-interference channel estimation symbol set information from a base station performing self-interference channel estimation according to an embodiment of the disclosure.

FIG. 22 is a view illustrating an operation for receiving downlink data by a UE that has received self-interference channel estimation symbol set information from a base station performing self-interference channel estimation according to an embodiment of the disclosure.

Referring to FIG. 22, in operation 2201, the UE identifies the position of the resource where a signal for intra-sector self-interference channel estimation and/or inter-sector self-interference channel estimation is transmitted in the corresponding sector based on the self-interference channel estimation symbol set information received from the base station. In operation 2202, the UE may determine resources in which downlink data exists and, in operation 2203, recognize the corresponding resources as data and perform decoding. As an example, in the frame structure in which PDCCH and/or PDSCH data is transferred as in the example of FIG. 14, the UE may recognize that downlink data exists in the remaining positions (or even in the resource position for self-interference channel estimation) except for the self-interference channel estimation symbol set and the position in which the signal for intra-sector self-interference channel estimation and/or inter-sector self-interference channel estimation is transmitted in the corresponding sector in the self-interference channel estimation symbol set and perform decoding. As another example, in the frame structure in which an SI-RS is transferred as in the example of FIG. 15, the UE may recognize that downlink data exists in the remaining positions except for the self-interference channel estimation symbol set and perform decoding. In this case, it is possible to enhance channel estimation performance along with the DMRS by using the SI-RS in the position where the signal for intra-sector self-interference channel estimation and/or inter-sector self-interference channel estimation is transmitted in the corresponding sector in the self-interference channel estimation symbol set.

Figure 23:
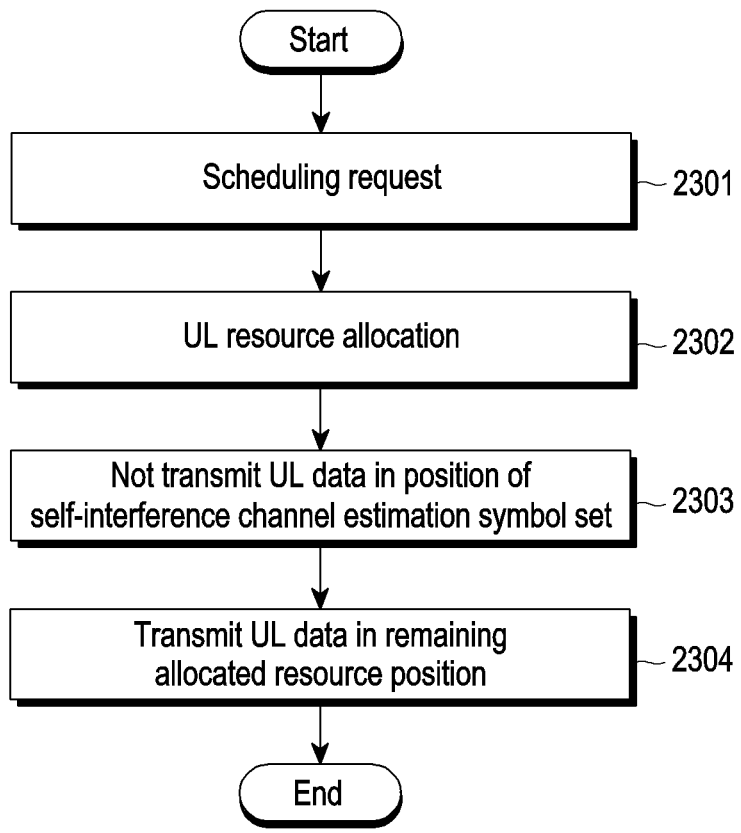
FIG. 23 is a view illustrating an operation for transmitting uplink data by a UE that has received self-interference channel estimation symbol set information from a base station performing self-interference channel estimation according to an embodiment of the disclosure.

FIG. 23 is a view illustrating an operation for transmitting uplink data by a UE that has received self-interference channel estimation symbol set information from a base station performing self-interference channel estimation according to an embodiment of the disclosure.

Referring to FIG. 23, in operation 2301, if uplink data occurs, the UE requests the base station to schedule uplink transmission. Thereafter, in operation 2302, the UE receives scheduling information from the base station and is allocated a resource for uplink transmission. In operation 2303, if receiving self-interference channel estimation symbol set information from the base station as in the above-described embodiment of the disclosure, the UE does not perform uplink transmission in the position of the self-interference channel estimation symbol set based on the received information and, in operation 2304, transmits uplink data in the allocated uplink resource except for the position of the self-interference channel estimation symbol set.

Embodiment 8

Embodiment 8 relates to a method in which the base station informs/notifies the UE of self-interference channel estimation symbol set and FDM pattern information in FIG. 21, described above in connection with embodiment 7. If the FDM scheme is not used as in embodiment 2 above, the UE may not be informed of the FDM pattern. For convenience, the self-interference channel estimation symbol set information described in connection with the instant embodiment may include FDM pattern information if the FDM pattern is used.

The base station may indicate, to the UE, the self-interference channel estimation symbol set information using one of methods (1) to (5).
(1) Explicitly indicate to the UE every time (dynamic method)
(2) Indicate to the UE a specific symbol pattern and repetition period of the self-interference channel estimation symbol set (periodic method)
(3) Operate during a specific time without indicating to the UE a specific symbol pattern and repetition period of the self-interference channel estimation symbol set (semi-static method)
(4) The UE conjectures the position of the self-interference channel estimation symbol set by combining other information
(5) The base station does not schedule, to the UE, the corresponding position of the self-interference channel estimation symbol set The information for the base station to indicate/configure, to the UE, at least one of the position, pattern, repetition period, and operation time of the self-interference channel estimation symbol set may be provided to the UE through at least one of the above-described higher layer signaling or L1 signaling.

If the base station informs the UE of the position of the self-interference channel estimation symbol set according to methods (1) to (4) above, it may be assumed that the UE transmits no uplink signal in the position of the self-interference channel estimation symbol set.

For example, when the base station informs the UE of specific symbol #a or multiple symbols corresponding to the self-interference channel estimation symbol set by methods (1) to (4) above, although the base station schedules, to the UE, symbols #b and #c including the position of the self-interference channel estimation symbol set, the UE may not perform uplink transmission on the specific symbol #a or multiple symbols which the UE has been informed of through methods (1) to (4). Further, according to the type of the self-interference channel estimation symbol set as described above in connection with embodiment 5, the UE may be aware of the RE or RB(s) where decoding is performed if PDCCH/PDSCH is used and may not perform decoding if the SI-RS is used.

If the base station explicitly informs the UE of the position of the specific symbol corresponding to the self-interference channel estimation symbol set every time by method (1) to configure the self-interference channel estimation symbol set, the UE may receive information about the self-interference channel estimation symbol set from the base station ('receive' here may mean doing so after decoding is complete) and may not perform uplink transmission in the position of the self-interference channel estimation symbol set. As described above in connection with embodiment 5, if PDCCH/PDSCH is used according to the type of the self-interference channel estimation symbol set, the UE may be aware of the RE or RB(s) where decoding is performed and, if the SI-RS is used, the UE may not perform decoding in the corresponding portion.

For example, if the base station designates a specific symbol corresponding to the self-interference channel estimation symbol set and informs the UE of it at a time before a time t_decoding previously agreed on with the UE (i.e., a time required until decoding of the self-interference channel estimation symbol set), the UE may not perform uplink transmission on the corresponding self-interference channel estimation symbol set despite being scheduled for an uplink resource for the position of the self-interference channel estimation symbol set by the base station. The base station may use the self-interference channel estimation symbol set position for the purpose of self-interference channel estimation. As described above in connection with embodiment 5, if PDCCH/PDSCH is used according to the type of the self-interference channel estimation symbol set, the UE may be aware of the RE or RB(s) where decoding is performed and, if the SI-RS is used, the UE may not perform decoding in the corresponding portion.

In an embodiment of the disclosure, the UE may limit the operation of refraining from transmitting an uplink signal in the designated self-interference channel estimation symbol set designated by the base station to one slot.

If the base station informs the UE of the position of the specific symbol corresponding to the self-interference channel estimation symbol set, periodically along with the period or without period, by method (2) above to configure the self-interference channel estimation symbol set, the UE may receive information about the self-interference channel estimation symbol set from the base station and may not perform uplink transmission in the position of the corresponding self-interference channel estimation symbol set. As described above in connection with embodiment 5, if PDCCH/PDSCH is used according to the type of the self-interference channel estimation symbol set, the UE may be aware of the RE or RB(s) where decoding is performed and, if the SI-RS is used, the UE may not perform decoding in the corresponding portion.

For example, if the base station informs the UE of the specific position of the self-interference channel estimation symbol set along with the specific period (e.g., 0.5 slots, 1 slot, or 2 slots), the UE may not perform uplink transmission even when uplink-scheduled in the position of the self-interference channel estimation symbol set according to the position and period of the self-interference channel estimation symbol set. Further, although scheduled for downlink reception, according to the FDM pattern, the UE decodes downlink data if the type of the self-interference channel estimation symbol set is PDCCH/PDSCH and, if the type of the self-interference channel estimation symbol set is SI-RS, the UE does not decode data and use it, along with the DMRS, to increase the accuracy of channel estimation.

For example, if the base station indicates that symbol #0 and symbol #7 among 14 symbols (symbol #0 to symbol #13) in the slot and the period of 0.5 slots are the positions and period of the self-interference channel estimation symbol set, the UE may not perform uplink transmission in the positions of symbol #0 and symbol #7 in the nth slot, symbol #0 and symbol #7 in the n+1th slot, . . . , and symbol #0 and symbol #7 in the kth slot. Further, although scheduled for downlink reception, according to the FDM pattern, the UE may decode downlink data if the type of the self-interference channel estimation symbol set is PDCCH/PDSCH and, if it is SI-RS, the UE may use it along with the DMRS to increase the accuracy of channel estimation without decoding data.

For example, if the base station indicates the period of two slots and symbol #0, the UE may not perform uplink transmission in symbol #0 of the nth slot, symbol #0 of the n+2th slot, . . . , and symbol #0 of the n+2kth slot (at or after the time when the UE receives information about the self-interference channel estimation symbol set and decodes it). Further, although scheduled for downlink reception, according to the FDM pattern, the UE may decode downlink data if the type of the self-interference channel estimation symbol set is PDCCH/PDSCH and, if it is SI-RS, the UE may use it along with the DMRS to increase the accuracy of channel estimation without decoding data.

If the base station informs the UE of the position of the specific symbol of the self-interference channel estimation symbol set, periodically along with the period or without period, or informs the UE of a specific number of repetitions by method (3) above to configure the self-interference channel estimation symbol set, the UE may receive information about the self-interference channel estimation symbol set from the base station and, after decoding, the UE may register the position of the self-interference channel estimation symbol set as a candidate where uplink transmission may not be performed. If the base station explicitly or implicitly activate on the position of the self-interference channel estimation symbol set, the UE may designate the position of the self-interference channel estimation symbol set as a position where uplink transmission is not performed during a specific time and operate. As described above in connection with embodiment 5, if PDCCH/PDSCH is used according to the type of the self-interference channel estimation symbol set, the UE may be aware of the RE or RB(s) where decoding is performed and, if the SI-RS is used, the UE may not perform decoding in the corresponding portion.

For example, if the base station informs the UE of the specific position of the self-interference channel estimation symbol set along with the specific period (e.g., 0.5 slots, 1 slot, or 2 slots) and activates, the UE may not perform uplink transmission even when scheduled for uplink transmission in the position of the self-interference channel estimation symbol set according to the position and period of the self-interference channel estimation symbol set. Further, although scheduled for downlink reception, according to the FDM pattern, the UE may decode downlink data if the type of the self-interference channel estimation symbol set is PDCCH/PDSCH and, if it is SI-RS, the UE may use it along with the DMRS to increase the accuracy of channel estimation without decoding data.

For example, if the base station indicates the period of 0.5 symbols and symbol #0 as the period and position of the self-interference channel estimation symbol set and provides an activation signal, the UE may not perform uplink transmission for symbol #0 and symbol #7 in the nth slot, symbol #0 and symbol #7 in the n+1th slot, . . . , and symbol #0 and symbol #7 in the kth slot. Further, although scheduled for downlink reception, according to the FDM pattern, the UE may decode downlink data if the type of the self-interference channel estimation symbol set is PDCCH/PDSCH and, if it is SI-RS, the UE may use it along with the DMRS to increase the accuracy of channel estimation without decoding data.

For example, if the base station indicates, to the UE, that the period of two slots and symbol #0 are the period and position of the self-interference channel estimation symbol set and then transmits an activation signal to the UE, the UE may not perform uplink transmission on symbol #0 of the nth slot, symbol #0 of the n+2th slot, . . . , and symbol #0 of the n+2kth slot (at or after the time when the UE receives information about the self-interference channel estimation symbol set and decodes it). Further, although scheduled for downlink reception, according to the FDM pattern, the UE may decode downlink data if the type of the self-interference channel estimation symbol set is PDCCH/PDSCH and, if it is SI-RS, the UE may use it along with the DMRS to increase the accuracy of channel estimation without decoding data.

If the base station informs the UE of the position of the self-interference channel estimation symbol set by method (4) to configure the self-interference channel estimation symbol set, the UE may be configured with the position of the self-interference channel estimation symbol set using an equation and information configured to the UE by the base station or using an equation and information previously determined between the base station and the UE.

For example, the UE and the base station may measure/estimate the position of the self-interference channel estimation symbol set using at least one of the cell ID, UE ID, system frame number (SFN), slot number, and number of sectors operated by the base station and perform operations according to the disclosure.

For example, if the cell ID is 1, the UE ID is 1, the SFN is 1, and the slot number is 1, the UE may recognize the first symbol in the slot as the self-interference channel estimation symbol set where no uplink signal is transmitted although uplink is scheduled. Further, in this case, if the number of sectors operated by the base station is 3, the UE may recognize that the FDM pattern is used as 3 so that the first, fourth, seventh, and tenth REs in the RB are used for self-interference channel estimation and determine an operation in downlink depending on the type of the self-interference channel estimation symbol set.

For example, if the cell ID is 1, the UE ID is 1, the SFN is 2, and the slot number is 1, the UE may recognize the second symbol in the slot as a self-interference channel estimation symbol set where no uplink signal is transmitted although uplink is scheduled. Further, in this case, if the number of sectors operated by the base station is 3, the UE may recognize that the FDM pattern is used as 3 so that the second, fifth, eighth, and eleventh REs in the RB are used for self-interference channel estimation and determine an operation in downlink depending on the type of the self-interference channel estimation symbol set.

As described above, it is possible to identify the specific position of the self-interference channel estimation symbol set through information, which is previously determined, or shared, or may be recognized as shared between the UE and the base station and to allow no uplink signal to be transmitted in the self-interference channel estimation symbol set. Accordingly, it is possible to identify the specific position of the self-interference channel estimation symbol set using a method predefined between the base station and the UE even without a mapping method of the self-interference channel estimation symbol set by a certain specific equation.

If method (5) above is used to configure the self-interference channel estimation symbol set, the base station may have the same effect as indicating to the UE the position of the self-interference channel estimation symbol set in methods 1) to 4) in a method not to schedule, to the UE, a specific symbol corresponding to the self-interference channel estimation symbol set.

For example, the base station may have the same effect as directly indicating, to the UE, the position of the self-interference channel estimation symbol set by transmitting, to the UE, downlink control information (DCI) for scheduling symbols #0 to #(X−1) in the slot and DCI for scheduling symbols #(X+1) to #13 (that is, by not directly scheduling the symbol #X corresponding to the self-interference channel estimation symbol set).

Methods (1) to (4) for configuring the self-interference channel estimation symbol set are to allow the UE to perform no uplink transmission in the position of the self-interference channel estimation symbol set although the UE is scheduled for the self-interference channel estimation symbol set, and method (5) is a method in which the base station may secure a self-interference cancellation interval although the UE does not support operations for the self-interference channel estimation symbol set as the base station performs scheduling in a different method although the UE is not directly scheduled for the self-interference channel estimation symbol set by the base station. However, in method (5), the UE should perform DCI decoding twice and decode different codewords to be allocated an uplink resource by the base station.

Accordingly, methods (1) to (4) may be used for UEs supporting the self-interference channel estimation symbol set operation according to the disclosure, and method (5) may be used for legacy UEs which do not support a self-interference channel estimation symbol set.

Figure 24:
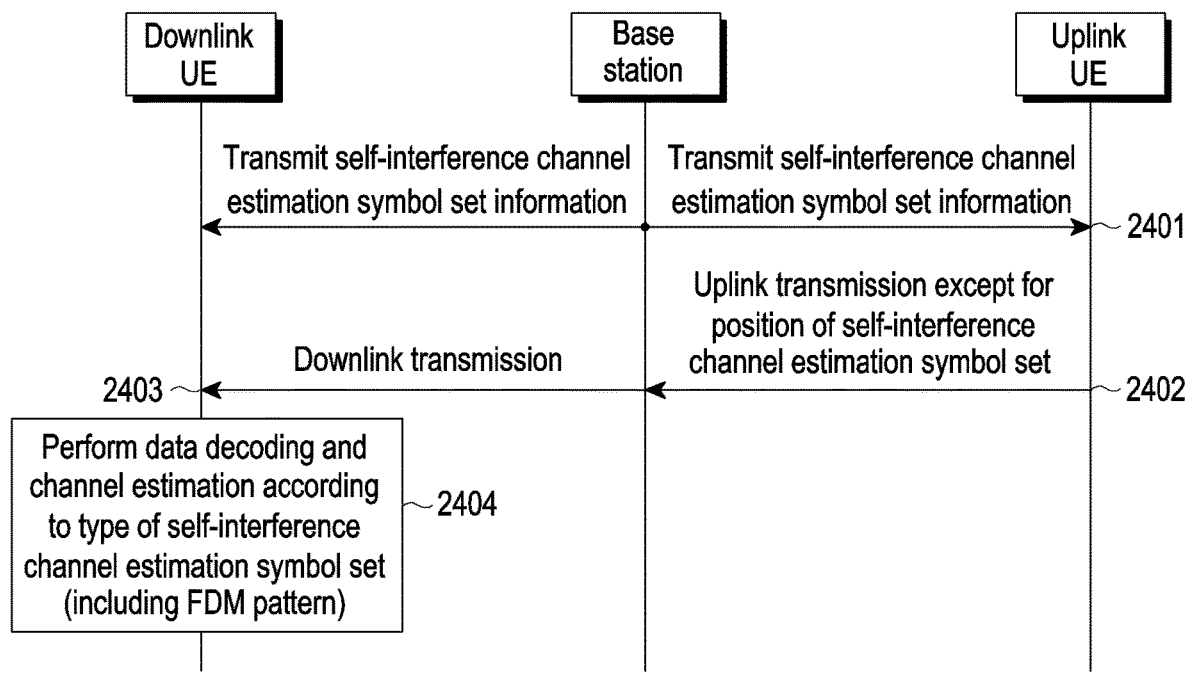
FIGS. 24, 25, 26, 27, and 28 are views illustrating methods for configuring a self-interference channel estimation symbol set between a base station and a UE according to various embodiments of the disclosure.

FIG. 24 is a view illustrating methods for configuring a self-interference channel estimation symbol set between a base station and a UE according to an embodiment of the disclosure. The example of FIG. 24 shows a process of exchanging messages between a UE and a base station when a self-interference channel estimation symbol set is configured by method (1).

Referring to FIG. 24, in operation 2401, the base station transmits information indicating a specific position of a self-interference channel estimation symbol set to a UE(s) capable of using downlink and uplink. In this case, to designate the position of the self-interference channel estimation symbol set, a method using RRC information, a method using DCI, and a method using medium access control (MAC) control element (CE) may be considered. In operation 2402, the uplink UE performs uplink transmission in the remaining symbols except for the self-interference channel estimation symbol set among the symbols in the slot for uplink transmission based on information about the position of the self-interference channel estimation symbol set received from the base station. If the UE receives the information about the position of the self-interference channel estimation symbol set before receiving the scheduling information for uplink transmission, the UE may perform uplink transmission in the remaining symbols except for the corresponding self-interference channel estimation symbol set among the scheduled symbols. In operation 2403, the base station performs downlink transmission. In operation 2404, if the type of the self-interference channel estimation symbol set is PDCCH/PDSCH according to the FDM pattern upon downlink reception based on the information about the position of the self-interference channel estimation symbol set received from the base station, the downlink UE may decode downlink data and, if the type is SI-RS, the downlink UE may use it along with the DMRS to increase the accuracy of channel estimation without performing data decoding.

Figure 25:
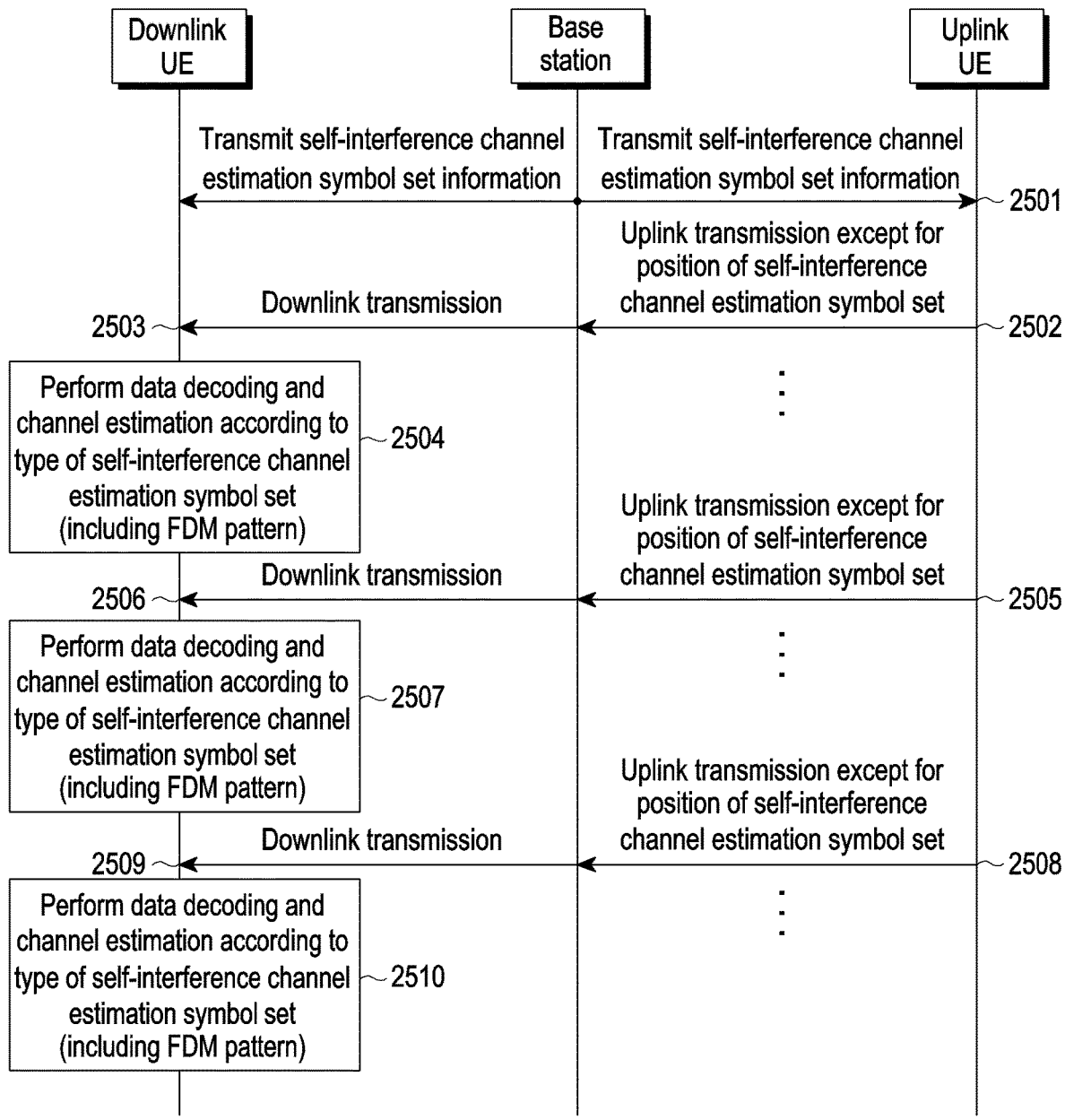

FIG. 25 is a view illustrating methods for configuring a self-interference channel estimation symbol set between a base station and a UE according to an embodiment of the disclosure. The example of FIG. 25 shows a process of exchanging messages between a UE and a base station when a self-interference channel estimation symbol set is configured by method (2).

Referring to FIG. 25, in operation 2501, the base station transmits information indicating a specific position and repetition period of a self-interference channel estimation symbol set to a UE(s) capable of using downlink and uplink. In this case, to indicate the position and repetition period of the self-interference channel estimation symbol set, a method using RRC information, a method using DCI, and a method using MAC CE may be considered. In operations 2502, 2505, and 2508, the uplink UE periodically performs uplink transmission in the remaining symbols except for the self-interference channel estimation symbol set among the symbols in the slot for uplink transmission based on the information about the position and repetition period of the self-interference channel estimation symbol set received from the base station. Accordingly, although there is no further instruction from the base station after the position and repetition period of the self-interference channel estimation symbol set are configured, if scheduled for uplink transmission, the uplink UE may periodically perform uplink transmission in the symbols except for the self-interference channel estimation symbol set. In operations 2503, 2506, and 2509, the base station performs downlink transmission as scheduled. In operations 2504, 2507, and 2510, if the type of the self-interference channel estimation symbol set is PDCCH/PDSCH according to the FDM pattern upon downlink reception based on the information about the position and repetition period of the self-interference channel estimation symbol set received from the base station in operation 2501, the downlink UE may decode downlink data and, if the type is SI-RS, the downlink UE may use it along with the DMRS to increase the accuracy of channel estimation without performing data decoding.

If the uplink UE receives the information about the position and repetition period of the self-interference channel estimation symbol set before receiving the scheduling information for uplink transmission, the UE may perform uplink transmission in the remaining symbols except for the corresponding self-interference channel estimation symbol set among the scheduled symbols. Similarly, according to the FDM pattern, the UE may decode downlink data if the type of the self-interference channel estimation symbol set among the scheduled symbols is PDCCH/PDSCH and, if it is SI-RS, the UE may use it along with the DMRS to increase the accuracy of channel estimation without decoding data.

Figure 26:
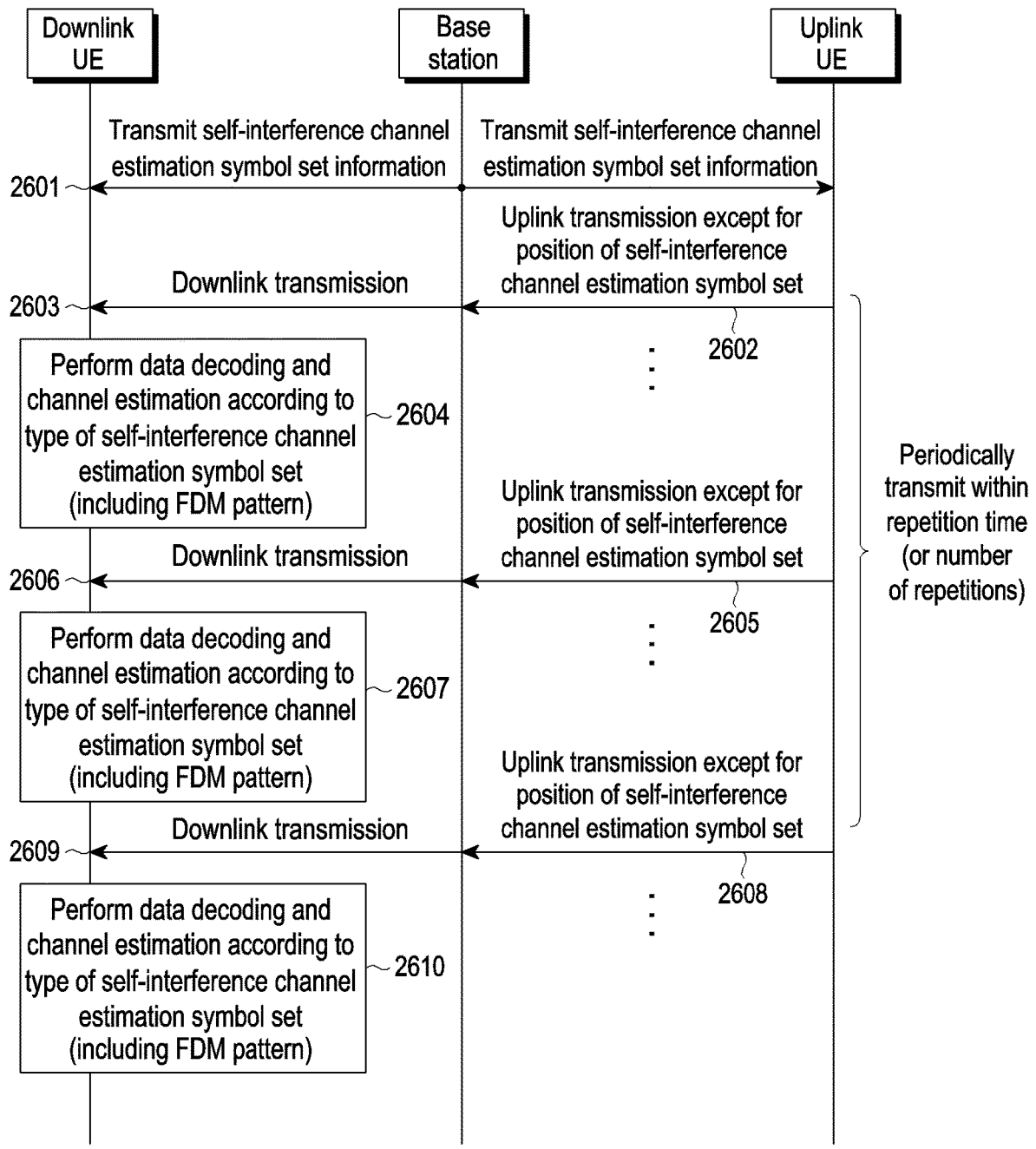

FIG. 26 is a view illustrating methods for configuring a self-interference channel estimation symbol set between a base station and a UE according to an embodiment of the disclosure. The example of FIG. 26 shows a process of exchanging messages between a UE and a base station when a self-interference channel estimation symbol set is configured by method (3).

Referring to FIG. 26, in operation 2601, the base station transmits information indicating a specific position and repetition period, and repetition time (or number of repetitions) of a self-interference channel estimation symbol set to a UE(s) capable of using downlink and uplink. In this case, to indicate the position and repetition period, repetition time (or number of repetitions) of the self-interference channel estimation symbol set, a method using RRC information, a method using DCI, and a method using MAC CE may be considered. In operations 2602, 2605, and 2608, the uplink UE performs, periodically within the repetition time (or number of repetitions), uplink transmission in the remaining symbols except for the self-interference channel estimation symbol set among the symbols in the slot for uplink transmission based on the information about the position and repetition period, and repetition time (or number of repetitions) of the self-interference channel estimation symbol set received from the base station. Accordingly, although there is no further instruction from the base station after the position and repetition period, repetition time (or number of repetitions) of the self-interference channel estimation symbol set are configured, if scheduled for uplink transmission, the uplink UE may perform, periodically within the repetition time (or number of repetitions), uplink transmission in the symbols except for the self-interference channel estimation symbol set. In operations 2603, 2606, and 2609, the base station performs downlink transmission as scheduled. In operations 2604, 2607, and 2610, if the type of the self-interference channel estimation symbol set is PDCCH/PDSCH according to the FDM pattern upon performing downlink reception, periodically within the repetition time (or number of repetitions), based on the information about the position and repetition period, and repetition time (or number of repetitions) of the self-interference channel estimation symbol set received from the base station in operation 2601, the downlink UE may decode downlink data and, if the type is SI-RS, the downlink UE may use it along with the DMRS to increase the accuracy of channel estimation without performing data decoding.

If the UE receives the information about the position and repetition period of the self-interference channel estimation symbol set before receiving the scheduling information for uplink transmission, the UE may perform, periodically with the repetition time (or number of repetitions), uplink transmission in the remaining symbols except for the corresponding self-interference channel estimation symbol set among the scheduled symbols. Similarly, in performing, periodically within the repetition time (or number of repetitions), downlink reception, according to the FDM pattern, the downlink UE may also decode downlink data if the type of the self-interference channel estimation symbol set among the scheduled symbols is PDCCH/PDSCH and, if it is SI-RS, the UE may use it along with the DMRS to increase the accuracy of channel estimation without decoding data.

Figure 27:
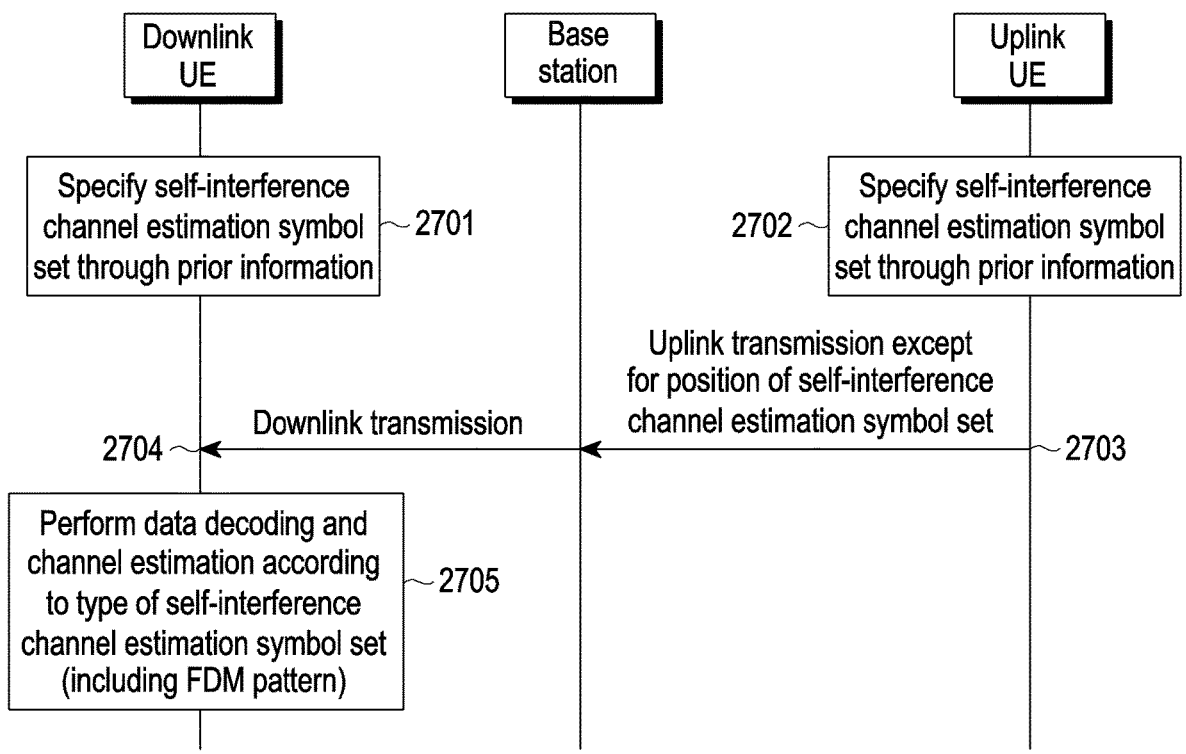

FIG. 27 is a view illustrating methods for configuring a self-interference channel estimation symbol set between a base station and a UE according to an embodiment of the disclosure. The example of FIG. 27 shows a process of exchanging messages between a UE and a base station when a self-interference channel estimation symbol set is configured by method (4).

Referring to FIG. 27, even when the base station does not designate a specific position and repetition period and repetition time (or number of repetitions) of the self-interference channel estimation symbol set to a UE(s) capable of using downlink and uplink, the downlink UE and uplink UE each may calculate/estimate/specify the position of the self-interference channel estimation symbol set based on prior information shared between the UE and the base station as in the above-described method in operations 2701 and 2702. In operation 2703, the uplink UE performs uplink transmission in the remaining symbols except for the self-interference channel estimation symbol set among the symbols in the slot for uplink transmission based on information about the calculated/estimated/specified position of the self-interference channel estimation symbol set. In operation 2704, the base station performs downlink transmission to the downlink UE. In operation 2705, if the type of the self-interference channel estimation symbol set is PDCCH/PDSCH according to the FDM pattern based on the calculated/estimated/specified position of the self-interference channel estimation symbol set, the downlink UE may decode downlink data and, if the type is SI-RS, the downlink UE may use it along with the DMRS to increase the accuracy of channel estimation without performing data decoding.

Figure 28:
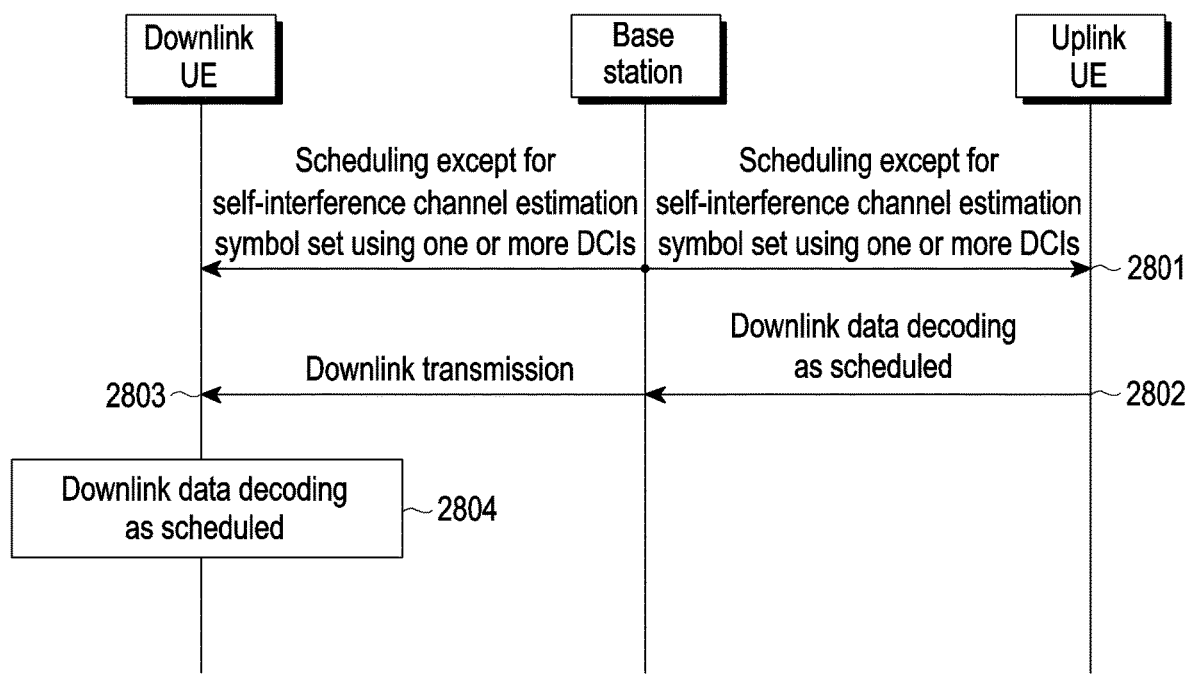

FIG. 28 is a view illustrating methods for configuring a self-interference channel estimation symbol set between a base station and a UE according to an embodiment of the disclosure. The example of FIG. 28 shows a process of exchanging messages between a UE and a base station when a self-interference channel estimation symbol set is configured by method (5).

Referring to FIG. 28, in operation 2801, the base station performs uplink scheduling, to the UE, except for a specific symbol position in the slot using one or more DCIs (e.g., two DCIs) as described above. In operation 2802, the uplink UE performs uplink transmission in the remaining scheduled symbols except for the specific symbol. In operation 2803, the base station performs downlink transmission as scheduled and, in operation 2804, the downlink UE performs downlink reception in the remaining scheduled symbols except for the specific symbol. The specific symbol may be a self-interference channel estimation symbol set.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for estimating a self-interference channel by a base station operating a plurality of sectors, the method comprising:
    transmitting, in a self-interference channel estimation interval, a downlink signal in a sector among the plurality of sectors;
    estimating an intra-sector self-interference channel caused by the downlink signal in the sector;
    transmitting, in the self-interference channel estimation interval, a downlink signal in a neighboring sector adjacent to the sector among the plurality of sectors; and
    estimating an inter-sector self-interference channel caused by the downlink signal in the neighboring sector in the base station.

2. The method of claim 1, further comprising:
    canceling intra-sector self-interference based on the estimated intra-sector self-interference channel, and
    canceling inter-sector self-interference based on the estimated inter-sector self-interference channel.

3. The method of claim 1, further comprising:
    configuring the self-interference channel estimation interval for estimation of the intra-sector self-interference channel and estimation of the inter-sector self-interference channel; and
    transmitting information about the self-interference channel estimation interval to a user equipment (UE) in each sector,
    wherein the information about the self-interference channel estimation interval includes information about a self-interference channel estimation symbol set.

4. The method of claim 3, wherein uplink transmission by the UE is limited in the self-interference channel estimation interval.

5. The method of claim 1,
    wherein the self-interference channel estimation interval is configured in at least one symbol in a slot, and
    wherein in the self-interference channel estimation interval, the downlink signal in the sector and the downlink signal in the neighboring sector are transmitted in a time division multiplexing (TDM) scheme.

6. The method of claim 1,
    wherein the self-interference channel estimation interval is configured in at least one symbol in a slot, and
    wherein in the self-interference channel estimation interval, the downlink signal in the sector and the downlink signal in the neighboring sector are transmitted in a unit of a resource element (RE) in a frequency division multiplexing (FDM) scheme.

7. The method of claim 1, further comprising:
    sharing at least one of first information, second information, or third information between the plurality of sectors,
    wherein the first information indicating whether self-interference channel estimation is necessary,
    wherein the second information indicating a signal transmitted from each sector to perform the intra-sector self-interference channel estimation and the inter-sector self-interference channel estimation, and
    wherein the third information indicating a resource position of the signal transmitted from each sector to perform the intra-sector self-interference channel estimation and the inter-sector self-interference channel estimation.

8. A base station operating a plurality of sectors, the base station comprising:
    a transceiver including a plurality of antenna panels; and
    at least one processor configured to:
        transmit, in a self-interference channel estimation interval, a downlink signal in a sector among the plurality of sectors,
        estimate an intra-sector self-interference channel caused by the downlink signal in the sector,
        transmit, in the self-interference channel estimation interval, a downlink signal in a neighboring sector adjacent to the sector among the plurality of sectors, and
        estimate an inter-sector self-interference channel caused by the downlink signal in the neighboring sector in the base station.

9. The base station of claim 8, wherein the at least one processor is further configured to:
    cancel intra-sector self-interference based on the estimated intra-sector self-interference channel, and
    cancel inter-sector self-interference based on the estimated inter-sector self-interference channel.

10. The base station of claim 8,
    wherein the at least one processor is further configured to:
    configure the self-interference channel estimation interval for estimation of the intra-sector self-interference channel, and estimation of the inter-sector self-interference channel, and
    transmit information about the self-interference channel estimation interval to a user equipment (UE) in each sector through the transceiver, and
    wherein the information about the self-interference channel estimation interval includes information about a self-interference channel estimation symbol set.

11. The base station of claim 10, wherein uplink transmission by the UE is limited in the self-interference channel estimation interval.

12. The base station of claim 8,
    wherein the self-interference channel estimation interval is configured in at least one symbol in a slot, and
    wherein in the self-interference channel estimation interval, the downlink signal in the sector and the downlink signal in the neighboring sector are transmitted in a time division multiplexing (TDM) scheme.

13. The base station of claim 8,
    wherein the self-interference channel estimation interval is configured in at least one symbol in a slot, and
    wherein in the self-interference channel estimation interval, the downlink signal in the sector and the downlink signal in the neighboring sector are transmitted in a unit of a resource element (RE) in a frequency division multiplexing (FDM) scheme.

14. The base station of claim 8,
wherein the at least one processor is further configured to share at least one of first information, second information, or third information between the plurality of sectors,
wherein the first information indicating whether self-interference channel estimation is necessary,
wherein the second information indicating a signal transmitted from each sector to perform the intra-sector self-interference channel estimation and the inter-sector self-interference channel estimation, and
wherein the third information indicating a resource position of the signal transmitted from each sector to perform the intra-sector self-interference channel estimation and the inter-sector self-interference channel estimation.

15. A method performed by a user equipment (UE) communicating with a base station operating a plurality of sectors, the method comprising:
receiving, from the base station, configuration information including information about a self-interference channel estimation interval in a sector where the UE belongs; and
performing data transmission or reception with the base station in a remaining uplink resource or downlink resource except for the self-interference channel estimation interval based on the configuration information,
wherein uplink transmission of the UE is limited in the self-interference channel estimation interval for estimation of a self-interference channel in the base station.

16. The method of claim 15,
wherein the information about the self-interference channel estimation interval includes information about a self-interference channel estimation symbol set,
wherein the self-interference channel estimation interval is configured in at least one symbol in a slot, and
wherein a downlink signal in each sector of the base station is received in a time division multiplexing (TDM) scheme or is received in a resource element (RE) unit in a frequency division multiplexing (FDM) scheme.

17. A user equipment (UE) communicating with a base station operating a plurality of sectors, the UE comprising:
a transceiver; and
at least one processor configured to:
receive, from the base station through the transceiver, configuration information including information about a self-interference channel estimation interval in a sector where the UE belongs, and
perform data transmission or reception with the base station, through the transceiver, in a remaining uplink resource or downlink resource except for the self-interference channel estimation interval based on the configuration information,
wherein uplink transmission of the UE is limited in the self-interference channel estimation interval for estimation of a self-interference channel in the base station.

18. The UE of claim 17,
wherein the information about the self-interference channel estimation interval includes information about a self-interference channel estimation symbol set, and
wherein the self-interference channel estimation interval is configured in at least one symbol in a slot, and a downlink signal in each sector of the base station is received in a time division multiplexing (TDM) scheme or is received in a resource element (RE) unit in a frequency division multiplexing (FDM) scheme.

* * * * *